(12) United States Patent
Suzuki et al.

(10) Patent No.: US 10,458,785 B2
(45) Date of Patent: *Oct. 29, 2019

(54) SAMPLE SHAPE MEASURING METHOD AND SAMPLE SHAPE MEASURING APPARATUS

(71) Applicant: OLYMPUS CORPORATION, Tokyo (JP)

(72) Inventors: Yoshimasa Suzuki, Kawasaki (JP); Hisashi Ode, Chofu (JP); Mayumi Odaira, Akiruno (JP)

(73) Assignee: OLYMPUS CORPORATION, Tokyo (JP)

( * ) Notice: Subject to any disclaimer, the term of this patent is extended or adjusted under 35 U.S.C. 154(b) by 50 days.

This patent is subject to a terminal disclaimer.

(21) Appl. No.: 15/815,867

(22) Filed: Nov. 17, 2017

(65) Prior Publication Data

US 2018/0073865 A1 Mar. 15, 2018

Related U.S. Application Data

(63) Continuation of application No. PCT/JP2016/050453, filed on Jan. 8, 2016.

(30) Foreign Application Priority Data

May 20, 2015 (WO) .................. PCT/JP2015/064446

(51) Int. Cl.
*G01B 11/25* (2006.01)
*G01B 11/26* (2006.01)
(Continued)

(52) U.S. Cl.
CPC .......... *G01B 11/2513* (2013.01); *G01B 11/24* (2013.01); *G01B 11/26* (2013.01);
(Continued)

(58) Field of Classification Search
CPC ..... G01B 11/2513; G01B 11/26; G01B 11/24; G02B 21/364; G02B 21/0088;
(Continued)

(56) References Cited

U.S. PATENT DOCUMENTS 7,277,566 B2 10/2007 Miyawaki et al.
9,291,450 B2 3/2016 Takahashi
(Continued)

FOREIGN PATENT DOCUMENTS

JP 2004-109348 A 4/2004
JP 2004-163129 A 6/2004
(Continued)

OTHER PUBLICATIONS

International Search Report and Written Opinion dated Mar. 15, 2016 issued in PCT/JP2016/050453.
(Continued)

*Primary Examiner* — Jerome Grant, II
(74) *Attorney, Agent, or Firm* — Scully, Scott, Murphy & Presser, P.C.

(57) ABSTRACT

A sample shape measuring method includes a step of preparing illumination light passing through a predetermined illumination region, a step of applying the illumination light to a sample, and a predetermined processing step. The predetermined illumination region is set so as not to include the optical axis at a pupil position of the illumination optical system and is set such that the illumination light is applied to part of the inside of the pupil and the outside of the pupil at a pupil position of the observation optical system. The predetermined processing step includes a step of receiving light, a step of obtaining the quantity of light, a step of calculating the difference or the ratio between the quantity of light and a reference quantity of light, and a step of calculating the amount of tilt in the surface of the sample from the difference or the ratio.

41 Claims, 56 Drawing Sheets

(51) Int. Cl.
  *G01B 11/24* (2006.01)
  *G02B 21/08* (2006.01)
  *G02B 21/00* (2006.01)
  *G02B 21/36* (2006.01)
  *G02B 21/26* (2006.01)

(52) U.S. Cl.
  CPC ..... *G02B 21/0016* (2013.01); *G02B 21/0088* (2013.01); *G02B 21/082* (2013.01); *G02B 21/084* (2013.01); *G02B 21/364* (2013.01); *G02B 21/26* (2013.01)

(58) Field of Classification Search
  CPC ............. G02B 21/0016; G02B 21/082; G02B 21/084; G02B 21/26
  USPC ........................................................ 382/128
  See application file for complete search history.

(56) References Cited

U.S. PATENT DOCUMENTS

| | | | |
|---|---|---|---|
| 2004/0061914 A1 | 4/2004 | Miyawaki et al. | |
| 2005/0195387 A1* | 9/2005 | Zhang | G01B 11/002 356/138 |
| 2006/0250914 A1* | 11/2006 | Stallinga | G11B 7/0945 369/53.19 |
| 2009/0231573 A1* | 9/2009 | Urashima | G01B 11/26 356/139.1 |
| 2012/0218390 A1* | 8/2012 | Wang | G06F 3/0304 348/51 |
| 2014/0152794 A1 | 6/2014 | Takahashi | |
| 2015/0200165 A1* | 7/2015 | Shiba | H01L 21/3086 438/401 |
| 2016/0313244 A1* | 10/2016 | Shiono | G01N 21/49 |
| 2018/0313643 A1* | 11/2018 | Odaira | G01B 11/26 |

FOREIGN PATENT DOCUMENTS

| | | |
|---|---|---|
| JP | 2005-208027 A | 8/2005 |
| JP | 2008-020498 A | 1/2008 |
| JP | 2009-008643 A | 1/2009 |
| JP | 2009-168582 A | 7/2009 |
| JP | 2014-109492 A | 6/2014 |

OTHER PUBLICATIONS

International Preliminary Report on Patentability together with the Written Opinion from related International Application No. PCT/JP2016/050453 dated Nov. 30, 2017.

* cited by examiner

FIG. 16

SAMPLE SHAPE MEASURING METHOD AND SAMPLE SHAPE MEASURING APPARATUS

CROSS-REFERENCE TO RELATED APPLICATION

The present application is a continuation application of International Application No. PCT/JP2016/050453 filed on Jan. 8, 2016, which is based upon and claims the benefit of priority from International Application No. PCT/JP2015/064446 filed on May 20, 2015; the entire contents of which are incorporated herein by reference.

BACKGROUND OF THE INVENTION

Field of the Invention

The present invention relates to a method and an apparatus for measuring an inclination and a shape in a surface of a sample.

Description of the Related Art

As examples of an apparatus for measuring a three-dimensional shape of a sample, an apparatus disclosed in Japanese Patent Application Laid-open No. 2014-109492 and an apparatus disclosed in Japanese Patent Application Laid-open No. 2008-20498 are available.

In the apparatus of Japanese Patent Application Laid-open No. 2014-109492, the three-dimensional shape of a sample is measured by a fringe projection method. In the apparatus of Japanese Patent Application Laid-open No. 2014-109492, image pickup means includes a projection unit, a light-receiving unit, an illumination light output unit, a stage, and a measurement control unit. The projection unit includes a pattern generating unit, and a pattern generated by the pattern generating unit is projected onto a sample. The pattern projected onto the sample is picked up by the light-receiving unit, whereby a fringe image is obtained. In the apparatus of Japanese Patent Application Laid-open No. 2014-109492, the three-dimensional shape of a sample is measured using the fringe image.

In the apparatus of Japanese Patent Application Laid-open No. 2008-20498, a phenomenon in which an image contrast is higher in front or at back of the focus position than at the focus position is utilized. This phenomenon is caused by interference between non-diffracted light and diffracted light. In the apparatus of Japanese Patent Application Laid-open No. 2008-20498, a differential image is obtained from images in front or at back of the focus position. Then, the contrast value of the differential image is calculated, and the position where the contrast value is largest is set as the focus position. In the apparatus of Japanese Patent Application Laid-open No. 2008-20498, by detecting the focus position for each position of the sample surface, it is possible to measure the three-dimensional shape of a sample.

SUMMARY OF THE INVENTION

A sample shape measuring method of the present invention comprises:
a step of preparing illumination light passing through a predetermined illumination region;
a step of applying the illumination light to a sample; and
a predetermined processing step, wherein
the predetermined illumination region is set so as not to include an optical axis at a pupil position of an illumination optical system and is set such that the illumination light is applied to part of inside of a pupil and outside of the pupil at a pupil position of an observation optical system,
the illumination light is transmitted through the sample,
light emitted from the sample is incident on the observation optical system, and
the predetermined processing step includes:
a step of receiving light emitted from the observation optical system;
a step of obtaining a quantity of light of the received light;
a step of calculating a difference or a ratio between the quantity of light and a reference quantity of light; and
a step of calculating an amount of tilt in a surface of the sample from the difference or the ratio.

A sample shape measuring apparatus of the present invention comprises:
an illumination optical system; an observation optical system; a holding member; a detecting element; and a processing apparatus, wherein
the illumination optical system includes alight source, a condenser lens, and an aperture member,
the observation optical system includes an objective lens and an imaging lens,
the holding member holds a sample and is disposed between the illumination optical system and the observation optical system,
illumination light applied to the sample by the illumination optical system is transmitted through the sample,
light emitted from the sample is incident on the observation optical system,
the detecting element receives light emitted from the observation optical system, and
the processing apparatus
obtains a quantity of light based on the received light,
calculates a difference or a ratio between the quantity of light and a reference quantity of light, and
calculates an amount of tilt in a surface of the sample based on the difference or the ratio.

Another sample shape measuring apparatus of the present invention comprises:
an illumination optical system; an observation optical system; a holding member; a detecting element; and a processing apparatus, wherein
the illumination optical system includes alight source, a condenser lens, and an aperture member,
the observation optical system includes an objective lens and an imaging lens,
the holding member holds a sample and is disposed between the illumination optical system and the observation optical system,
the aperture member has a light-shielding part and an opening,
the light-shielding part is provided so as to include an optical axis of the condenser lens,
the opening is provided at a position eccentric with respect to the optical axis,
an image of the opening is formed in vicinity of a pupil position of the observation optical system and is formed so as to overlap part of an outer edge of a pupil of the observation optical system,
illumination light applied to the sample by the illumination optical system is transmitted through the sample,
light emitted from the sample is incident on the observation optical system, the detecting element receives light emitted from the observation optical system, and the processing apparatus obtains a quantity of light based on the received light, calculates a difference or a ratio between the quantity of light and a reference quantity of light, and calculates an amount of tilt in a surface of the sample from the difference or the ratio.

BRIEF DESCRIPTION OF THE DRAWINGS

FIG. 16 shows an example of lookup table;

DETAILED DESCRIPTION OF THE INVENTION

Embodiments and examples of a sample shape measuring method and sample shape measuring apparatus will be described below in detail by referring to the accompanying diagrams. However, the present invention is not restricted to the embodiments and the examples described below.

First of all, the principle of measurement in a sample shape measuring method of the present embodiment will be described. In the sample shape measuring method of the present embodiment, oblique illumination light is applied to a sample. For this purpose, a light-shielding member for shielding part of light flux of illumination light is used in the stop (aperture stop) of the illumination optical system.

Figure 1:
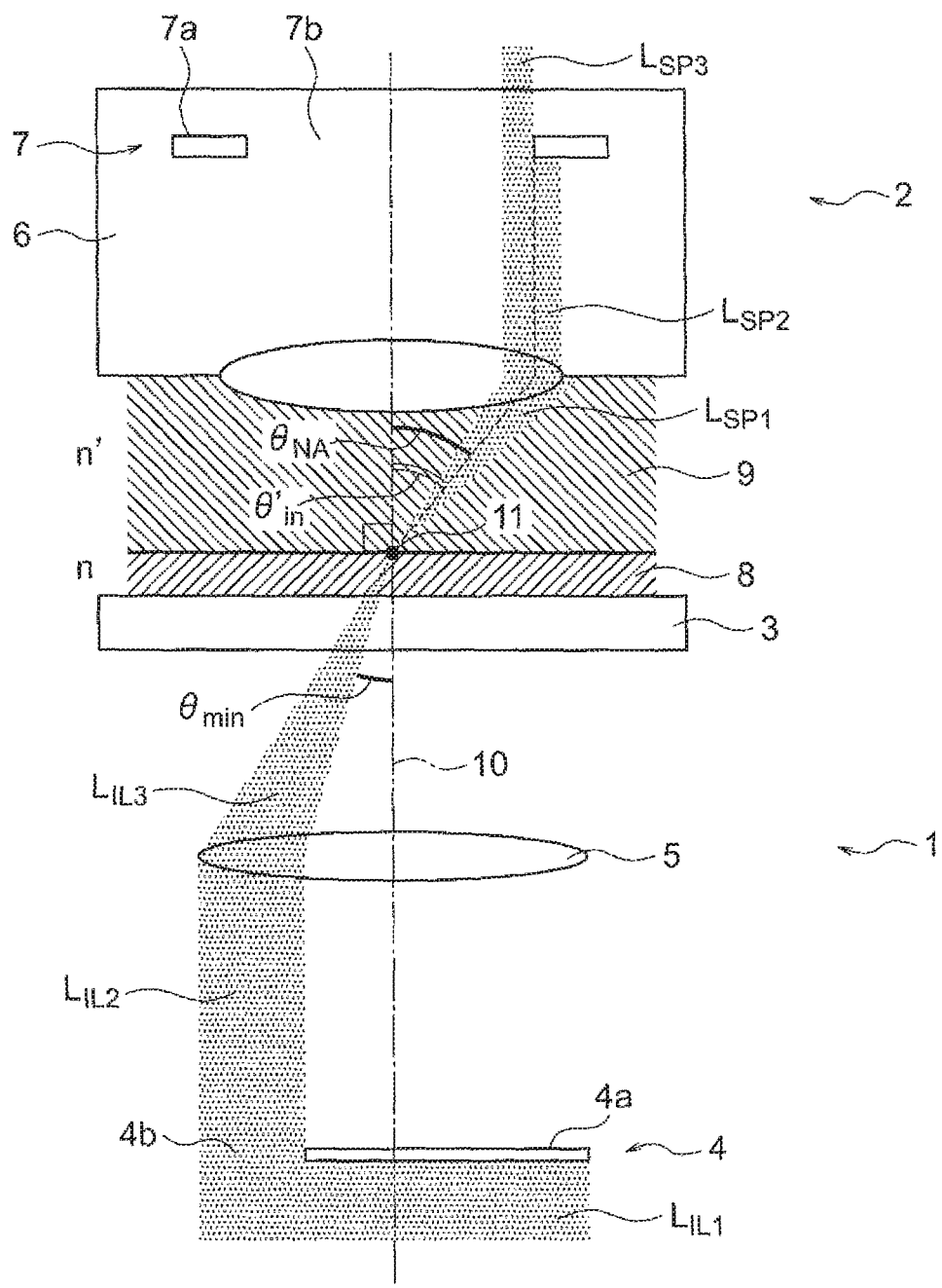
FIG. 1 is a diagram showing a state of illumination light and a state of imaging light in a first state.

First, the relation between illumination light and imaging light in a first state will be described. The state of illumination light and the state of imaging light in the first state are shown in FIG. 1. In the first state, the surface of a sample is flat, and the normal to the surface of the sample (hereinafter referred to as "normal to the surface") is parallel to the optical axis.

As shown in FIG. 1, an illumination optical system 1 and an observation optical system 2 are disposed to be opposed to each other with a stage 3 interposed therebetween. The illumination optical system 1 includes a light-shielding member 4 and a condenser lens 5. The observation optical system 2 includes an objective lens 6. The objective lens 6 has a stop 7.

For the light-shielding member 4, for example, a rectangular metal plate is used. The light-shielding member 4 is composed of a light-shielding region 4a and a transmission region 4b. The light-shielding region 4a is formed of a metal plate. Nothing exists in the transmission region 4b.

The light-shielding member 4 is disposed so as to include an optical axis 10. Therefore, the optical axis 10 is included in the light-shielding region 4a whereas the optical axis 10 is not included in the transmission region 4b. The transmission region 4b is formed at a position away from the optical axis 10.

Since the light-shielding member 4 is disposed in the optical path, illumination light $L_{IL1}$ is divided into light shielded by the light-shielding region 4a and light transmitted through the transmission region 4b.

For the light-shielding member 4, a transparent plate may be used. In this case, the light-shielding region 4a is formed, for example, by applying light-shielding paint or adhesion of a light-shielding member. On the other hand, application of light-shielding paint or affixing of a light-shielding member is not performed in the transmission region 4b. Therefore, the transparent plate alone exists in the transmission region 4b.

The shape of the light-shielding member 4 may not be rectangular. For example, the shape of the light-shielding member 4 may be circular, oval, or polygonal.

The stop 7 has a light-shielding part 7a and a transmission part 7b. For the stop 7, for example, a circular metal plate or transparent plate is used. When a metal plate is used for the stop 7, the light-shielding part 7a is a metal plate and the transmission part 7b is a hole formed in the metal plate. When a transparent plate is used for the stop 7, the light-shielding part 7a is formed by application of light-shielding paint or affixing of a light-shielding member. The transparent plate alone exists in the transmission part 7b.

The stop 7 is optically equivalent to the pupil of the objective lens 6. Therefore, at this position, a member that limits passage of light flux, for example, the above-noted metal plate or transparent plate may not exist.

A sample 8 is placed on the stage 3. A liquid immersion medium 9 (hereinafter referred to as "immersion liquid 9") fills in between the sample 8 and the objective lens 6. Here, the sample 8 is a liquid having a refractive index of n, and the immersion liquid 9 is a liquid having a refractive index of n'. Furthermore, n>n' holds.

Illumination light $n_{IL1}$ is parallel light flux and formed such that the optical axis 10 is included in the light flux. Illumination light $L_{IL1}$ travels through the optical path of the illumination optical system 1 toward the sample 8. In the optical path of the illumination optical system 1, the light-shielding member 4 and the condenser lens 5 are disposed.

Figure 2A:
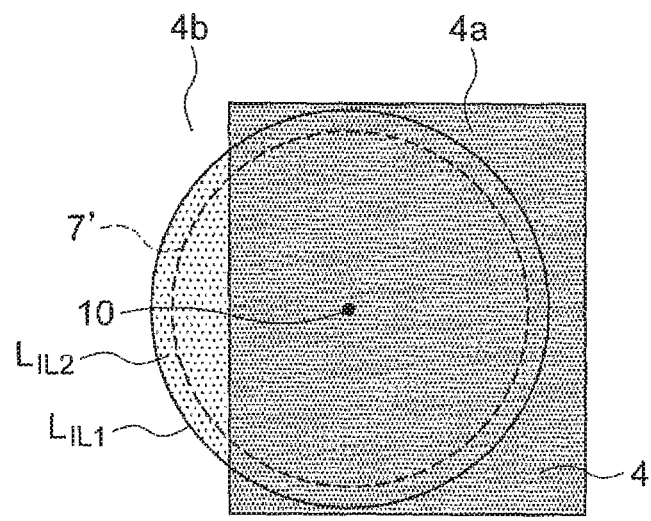
FIG. 2A is a diagram showing a state of illumination light in the first state.

The state of illumination light in the first state is shown in FIG. 2A. In FIG. 2A, a region of illumination light $L_{IL1}$ is shown by a circle of a solid line. Illumination light $L_{IL1}$ is divided into light shielded by the light-shielding region 4a and light transmitted through the transmission region 4b. The light-shielding member 4 is disposed such that the light-shielding region 4a includes the optical axis 10. Thus, the optical axis 10 is not included in the transmission region 4b. When passing through the transmission region 4b, the region of illumination light $L_{IL2}$ is formed into a bow-like shape.

The light-shielding member 4 is conjugate to the stop 7 by the condenser lens 5 and the objective lens 6. Therefore, an image 7' of the stop is formed at the position of the light-shielding member 4. In FIG. 2A, the image 7' of the stop formed at the position of the light-shielding member 4 is shown by a dashed line. The image 7' of the stop is a circular image as shown by the dashed line. The image 7' of the stop is also the image of the pupil of the objective lens 6.

As shown in FIG. 2A, the circle shown by a solid line is larger than the circle shown by a dashed line. This means that the light flux diameter of illumination light $L_{IL1}$ is set so as to illuminate a range wider than the image 7' of the stop. The same thing can be said for illumination light $L_{IL2}$. That is, illumination light $L_{IL2}$ is set to such a size that is distributed to the outside of the image 7' of the stop.

Returning to FIG. 1, the description will continue. Illumination light $L_{IL2}$ passing through the transmission region 4b is incident on the condenser lens 5. Since illumination light $L_{IL2}$ travels through a position away from the optical axis 10, illumination light $L_{IL2}$ is incident on the periphery of the condenser lens 5.

Illumination light $L_{IL2}$ incident on the condenser lens 5 is refracted by the condenser lens 5. From the condenser lens 5, illumination light $L_{IL3}$ is emitted. Illumination light $L_{IL3}$ is incident on an observation point 11 on the sample 8 whereby the observation point 11 is illuminated.

At the observation point 11, illumination is performed such that illumination light $L_{IL3}$ intersects the optical axis 10. This means that illumination by illumination light deflected in a certain direction, that is, illumination by oblique illumination light is performed.

Illumination light $L_{IL3}$ is transmitted through the sample 8. Light emitted from the sample 8 (hereinafter referred to as "imaging light") reaches the objective lens 6. Of imaging light $L_{SP1}$ that reaches the objective lens 6, part of the imaging light is shaded by the effective aperture of the objective lens 6 and the remaining imaging light is incident on the objective lens 6. Of imaging light $L_{SP2}$ incident on the objective lens 6, part of the imaging light is shaded by the stop 7 and the remaining imaging light $L_{SP3}$ is emitted from the objective lens 6.

Figure 2B:
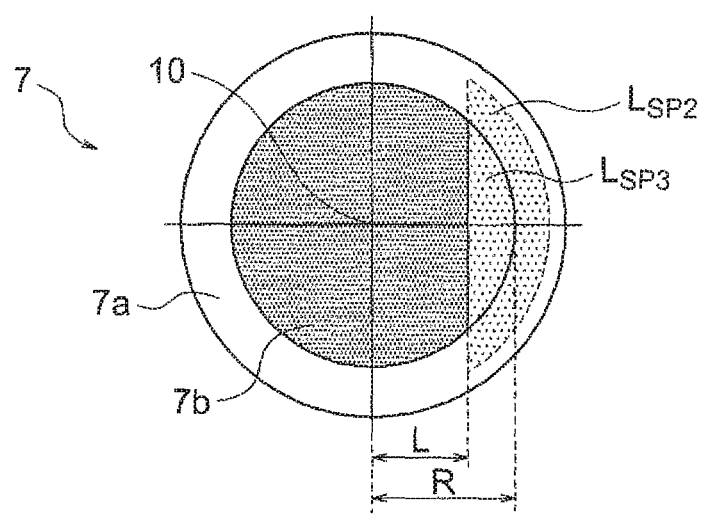
FIG. 2B is a diagram showing a state of imaging light in the first state.

The state of the imaging light in the first state is shown in FIG. 2B. Imaging light $L_{SP2}$ is incident on the stop 7. The region indicating imaging light $L_{SP2}$ is bow-shaped. Of imaging light $L_{SP2}$, part of the imaging light is located outside the transmission part 7b. Therefore, this part of the imaging light is shielded by the light-shielding part 7a. Of imaging light $L_{SP2}$, the remaining imaging light passes through the transmission part 7b.

The imaging light $L_{SP2}$ is divided into a region where the imaging light passes through and a region where the imaging light does not exist. The region where the imaging light passes through is bow-shaped. Imaging light $L_{SP3}$ passes through this bow-shaped region.

In FIG. 2B, R denotes the radius of the transmission part 7b. Since the stop 7 is optically equivalent to the pupil of the objective lens 6, it can be said that R represents the radius of the pupil of the objective lens. L denotes the shortest distance of the distance from the optical axis 10 to imaging light $L_{SP3}$.

In the first state, Equation (1) below holds for predetermined light rays. The predetermined light rays are light rays passing through the position closest to the optical axis, of light incident on the sample.

$$\theta'_{in} = \sin^{-1}\left(\frac{n}{n'}\sin\theta_{min}\right) \quad (1)$$

where $\theta'_{in}$ is the angle formed between the predetermined light rays and the optical axis on the illumination optical system side, $\theta_{min}$ is the angle formed between the predetermined light rays and the optical axis on the imaging optical system side, n is the refractive index of the sample, and n' is the refractive index of the immersion liquid.

Here, an area $S_0$ of the imaging light emitted from the objective lens is represented by Equation (2) below.

$$S_0 = R^2\cos^{-1}\left(\frac{L}{R}\right) - L^2\tan\left(\cos^{-1}\left(\frac{L}{R}\right)\right) \quad (2)$$

Furthermore, R and L are represented by Equations (3) and (4) below, respectively.

$$R = f\tan\theta_{NA} \quad (3)$$

$$L = f\tan\theta'_{in} = f\tan\left[\sin^{-1}\left(\frac{n}{n'}\sin\theta_{min}\right)\right] \quad (4)$$

where f is the focal length of the objective lens, and $\sin\theta_{NA}$ is the numerical aperture on the sample side of the objective lens.

Figure 3:
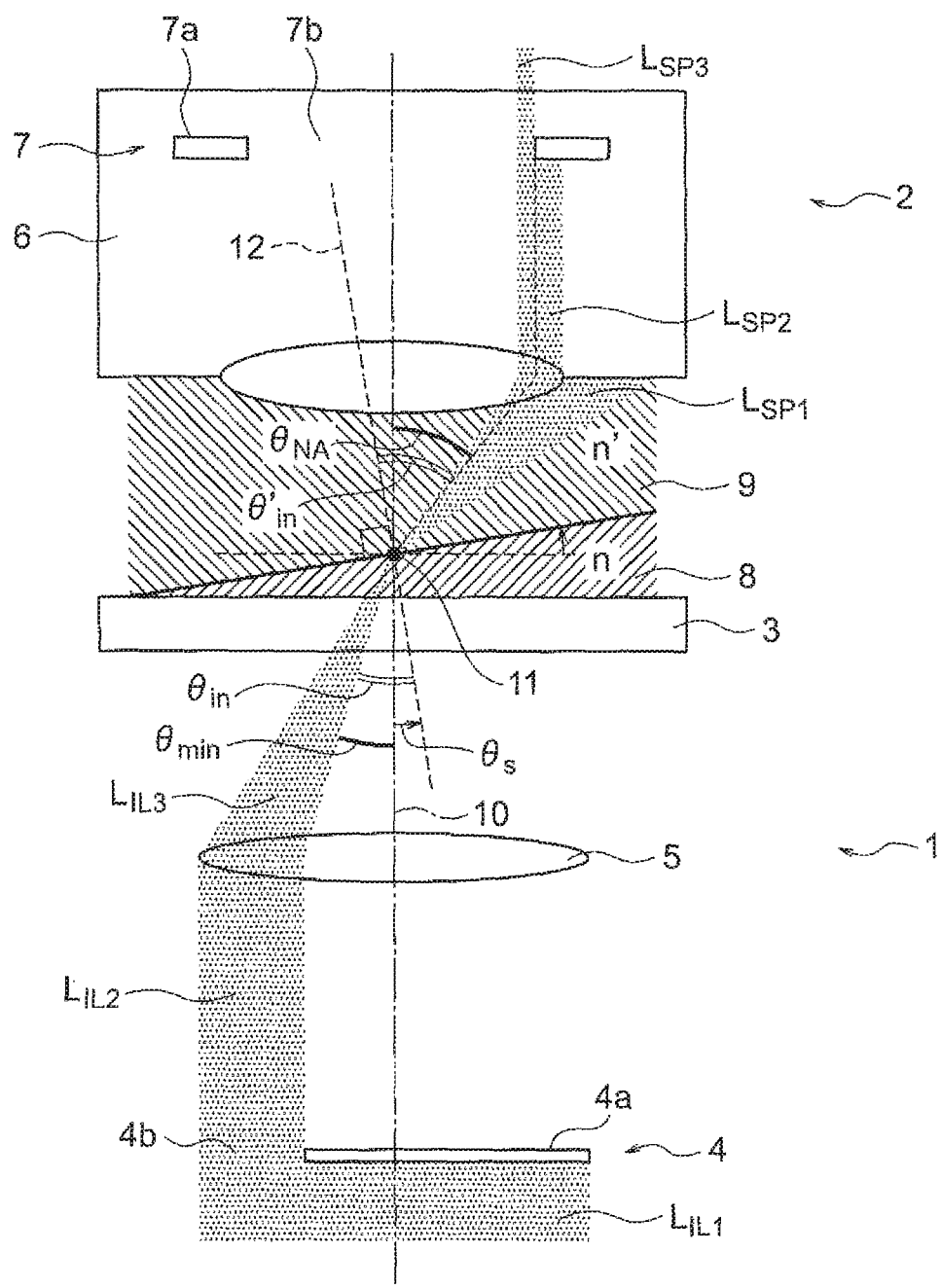
FIG. 3 is a diagram showing a state of illumination light and a state of imaging light in a second state.

Next, the relation between illumination light and imaging light in the second state will be described. The state of illumination light and the state of imaging light in the second state are shown in FIG. 3. In the second state, the surface of the sample is flat whereas the normal to the surface is non-parallel to the optical axis.

In a state in which the normal to the surface is non-parallel to the optical axis, the surface of the sample is inclined. As shown in FIG. 3, since the angle formed between the normal to the surface 12 and the optical axis 10 is $\theta_s$, it follows that the surface of the sample 8 is inclined by an inclination angle $\theta_s$. It is assumed that the angle is positive when the normal to the surface 12 is positioned in a counter-clockwise direction with respect to the optical axis 10, and the angle is negative when the normal to the surface 12 is positioned in a clockwise direction. In the second state, $\theta_s$ is a positive value.

Light emitted from the sample 8 reaches the objective lens 6. Of imaging light $L_{SP1}$ that reaches the objective lens 6, part of the imaging light is shaded by the effective aperture of the objective lens 6 and the remaining imaging light is incident on the objective lens 6.

Here, in the second state, the surface of the sample 8 is inclined by an inclination angle $+\theta_s$. In this case, the angle of refraction at the surface of the sample 8 is large. Thus, the position of imaging light $L_{SP1}$ incident on the objective lens 6 is shifted in a further outside direction compared with the first state. As a result, the size of light flux of imaging light $L_{SP2}$ incident on the objective lens 6 is smaller compared with the first state.

Of imaging light $L_{SP2}$ incident on the objective lens 6, part of the imaging light is shaded by the stop 7 and the remaining imaging light $L_{SP3}$ is emitted from the objective lens 6. Since the size of light flux of imaging light $L_{SP2}$ is smaller compared with the first state, the size of light flux of imaging light $L_{SP3}$ is also smaller compared with the first state.

Figure 4A:
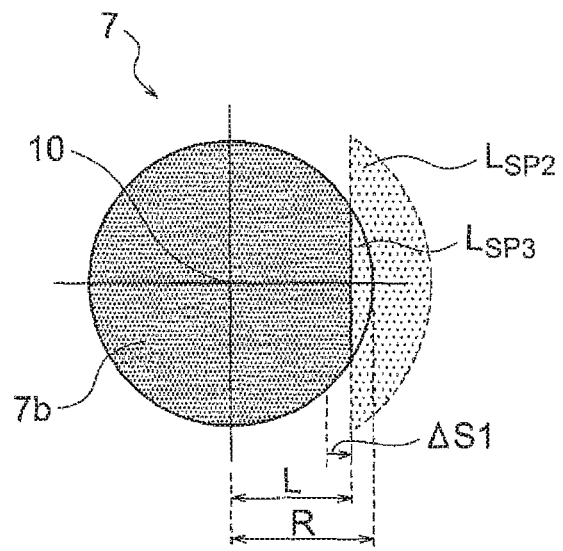
FIG. 4A is a diagram showing a state of illumination light in the second state.
Figure 4B:
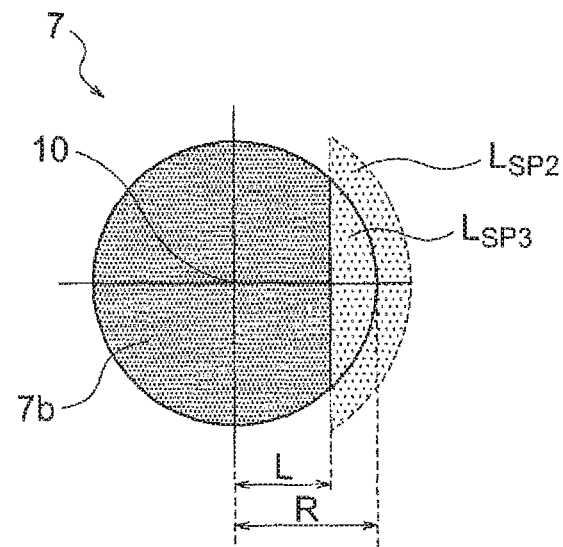
FIG. 4B is a diagram showing a state of imaging light in the second state.

The state of imaging light in the second state is shown in FIG. 4A. Furthermore, for the purpose of comparison, the state of imaging light in the first state is shown in FIG. 4B. In FIG. 4A and FIG. 4B, the light-shielding part 7a is not depicted.

As can be understood from the comparison between FIG. 4A and FIG. 4B, light flux of imaging light $L_{SP3}$ in the second state is shifted by $\Delta S1$ in a direction further away from the optical axis 10 than the position of light flux of imaging light $L_{SP3}$ in the first state. Thus, the size of light flux of imaging light $L_{SP3}$ in the second state is smaller compared with the first state. Therefore, in the second state, the quantity of light passing through the stop 7 decreases from the first state.

Figure 5:
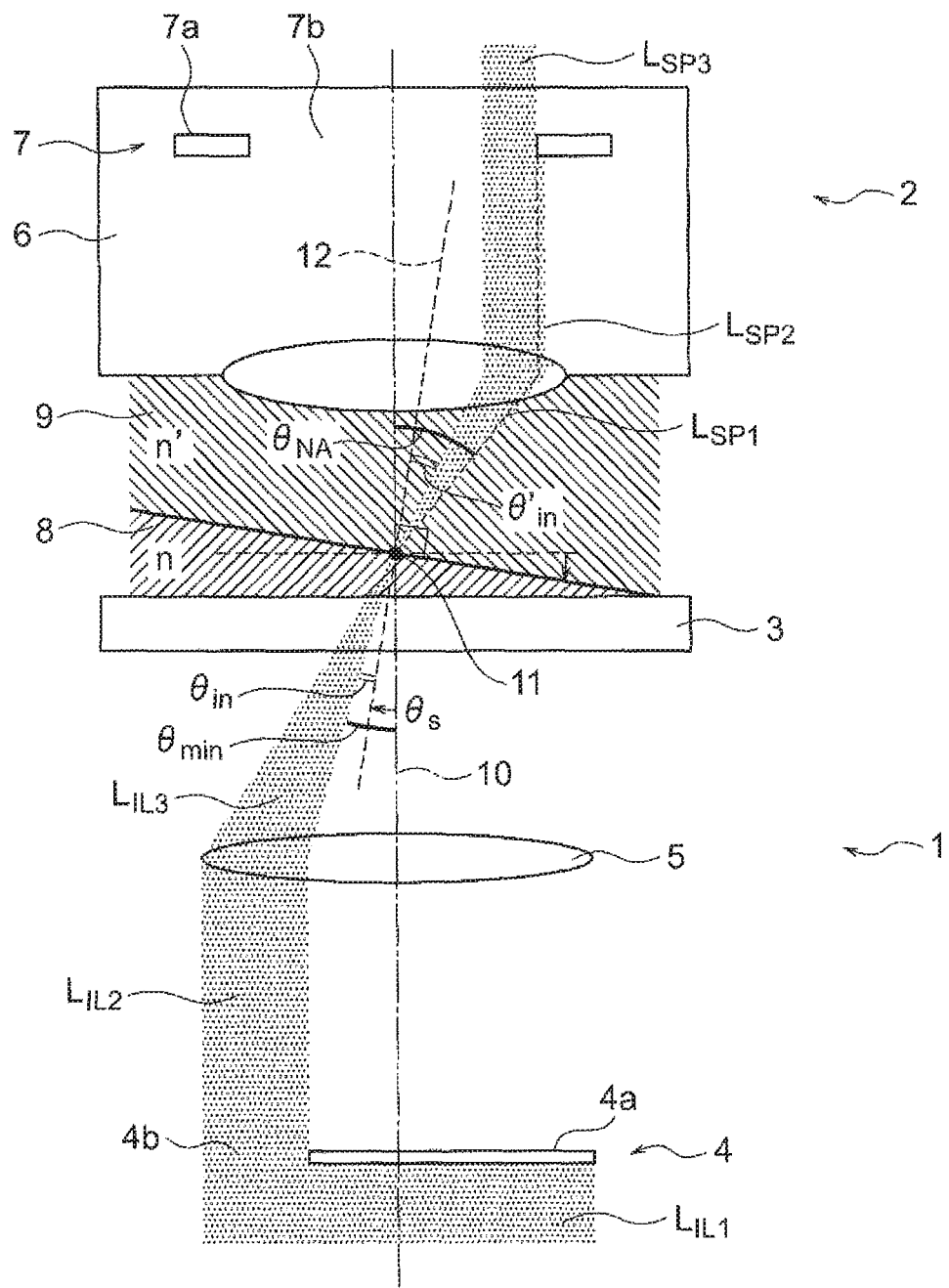
FIG. 5 is a diagram showing a state of illumination light and a state of imaging light in a third state.

Next, the relation between illumination light and imaging light in the third state will be described. The state of illumination light and the state of imaging light in the third state are shown in FIG. 5. In the third state, the surface of the sample is flat whereas the normal to the surface is non-parallel to the optical axis.

Also in the third state, the normal to the surface is non-parallel to the optical axis. As shown in FIG. 5, since the angle formed between the normal 12 and the optical axis 10 is $\theta_s$, it follows that the surface of the sample 8 is inclined by an inclination angle $\theta_s$. However, unlike the second state, $\theta_s$ is a negative value in the third state.

Light emitted from the sample 8 reaches the objective lens 6. Of imaging light $L_{SP1}$ that reaches the objective lens 6, part of the imaging light is shaded by the effective aperture of the objective lens 6 and the remaining imaging light is incident on the objective lens 6.

Here, in the third state, the surface of the sample 8 is inclined by an inclination angle $-\theta_s$. In this case, the angle of refraction at the surface of the sample 8 is small. Thus, the position of imaging light $L_{SP1}$ incident on the objective lens 6 is shifted in a further inside direction compared with the first state. As a result, the size of light flux of imaging light $L_{SP2}$ incident on the objective lens 6 is larger compared with the first state.

Of imaging light $L_{SP2}$ incident on the objective lens 6, part of the imaging light is shaded by the stop 7 and the remaining imaging light $L_{SP3}$ is emitted from the objective lens 6. Since the size of light flux of imaging light $L_{SP2}$ is larger compared with the first state, the size of light flux of imaging light $L_{SP3}$ is also larger compared with the first state.

Figure 6A:
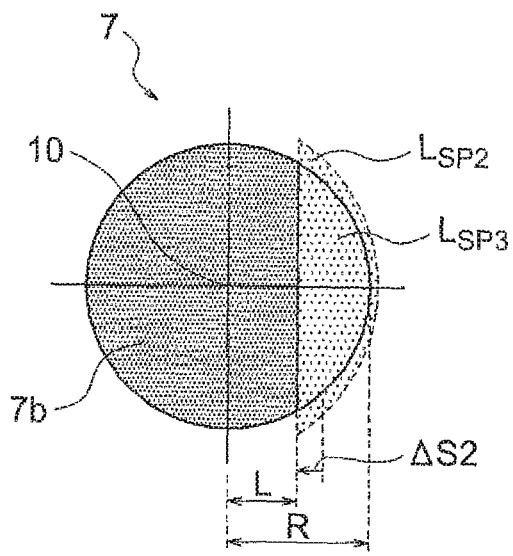
FIG. 6A is a diagram showing a state of illumination light in the third state.
Figure 6B:
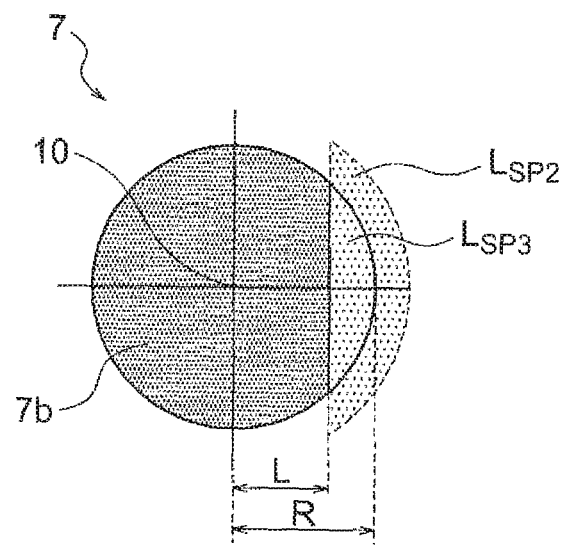
FIG. 6B is a diagram showing a state of imaging light in the third state.

The state of imaging light in the third state is shown in FIG. 6A. Furthermore, for the purpose of comparison, the state of imaging light in the first state is shown in FIG. 6B. In FIG. 6A and FIG. 6B, the light-shielding part 7a is not depicted.

As can be understood from comparison between FIG. 6A and FIG. 6B, the light flux of imaging light $L_{SP3}$ in the third state is shifted by $\Delta S2$ in a direction closer to the optical axis 10 from the position of light flux of imaging light $L_{SP3}$ in the first state. Thus, the size of light flux of imaging light $L_{SP3}$ in the third state is larger compared with the first state. Therefore, in the third state, the quantity of light passing through the stop 7 increases from the first state.

In the second state and the third state, Equation (5) below holds for predetermined light rays.

$$\theta'_{in} - \theta_s = \sin^{-1}\left(\frac{n}{n'}\sin\theta_{in}\right) - \theta_s \tag{5}$$

where $\theta'_{in}$ is the angle formed between the predetermined light rays and the normal to the sample, $\theta_s$ is the angle formed between the normal to the surface of the sample and the optical axis, $\theta_{min}$ is the angle formed between the predetermined light rays and the optical axis on the illumination optical system side, n is the refractive index of the sample, n' is the refractive index of the immersion liquid, and the angle is positive when the normal to the surface of the sample is positioned in a counter-clockwise direction with respect to the optical axis, and the angle is negative when the normal to the surface of the sample is positioned in a clockwise direction with respect to the optical axis.

For example, when the sample is inclined in the direction shown in FIG. 3, the rotation direction of the normal to the surface is a positive direction and $\theta_s$ has a positive value. On the other hand, when the sample is inclined in the direction shown in FIG. 5, the rotation direction of the normal to the surface is a negative direction and $\theta_s$ has a negative value.

Here, the area S of the imaging light emitted from the objective lens is represented by Equation (6) below.

$$S = R^2 \cos^{-1}\left(\frac{L}{R}\right) - L^2 \tan\left(\cos^{-1}\left(\frac{L}{R}\right)\right) \tag{6}$$

where R is represented by Equation (3) above and L is represented by Equation (7) below.

$$L = f\tan(\theta'_{in} - \theta_s) = f\tan\left[\sin^{-1}\left(\frac{n}{n'}\sin\theta_{in}\right) - \theta_s\right] \tag{7}$$

In Equation (7), if $\theta_{in}=\theta_{min}$ and $\theta_s=0$, then the right side of Equation (7) is the same as the right side of Equation (4). In this case, the right side of Equation (6) is also the same as the right side of Equation (2). Therefore, the area S and the inclination angle $\theta_s$ can be represented by Equations (3), (6), and (7).

Figure 7:
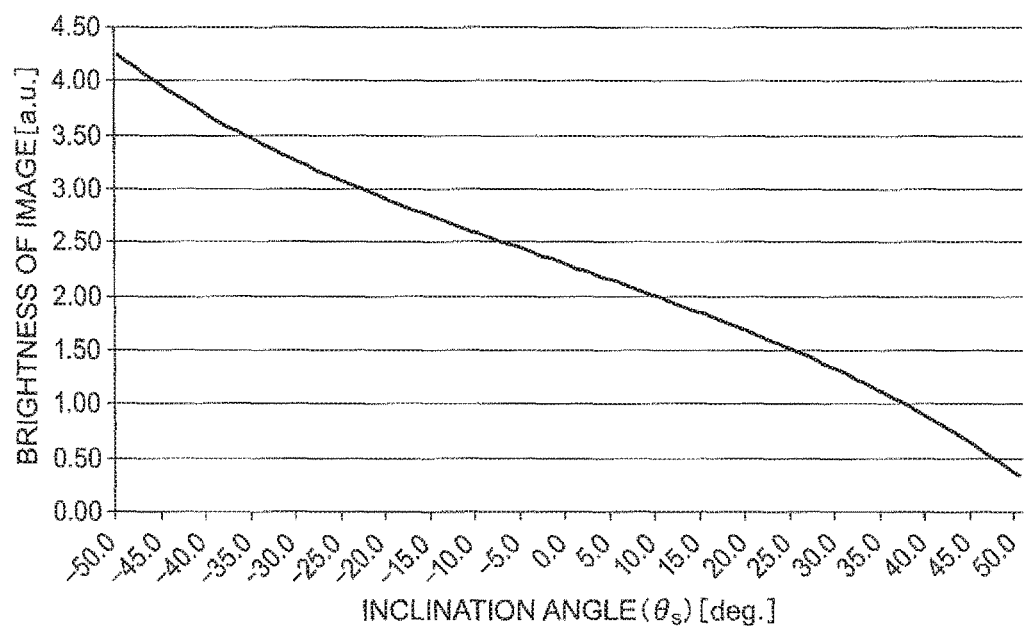
FIG. 7 is a graph showing the relation between inclination angle $\theta_s$ and area S.

The graph representing the relation between the inclination angle $\theta_s$ and the area S is shown in FIG. 7. The imaging light emitted from the objective lens is collected, for example, by an imaging lens. At the light-collecting position, an image of the sample 8 is formed. When the area S of the imaging light emitted from the objective lens changes, the brightness of the image of the sample 8 changes. Furthermore, when the inclination angle $\theta_s$ changes, the tilt angle of the surface of the sample relative to the optical axis changes. Then, in the graph shown in FIG. 7, the tilt angle is replaced by the inclination angle $\theta_s$ and the brightness of the image is replaced by the area S to show the relation between the tilt angle and the brightness of the image.

Furthermore, the values of the parameters are as follows.
n'=1.33,
n=1.35,
f=18 [mm],
$\theta_{NA}$=9.2 [deg.] (NA=0.16),
$\theta_{min}$=6.5 [deg.]

As can be understood from the curve representing the relation between the inclination angle $\theta_s$ and the area S (hereinafter referred to as "characteristic curve"), as the value of the inclination angle $\theta_s$ increases, the brightness of the image decreases monotonously. In this way, the brightness of the image and the inclination angle $\theta_s$ are in one-to-one correspondence.

Then, illumination light deflected in a certain direction is applied to a sample, and a two-dimensional image of the sample is obtained. Then, information of the quantity of light (brightness) is obtained for each pixel of the obtained two-dimensional image. Here, the refractive index (average refractive index) n of the sample, the refractive index n' of the immersion liquid, the focal length f of the objective lens, the numerical aperture $\theta_{NA}$ on the sample side of the objective lens, and the angle $\theta_{min}$ are known. Therefore, they can be used to derive the inclination angle $\theta_s$ for each pixel. That is, it is possible to derive the distribution of the amount of tilt in the surface of the sample.

In this way, in the principle of measurement in the sample shape measuring method of the present embodiment, illumination light deflected in a certain direction is merely applied to a sample. Thus, in derivation of the distribution of the amount of tilt in the surface of the sample, light emitted from the sample, that is, light transmitted through the sample is merely utilized, and the contrast of an image or the interference between non-diffracted light and diffracted light is not utilized. Therefore, according to the sample shape measuring method of the present embodiment, even for a sample in which the reflectance of the surface is low and the surface shape is smooth, it is possible to measure the amount of tilt in the surface of the sample with high accuracy. Furthermore, it is possible to measure the surface shape of the sample with high accuracy by using the measured amount of tilt.

A sample shape measuring method of the present embodiment will be described. First, a measurement method serving as the basis (hereinafter referred to as "basic measurement method") will be described. Thereafter, the sample shape measuring method of preferable embodiments will be described. In the following description, the pupil 7 of the objective lens is used in place of the stop 7.

The basic measurement method includes a step of preparing illumination light passing through a predetermined illumination region, a step of applying the illumination light to a sample, and a predetermined processing step. The predetermined illumination region is set so as not to include an optical axis at a pupil position of an illumination optical system and is set such that illumination light is applied to part of the inside of the pupil and the outside of the pupil at a pupil position of an observation optical system. The illumination light is transmitted through the sample. The light emitted from the sample is incident on the observation optical system. The predetermined processing step includes a step of receiving the light emitted from the observation optical system, a step of obtaining the quantity of light of the received light, a step of calculating the difference or the ratio between the quantity of light and a reference quantity of light, and a step of calculating the amount of tilt in a surface of the sample from the difference or the ratio.

Figure 8:
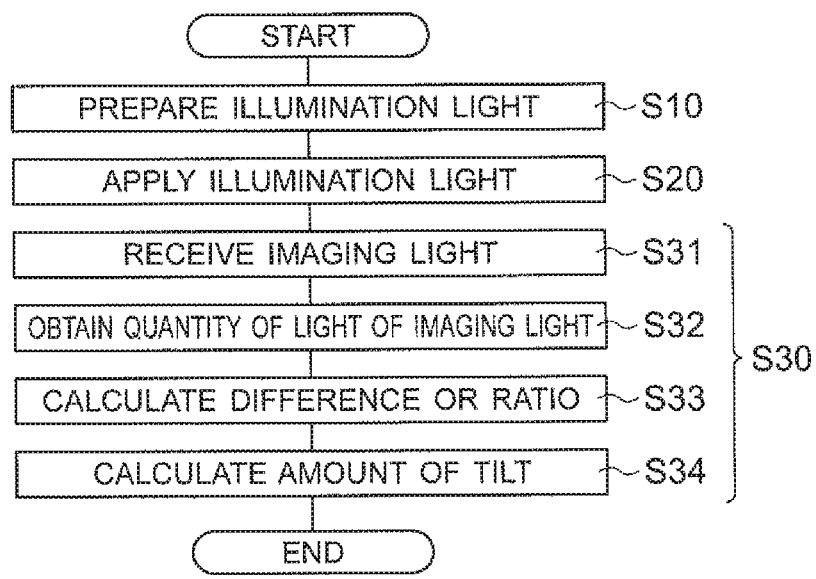
FIG. 8 is a flowchart of a basic measurement method.

The basic measurement method will be described. FIG. 8 is a flowchart of the basic measurement method. The basic measurement method includes step S10 of preparing illumination light, step S20 of applying the illumination light, and predetermined processing step S30. The predetermined processing step S30 includes step S31 of receiving imaging light, step S32 of obtaining the quantity of light of the imaging light, step S33 of calculating the difference or the ratio, and step S34 of calculating the amount of tilt.

In the basic measurement method, first of all, step S10 is executed. Step S10 is a step of preparing illumination light. In step S10, a predetermined illumination region is set in the illumination optical system. The predetermined illumination region is a region where illumination light passes through. The predetermined illumination region is the transmission region 4b shown in FIG. 1. The predetermined illumination region is set by disposing the light-shielding member 4 in the optical path of the illumination optical system 1. Here, the light-shielding member 4 is disposed so as to include the optical axis 10 and to shield part of light flux of illumination light $L_{IL1}$.

Furthermore, the light-shielding member 4 is disposed at the pupil position of the illumination optical system 1, specifically, the pupil position of the condenser lens 5. The position of the pupil of the condenser lens 5 is conjugate to the pupil position of the observation optical system 2, specifically, the position of the pupil 7 of the objective lens. Therefore, an image of the predetermined illumination region is formed at the position of the pupil 7 of the objective lens. Here, the image of the predetermined illumination region is formed so as to be distributed in both the inside and the outside of the pupil 7 of the objective lens.

In this way, the predetermined illumination region is set at the pupil position of the illumination optical system so as not to include the optical axis and is set such that the illumination light passing through the predetermined illumination region is applied to part of the inside of the pupil and the outside of the pupil at the pupil position of the observation optical system.

When step S10 is finished, step S20 is executed. Step S20 is a step of applying illumination light. In step S20, illumination light is applied to a sample. Here, oblique illumination light is applied to a sample. That is, illumination light is applied to a sample such that light flux intersects the optical axis at the sample position, and is transmitted through the sample. The sample is illuminated whereby imaging light is emitted from the sample. The light emitted from the sample is incident on the observation optical system.

When step S20 is finished, step S30 is executed. Step S30 is a step of performing predetermined processing. In step S30, step S31, step S32, step S33, and step S34 are executed.

In step S30, first, step S31 is executed. Step S31 is a step of receiving imaging light. The imaging light is the light emitted from the observation optical system.

When step S31 is finished, step S32 is executed. Step S32 is a step of obtaining the quantity of light of the imaging light. The quantity of light of the imaging light is the quantity of light received in step S31.

When step S32 is finished, step S33 is executed. Step S33 is a step of calculating the difference or the ratio. In step S33, the difference or the ratio between the quantity of light received in step S31, that is, the quantity of light of the imaging light and a reference quantity of light is calculated.

When step S33 is finished, step S34 is executed. Step S34 is a step of calculating the amount of tilt. In step S34, the amount of tilt in the surface of the sample is calculated from the result of calculation in step S33.

In this way, in the basic measurement method, illumination light deflected in a certain direction is merely applied to a sample. Thus, in derivation of the distribution of the amount of tilt in the surface of the sample, light emitted from the sample, that is, light transmitted through the sample is merely utilized, and the contrast of an image or the interference between non-diffracted light and diffracted light is not utilized. The sample shape measuring method of the present embodiment uses this basic measurement method. Therefore, according to the sample shape measuring method of the present embodiment, even for a sample in which the reflectance of the surface is low and the surface shape is smooth, it is possible to measure the amount of tilt in the surface of the sample with high accuracy. Furthermore, as will be described later, by using the measured amount of tilt, it is possible to measure the surface shape of the sample with high accuracy.

It is preferable that a sample shape measuring method of a first embodiment include the basic measurement method, and it is preferable that in the predetermined illumination region, a surface light source be disposed or an image of a surface light source be formed, and in the step of receiving light, the light emitted from the observation optical system be received by a plurality of minute regions.

The sample shape measuring method of the first embodiment will be described. In the sample shape measuring method of the first embodiment, in the predetermined illumination region, a surface light source is disposed or an image of a surface light source is formed. Then, in step S31 of receiving imaging light, light emitted from the observation optical system is received by a plurality of minute regions.

Figure 9:
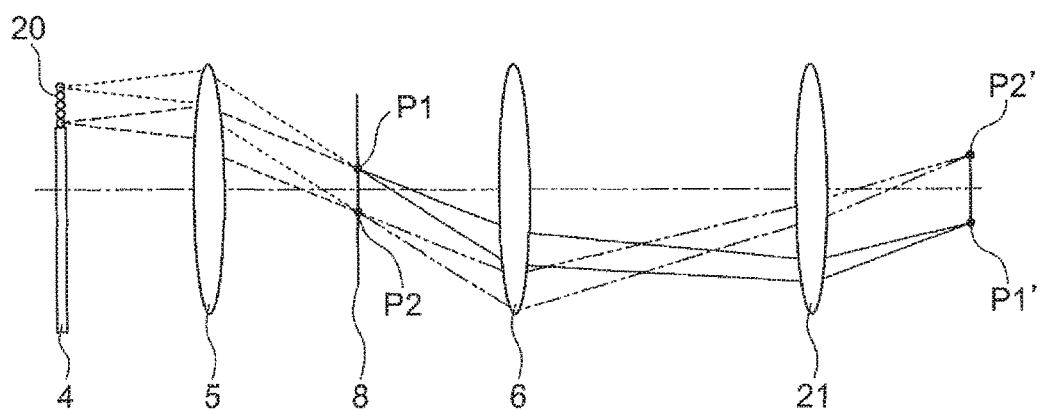
FIG. 9 is a diagram showing an optical system when a sample shape measuring method of a first embodiment is performed.

FIG. 9 is a diagram showing an optical system when the sample shape measuring method of the first embodiment is performed. In the optical system shown in FIG. 9, a surface light source 20 is disposed in a predetermined illumination region. Furthermore, illumination light emitted from both ends of the surface light source 20 is shown. Illumination light emitted from one end of the surface light source 20 is shown by a dotted line, and illumination light emitted from the other end of the surface light source 20 is shown by a dashed line.

The illumination light shown by the dotted line and the illumination light shown by the dashed line are both emitted in the form of parallel light flux from the condenser lens 5. Therefore, the sample 8 is illuminated with illumination light with spread illumination light.

Imaging light is emitted from the illuminated sample 8. Imaging light emitted from a point P1 of the sample 8 is collected to an image position by the objective lens 6 and the imaging lens 21. An image P1' of the point P1 is formed at the image position. Imaging light emitted from a point P2 of the sample 8 is also collected to an image position by the objective lens 6 and the imaging lens 21. An image P2' of the point P2 is formed at the image position. In this way, a two-dimensional image is formed at the image position.

Figure 10:
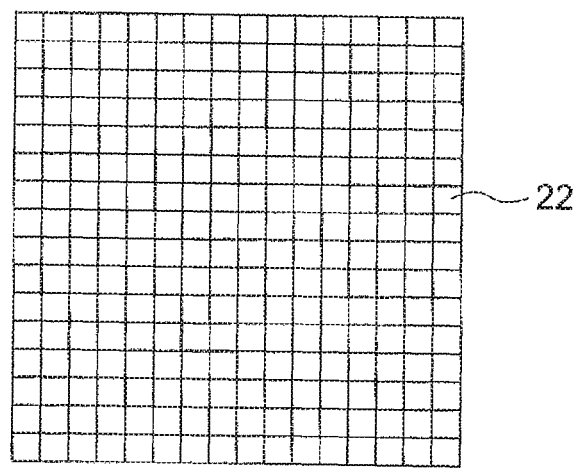
FIG. 10 is a diagram showing an example of minute regions.

In step S31, the imaging light is received by a plurality of minute regions. An example of the minute regions is shown in FIG. 10. In FIG. 10, 256 minute regions 22 are arranged in two dimensions.

In the sample shape measuring method of the first embodiment, a two-dimensional image is formed by light emitted from the observation optical system. In step S31, the light that forms a two-dimensional image is received by a plurality of minute regions. Therefore, in the sample shape measuring method of the first embodiment, the two-dimensional image is divided into a plurality of minute regions and received by each minute region. As a result, it is possible to measure the shape of the surface of the sample over a wide range one time.

It is preferable that a sample shape measuring method of a second embodiment include the sample shape measuring method of the first embodiment, and it is preferable that a step of obtaining the quantity of light, a step of calculating the difference or the ratio, and a step of calculating the amount of tilt be executed for each of the minute regions.

The sample shape measuring method of the second embodiment will be described. In the sample shape measuring method of the second embodiment, step S32, step S33, and step S34 are executed for each of the minute regions. By doing this, it is possible to improve the spatial resolution in a plane orthogonal to the optical axis. Therefore, it is possible to measure the surface shape of the sample with high spatial resolution.

It is preferable that a sample shape measuring method of a third embodiment include the sample shape measuring method of the first embodiment and a step of setting a range wider than one minute region as a predetermined region, and it is preferable that in the step of obtaining the quantity of light, the quantity of light obtained based on the minute regions included in the predetermined region be obtained as the quantity of light in the predetermined region, in the step of calculating the difference or the ratio, the difference or the ratio between the quantity of light in the predetermined region and the reference quantity of light be calculated, in the step of calculating a tilt, the amount of tilt in the surface of the sample corresponding to the predetermined region be calculated, the predetermined region corresponds to one region when the surface of the sample is divided into a grid pattern, and the amount of tilt in the surface of the sample be calculated using the predetermined region as a unit.

Figure 11:
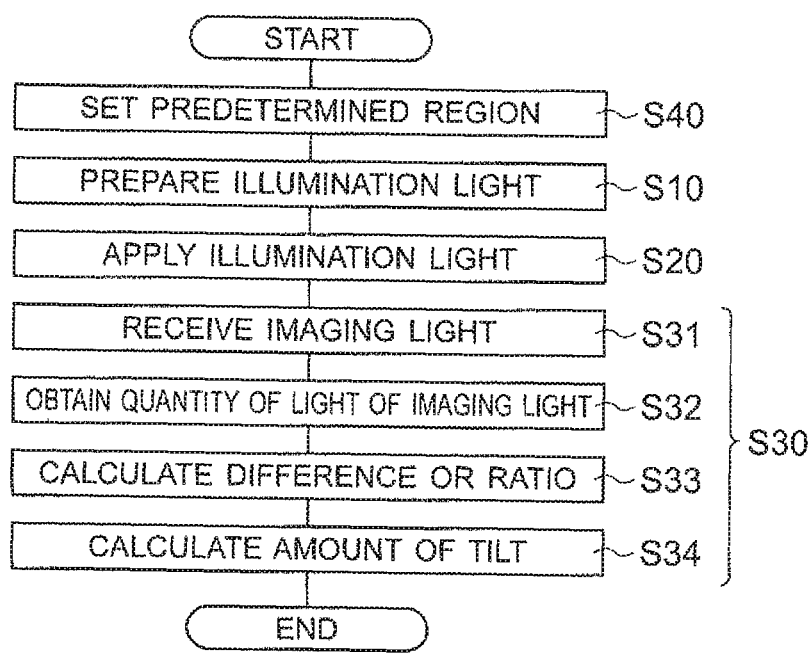
FIG. 11 is a flowchart of a sample shape measuring method of a third embodiment.

The sample shape measuring method of the third embodiment will be described. FIG. 11 is a flowchart of the sample shape measuring method of the third embodiment. The same step as in the flowchart in FIG. 8 is denoted by the same numeral and will not be further elaborated. The sample shape measuring method of the third embodiment includes step S40 of setting a predetermined region.

As described above, by calculating the amount of tilt for each of a plurality of minute regions, it is possible to measure the surface shape of the sample with high spatial resolution. However, if the quantity of light in a minute region is small, the SN ratio is deteriorated. As a result, it is difficult to calculate the amount of tilt in the surface of the sample with high accuracy.

Then, step S40 is executed first. Step S40 is a step of setting a predetermined region. In step S40, a range wider than one minute region is set as a predetermined region. In step S40, for example, a predetermined region may be set such that the area of the predetermined region is twice or more the area of one minute region.

Figure 12A:
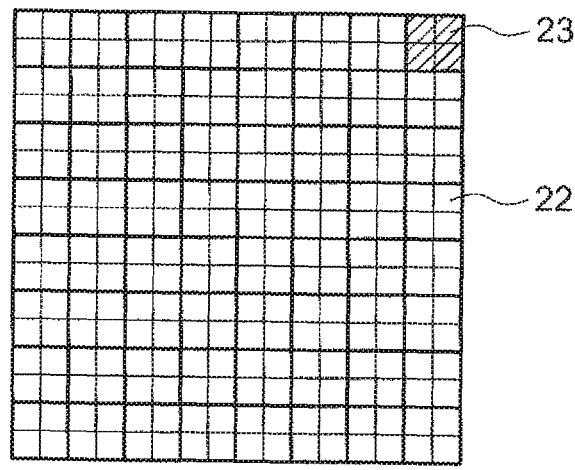
FIG. 12A is a diagram showing a setting example 1 of a predetermined region.
Figure 12B:
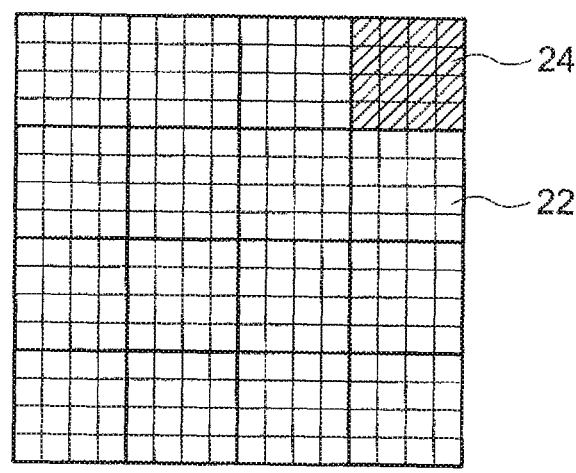
FIG. 12B is a diagram showing a setting example 2 of a predetermined region.

FIG. 12A is a diagram showing a setting example 1 of the predetermined region, and FIG. 12B is a diagram showing a setting example 2 of the predetermined region.

In the setting example 1, as shown in FIG. 12A, a predetermined region 23 consists of four minute regions 22. In this case, the quantity of light in the predetermined region 23 is the sum of the respective quantities of light in four minute regions 22. Thus, the quantity of light in the predetermined region 23 is larger than the quantity of light in one minute region 22.

As a result, the SN ratio is improved when the predetermined region 23 is set, compared with when the predetermined region 23 is not set, and, therefore, it is possible to calculate the amount of tilt in the surface of the sample with high accuracy. It is noted, however, that the spatial resolution in a plane orthogonal to the optical axis is reduced.

In the setting example 2, as shown in FIG. 12B, a predetermined region 24 consists of 16 minute regions 22. Also in this case, the SN ratio is improved when the predetermined region 24 is set, compared with when the predetermined region 24 is not set, and, therefore, it is possible to calculate the amount of tilt in the surface of the sample with high accuracy. It is noted, however, that the spatial resolution in a plane orthogonal to the optical axis is reduced.

The predetermined region 23 or the predetermined region 24 corresponds to one region when the surface of the sample is divided into a grid pattern. The area of the predetermined region 24 is larger than the area of the predetermined region 23. Therefore, as for the coarseness of division in the surface of the sample, the grid pattern corresponding to the predetermined region 24 is coarser than the pattern corresponding to the predetermined region 23.

When step S40 is finished, step S10 and step S20 are executed. When step S20 is finished, step S30 is executed. Since a predetermined region is set in the sample shape measuring method of the third embodiment, step S30 is executed based on the predetermined region.

In step S30, step S31 is executed. In the sample shape measuring method of the third embodiment, similar to the sample shape measuring method of the first embodiment, the imaging light is received by a plurality of minute regions. Therefore, the processing in step S31 is the same in the sample shape measuring method of the third embodiment and in the sample shape measuring method of the first embodiment.

When step S31 is finished, step S32 is executed. In step S32, the quantity of light of the imaging light is obtained. As described above, a predetermined region is set. Therefore, in step S32, the quantity of light obtained based on the minute regions included in the predetermined region is obtained as the quantity of light in the predetermined region.

When step S32 is finished, step S33 is executed. In step S33, the difference or the ratio is calculated. As described above, a predetermined region is set. Therefore, in step S33, the difference or the ratio between the quantity of light in the predetermined region and the reference quantity of light is calculated.

When step S33 is finished, step S34 is executed. In step S34, the amount of tilt is calculated. As described above, a predetermined region is set. Therefore, in step S34, the amount of tilt in the surface of the sample corresponding to the predetermined region is calculated from the result of calculation in step S33.

The predetermined region corresponds to one region when the surface of the sample is divided into a grid pattern. Therefore, in the sample shape measuring method of the third embodiment, the amount of tilt in the surface of the sample is calculated using the predetermined region as a unit.

According to the sample shape measuring method of the third embodiment, even when the surface shape of the sample is smooth, it is possible to measure the surface shape of the sample with high accuracy. Furthermore, since a predetermined region is set, the SN ratio is improved compared with when a predetermined region is not set. Therefore, it is possible to calculate the amount of tilt in the surface of the sample with high accuracy.

In the flowchart shown in FIG. 11, step S40 is executed first. However, step S40 only needs to be executed before execution of step S30.

A sample shape measuring method of a fourth embodiment includes the basic measurement method, and it is preferable that illumination light passing through the predetermined illumination region be parallel light flux.

The sample shape measuring method of the fourth embodiment will be described. The sample shape measuring method of the fourth embodiment includes the basic measurement method, and illumination light passing through the predetermined illumination region is parallel light flux.

Figure 13:
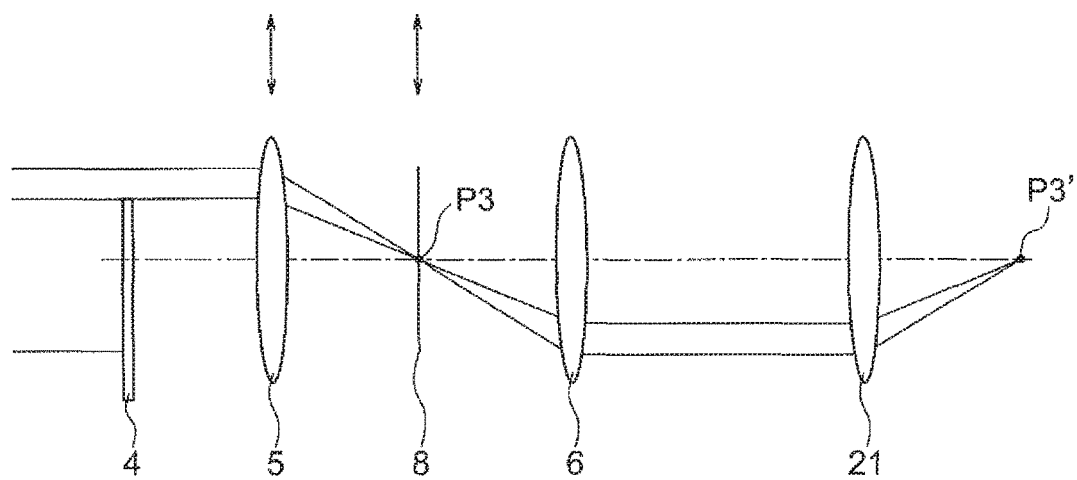
FIG. 13 is a diagram showing an optical system when a sample shape measuring method of a fourth embodiment is performed.

FIG. 13 is a diagram showing an optical system when the sample shape measuring method of the fourth embodiment is performed. In the optical system shown in FIG. 13, parallel light flux is applied to the light-shielding member 4. Therefore, illumination light passing through the predetermined illumination region is also parallel light flux.

The illumination light is incident on the condenser lens 5. The illumination light incident on the condenser lens 5 is collected to the position of the sample 8. Therefore, the sample 8 is illuminated with point-like illumination light.

From the illuminated sample 8, imaging light is emitted. Imaging light emitted from a point P3 of the sample 8 is collected to an image position by the objective lens 6 and the imaging lens 21. An image P3' of the point P3 is formed at the image position.

In this way, when illumination light passing through the predetermined illumination region is parallel light flux, illumination light is applied only to one point of the sample 8. In this case, the imaging light is also light only from one point of the sample 8. Thus, when step S30 is executed, calculated is the amount of tilt only at one point of the sample 8.

Furthermore, in the sample shape measuring method of the fourth embodiment, it is preferable that the illumination light and the sample be relatively moved in a plane orthogonal to the optical axis.

As described above, in the sample shape measuring method of the fourth embodiment, the amount of tilt only at one point of the sample 8 is calculated. Then, the illumination light and the sample are relatively moved in a plane orthogonal to the optical axis. Thus, it is possible to calculate the amount of tilt at a plurality of positions in the sample 8.

Furthermore, the basic measurement method and the sample shape measuring method of the first embodiment to the sample shape measuring method of the fourth embodiment (hereinafter referred to as "the sample shape measuring method of the present embodiment") may further include a step of calculating the shape of the sample from the amount of tilt and visualizing the shape of the sample from the calculated shape.

Figure 14:
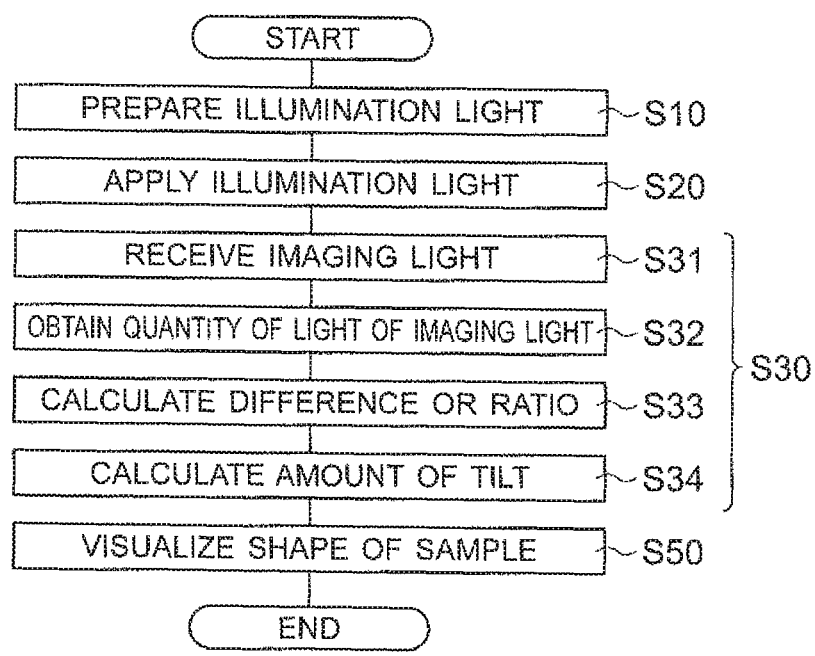
FIG. 14 is a flowchart of the sample shape measuring method of the present embodiment.

The sample shape measuring method of the present embodiment will be described. FIG. 14 is a flowchart of the sample shape measuring method of the present embodiment. The same step as in the flowchart in FIG. 8 is denoted by the same numeral and will not be further elaborated. The sample shape measuring method of the present embodiment includes the basic measurement method and step S50 of visualizing the shape of the sample.

In the sample shape measuring method of the present embodiment, when step S34 is finished, step S50 is executed. In step S50, the shape of the sample 8 is calculated from the amount of tilt, and the shape of the sample 8 is visualized from the calculated shape. By doing this, it is possible to visually grasp the shape of the sample. Step S30 may include step S50.

Furthermore, in the sample shape measuring method of the present embodiment, it is preferable that the reference quantity of light be a quantity of light in a state in which no sample is present.

When the same sample is illuminated with illumination light with different quantities of light, the quantity of light of the imaging light also varies. Thus, if the amount of tilt is calculated using the quantity of light of the imaging light alone, the surface shape changes with the quantity of light of the illumination light even though the sample is the same. Then, in the sample shape measuring method of the present embodiment, the difference or the ratio between the quantity of light of the imaging light and the reference quantity of light is calculated. By doing this, it is possible to precisely obtain the surface shape of the sample even when the quantity of light of the illumination light changes.

Since a reference quantity of light is the quantity of light in a state in which no sample is present, the reference quantity of light is the quantity of light of the illumination light. Therefore, by calculating the difference or the ratio to the quantity of light of the imaging light using the reference quantity of light, it is possible to precisely obtain the surface shape of the sample even when the quantity of light of the illumination light changes.

Furthermore, it is preferable that the sample shape measuring method of the present embodiment include a step of setting the reference quantity of light between the step of preparing illumination light and the step of applying the illumination light to a sample.

Figure 15:
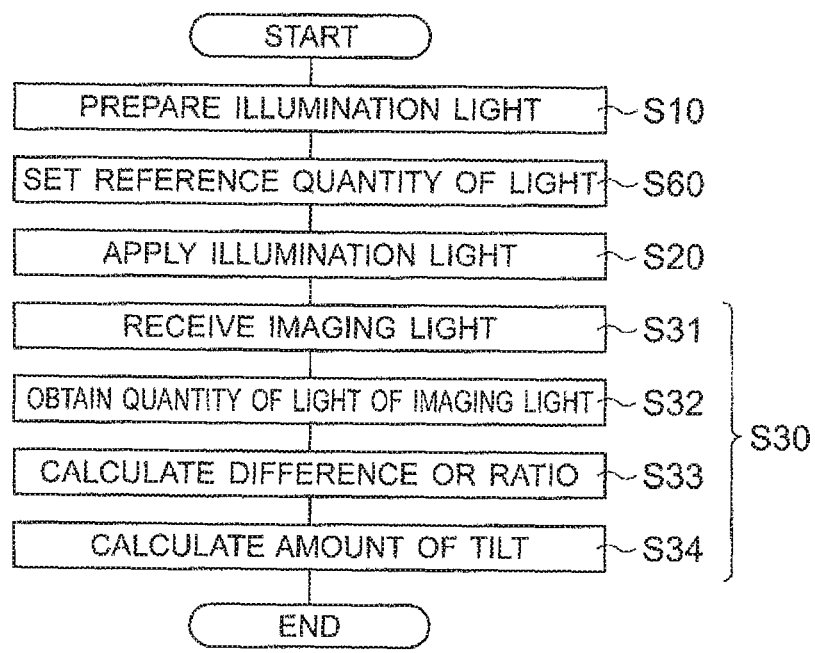
FIG. 15 is a flowchart of the sample shape measuring method of the present embodiment.

The sample shape measuring method of the present embodiment will be described. Here, a description will be given using the basic measurement method. FIG. 15 is a flowchart of the sample shape measuring method of the present embodiment. The same step as in the flowchart in FIG. 8 is denoted by the same numeral and will not be further elaborated. The sample shape measuring method of the present embodiment includes step S60 of setting the reference quantity of light between step S10 of preparing illumination light and step S20 of applying illumination light.

When step S10 is finished, step S60 is executed. In step S60, the reference quantity of light is set. As described above, the reference quantity of light is the quantity of light in a state in which no sample is present. In step S33, the difference or the ratio to the quantity of light of the imaging light is calculated using the reference quantity of light. Thus, it is possible to precisely obtain the surface shape of the sample even when the quantity of light of the illumination light changes.

When step S60 is finished, a sample is placed on the stage. Then, step S20 is executed.

Furthermore, in the sample shape measuring method of the present embodiment, it is preferable that, in the step of setting the reference quantity of light, the quantity of light be measured by applying illumination light emitted from the illumination optical system to the observation optical system, and the reference quantity of light be set based on the measured quantity of light.

In step S60, the quantity of light is measured by applying illumination light emitted from the illumination optical system to the observation optical system in a state in which no sample is present. Thus, it is possible to obtain the quantity of light in a state in which no sample is present. Then, the reference quantity of light is set based on the measured quantity of light.

Furthermore, in the sample shape measuring method of the present embodiment, it is preferable that measurement of the quantity of light be performed before the initial measurement of the sample.

By doing so, the reference quantity of light is measured immediately before the sample shape is measured. Thus, it is possible to increase the accuracy of the difference or the ratio calculated in step S33. As a result, it is possible to precisely calculate the amount of tilt.

Furthermore, in the sample shape measuring method of the present embodiment, it is preferable that the measured quantity of light be stored, and the reference quantity of light be set by reading the quantity of light stored before the initial measurement of the sample.

By doing so, it becomes unnecessary to measure the reference quantity of light every time a sample shape is to be measured. Therefore, it is possible to reduce the measurement time.

Furthermore, in the sample shape measuring method of the present embodiment, it is preferable that, in the step of calculating the amount of tilt, the amount of tilt be calculated based on a correspondence relation obtained in advance.

As described above, in the sample shape measuring method of the present embodiment, the amount of tilt is calculated based on the quantity of light of the imaging light. Then, the correspondence relation between the quantity of light of the imaging light and the amount of tilt is obtained in advance. By doing this, it is possible to quickly calculate the amount of tilt from the obtained quantity of light of the imaging light, based on the correspondence relation.

Furthermore, in the sample shape measuring method of the present embodiment, it is preferable that the correspondence relation be represented by a lookup table including the quantity of light and the amount of tilt as parameters.

Figure 16:
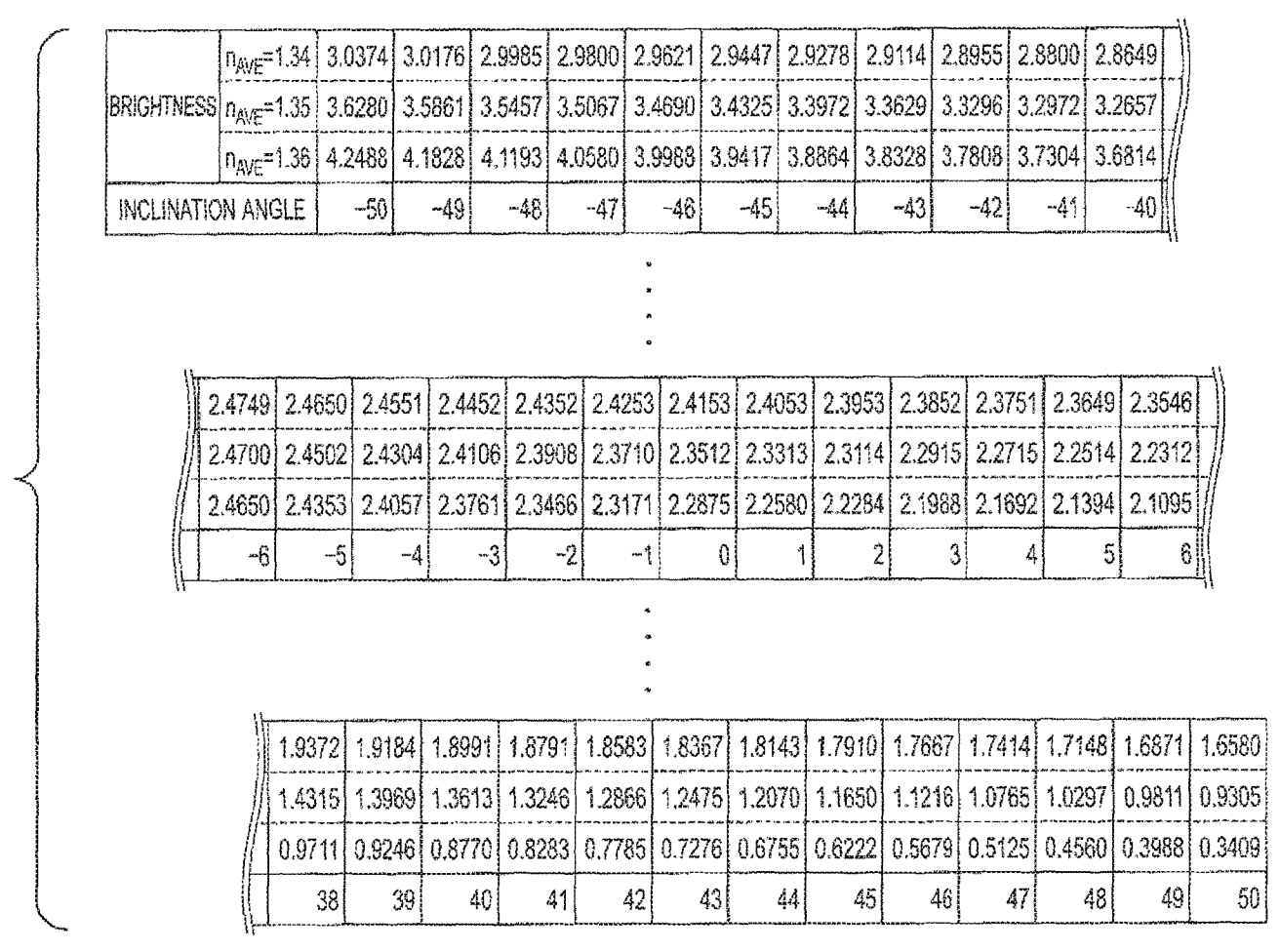

FIG. 16 is an example of the lookup table. As shown in FIG. 16, the lookup table has brightness and inclination angle as parameters. The brightness represents the quantity of light of the imaging light, and the inclination angle represents the amount of tilt in the surface of the sample.

To create a lookup table, the refractive index of the sample is necessary. When the sample is a cell, various substances are present in the cell. Thus, the refractive index of the cell as a whole is a refractive index obtained by averaging the refractive indices of these substances (hereinafter referred to as "average refractive index $n_{AVE}$ of a cell"). The average refractive index $n_{AVE}$ of a cell changes depending on the kinds of substances present in the cell. Therefore, the value of the average refractive index $n_{AVE}$ of a cell is not limited to one.

Furthermore, for example, when the sample is a cell, culture liquid or preservative solution may be present around the cell. Thus, to create a lookup table, the refractive index of the culture liquid or the refractive index of the preservative solution is necessary.

The lookup table shown in FIG. 16 is a lookup table in a case where the sample is a cell. In this lookup table, the table is created by setting the refractive index of the culture liquid or the refractive index of the preservative solution as 1.33. Furthermore, three refractive indices (1.34, 1.35, 1.36) are assumed for the average refractive index $n_{AVE}$ of the cell, and the results obtained from the refractive indices are summarized in one table.

In step S33, the difference or the ratio between the quantity of light of the imaging light and the reference quantity of light is calculated. The calculated value represents the quantity of light of the imaging light. Then, the brightness in the lookup table is searched for the value matching the calculated value. If the value matching the calculated value is found, the inclination angle corresponding to the found value is obtained from the lookup table. Thus, it is possible to quickly obtain the amount of tilt in the surface of the sample.

On the other hand, the value matching the calculated value may not exist in the lookup table. In this case, two values closest to the calculated value are extracted from among the brightness in the lookup table. Then, the inclination angle is obtained using the extracted two values. Thus, it is possible to obtain the amount of tilt in the surface of the sample.

Furthermore, in the sample shape measuring method of the present embodiment, it is preferable that the correspondence relation be represented by an expression including the quantity of light and the amount of tilt as parameters.

As described above, the area S of the imaging light emitted from the objective lens and the inclination angle $\theta_s$ are represented by Equations (3), (6), and (7). The area S represents the quantity of light of the imaging light, and the inclination angle $\theta_s$ represents the amount of tilt in the surface of the sample.

In step S33, the difference or the ratio between the quantity of light of the imaging light and the reference quantity of light is calculated. The calculated value represents the quantity of light of the imaging light. Then, the inclination angle $\theta_s$ is obtained by substituting the calculated value into the area S. By doing this, it is possible to obtain the amount of tilt in the surface of the sample.

Furthermore, in the sample shape measuring method of the present embodiment, it is preferable that the predetermined illumination region be set such that an image of the predetermined illumination region includes part of the edge of the pupil.

By doing this, it is possible to obtain the direction of tilt of the surface of the sample and the amount of tilt.

Furthermore, it is preferable that the sample shape measuring method of the present embodiment include a step of changing a position of the predetermined illumination region, the step of changing a position be executed after the predetermined processing step for the first time is finished, by execution of the step of changing a position, the position of the predetermined illumination region move to a position different from the position when the processing step for the first time is executed, and the predetermined processing step for the second time be executed after the step of changing a position is finished.

Figure 17:
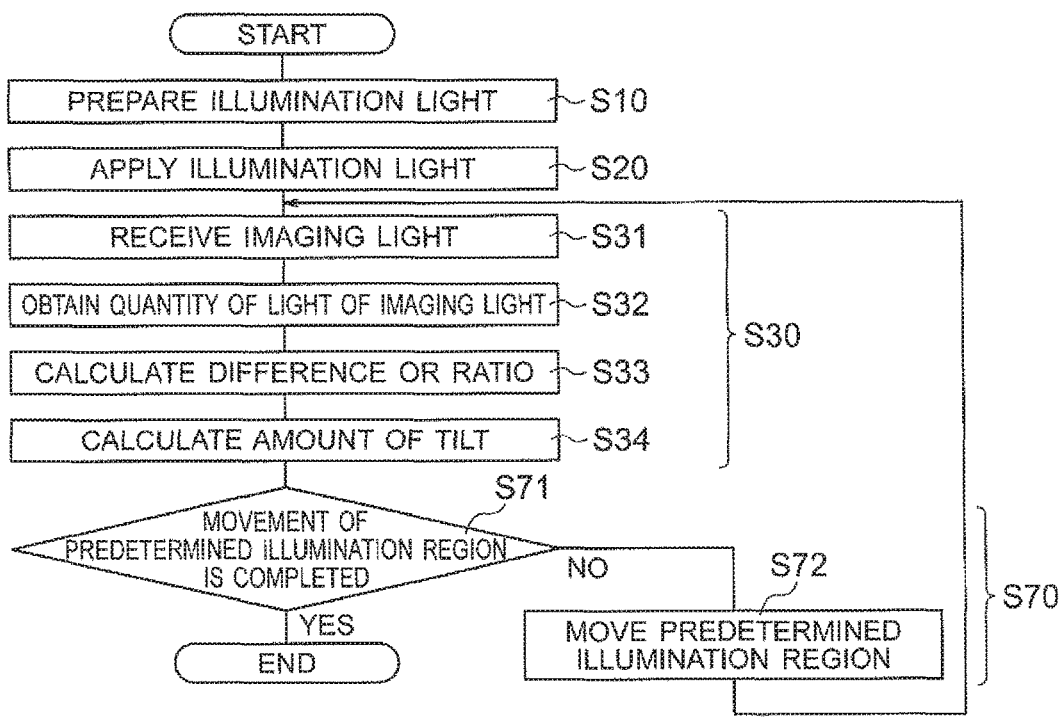
FIG. 17 is a flowchart of the sample shape measuring method of the present embodiment.

The sample shape measuring method of the present embodiment will be described. FIG. 17 is a flowchart of the sample shape measuring method of the present embodiment. The same step as in the flowchart in FIG. 8 is denoted by the same numeral and will not be further elaborated.

The sample shape measuring method of the present embodiment includes step S70 of changing the position of the predetermined illumination region. Step S70 includes step S71 of confirming the movement of the predetermined illumination region and step S72 of moving the predetermined illumination region.

Figure 18A:
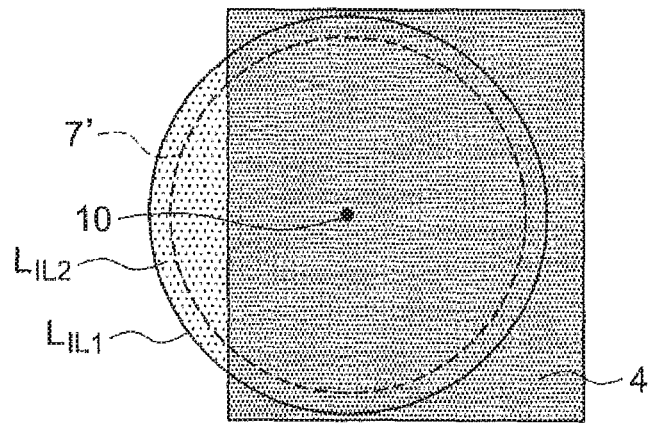
FIG. 18A is a diagram showing a state of illumination light in a first position.
Figure 18B:
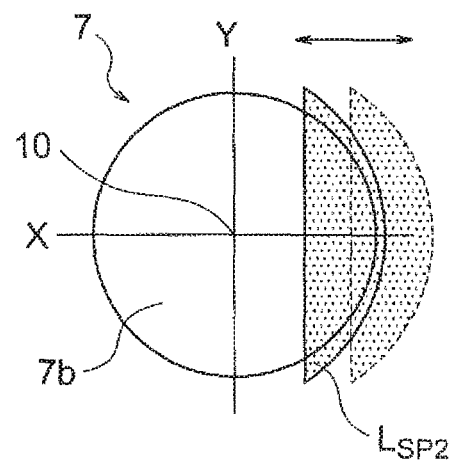
FIG. 18B is a diagram showing a state of movement of imaging light in the first position.
Figure 19A:
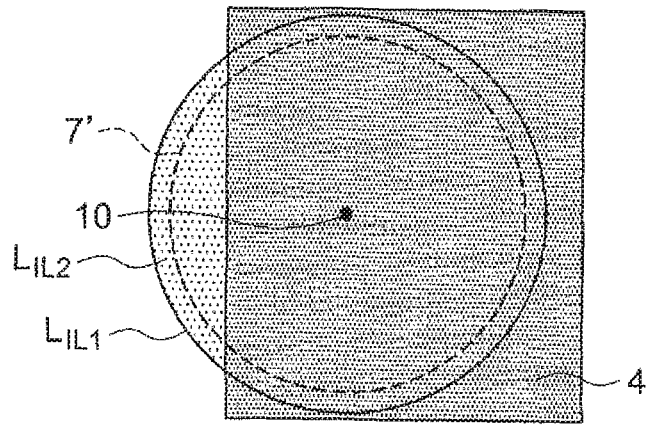
FIG. 19A is a diagram showing a state of illumination light in the first position.
Figure 19B:
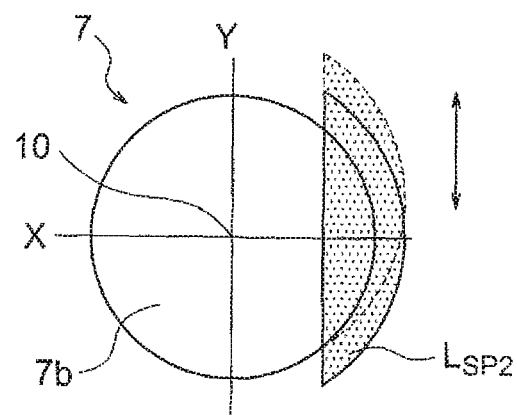
FIG. 19B is a diagram showing a state of movement of imaging light in the first position.

In step S10, a predetermined illumination region is set at any given position in the illumination optical system. Here, it is assumed that the position set in step S10 is the first position. The state of illumination light at the first position is shown in FIG. 18A and FIG. 19A. Furthermore, the state of movement of the imaging light at the first position is shown in FIG. 18B and FIG. 19B. Here, it is assumed that the left-right direction in the drawing sheet is the X direction and the top-bottom direction in the drawing sheet is the Y direction. Furthermore, illumination light $L_{IL2}$ represents a predetermined illumination region.

As shown in FIG. 18A, in the first position, illumination light $L_{IL2}$ is positioned on the left side relative to the optical axis 10 on the X axis. On the other hand, as shown in FIG. 18B, in the first position, imaging light $L_{SP2}$ is positioned on the right side relative to the optical axis 10 on the X axis. Thus, as for the X direction, the quantity of light of imaging light $L_{SP2}$ changes even when imaging light $L_{SP2}$ slightly moves. Therefore, at the first position, it is possible to obtain the amount of tilt in the surface of the sample for the X direction.

Then, at the first position, step S30 is executed. This step S30 is the predetermined processing step for the first time. Thus, the amount of tilt in the surface of the sample is obtained for the X direction.

On the other hand, as shown in FIG. 19B, in the first position, for the Y direction, the quantity of light of imaging light $L_{SP2}$ does not change unless imaging light $L_{SP2}$ moves to the position indicated by the dashed line. Therefore, for Y direction, there arises a range in which it is impossible to obtain the amount of tilt in the surface of the sample, in the first position.

Figure 20:
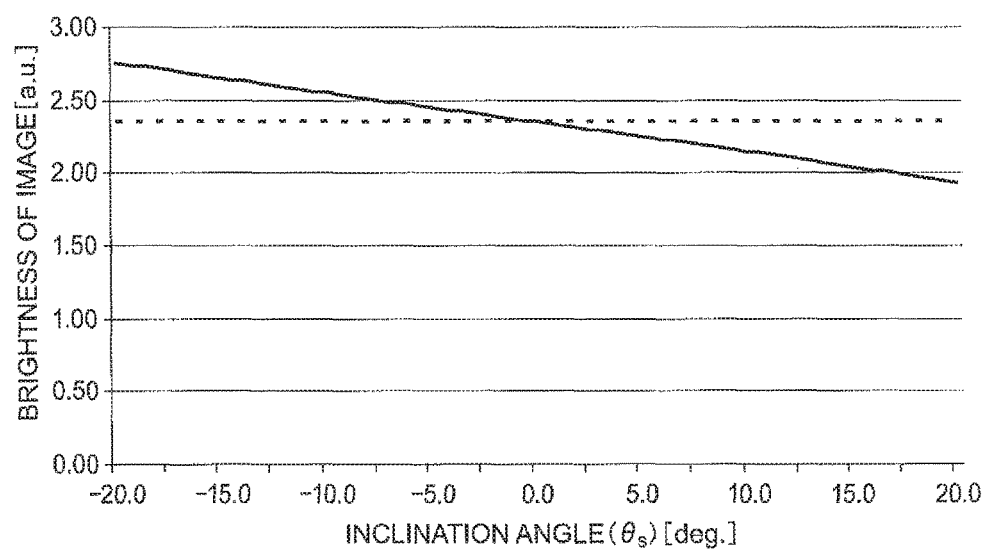
FIG. 20 is a graph showing the relation between inclination angle $\theta_s$ and area S in the first position.

The graph representing the relation between the inclination angle $\theta_s$ and the area S in the first position is shown in FIG. 20. The inclination angle $\theta_s$ represents the amount of tilt in the surface of the sample in the same manner as in FIG. 7. Furthermore, the brightness of the image represents the area S, that is, the quantity of light of the imaging light. In FIG. 20, change in the X direction is shown by a solid line, and change in the Y direction is shown by a dashed line. As shown in FIG. 20, in the first position, change in the X direction can be detected in a range of ±20° whereas change in the Y direction fails to be detected.

Then, after the predetermined processing step at the first position is finished, step S70 is executed. In step S70, step S71 is executed. Step S71 is a step of confirming the completion of movement, for the movement of the predetermined illumination region.

If it is confirmed that the movement is not completed, step S72 is executed. In step S72, the predetermined illumination region moves to the second position. The second position is a position different from the first position.

Figure 21A:
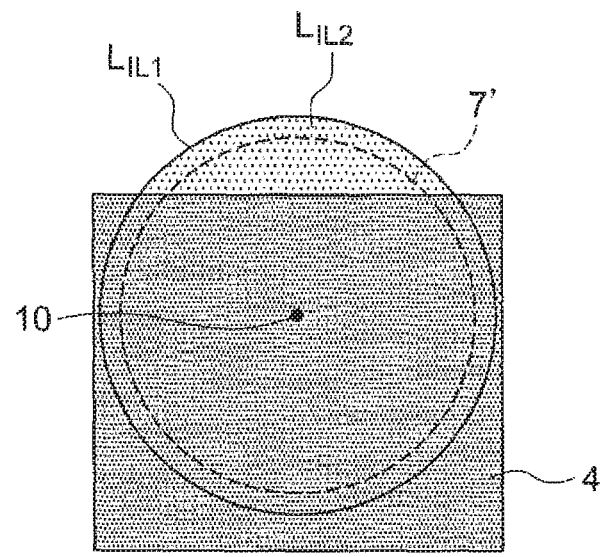
FIG. 21A is a diagram showing a state of illumination light in a second position.

By execution of step S72, the predetermined illumination region moves from the first position to the second position. The state of illumination light in the second position is shown in FIG. 21A. Furthermore, the state of movement of the imaging light in the second position is shown in FIG. 21B.

As shown in FIG. 21A, the second position is a position where the first position is rotated by 90°. At the second position, illumination light $L_{IL2}$ is positioned on the upper side relative to the optical axis 10 on the Y axis. The area of illumination light $L_{IL2}$ in the second position is equal to the area of illumination light $L_{IL2}$ in the first position.

Figure 21B:
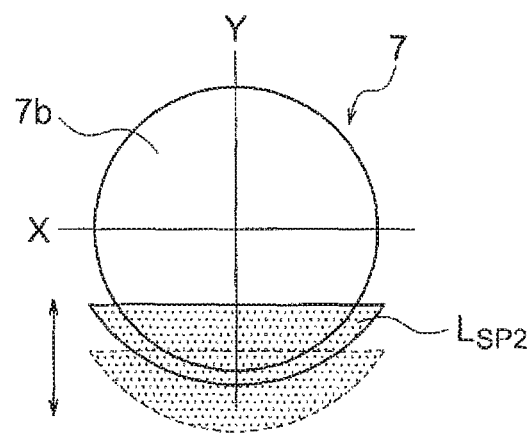
FIG. 21B is a diagram showing a state of movement of imaging light in the second position.

On the other hand, as shown in FIG. 21B, at the second position, imaging light $L_{SP2}$ is positioned on the lower side relative to the optical axis 10 on the Y axis. Thus, for the Y direction, the quantity of light of imaging light $L_{SP2}$ changes even when imaging light $L_{SP2}$ slightly moves. Therefore, at the second position, it is possible to obtain the amount of tilt in the surface of the sample for the Y direction.

Then, at the second position, step S30 is executed. This step S30 is the predetermined processing step for the second time. Thus, the amount of tilt in the surface of the sample is obtained for the Y direction.

In this way, according to the sample shape measuring method of the present embodiment, it is possible to obtain the direction of the tilt and the amount of tilt in the surface of the sample.

Figure 22:
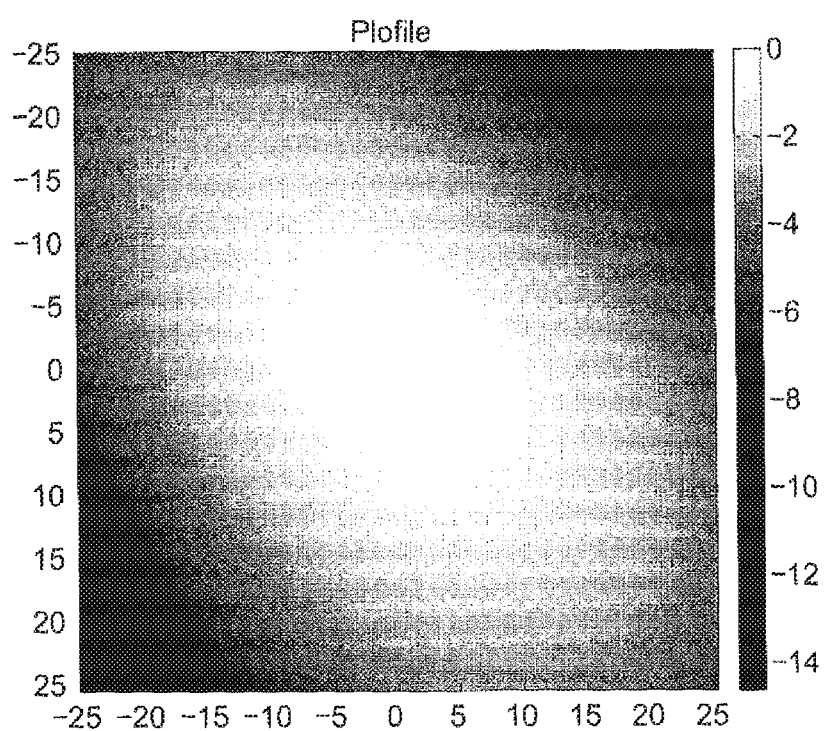
FIG. 22 is a diagram showing the distribution of height in a virtual sample.

An example of simulation will now be illustrated. FIG. 22 is a diagram showing the distribution of height in a virtual sample. In the virtual sample, the central portion is highest and the height decreases toward the periphery.

Figure 23A:
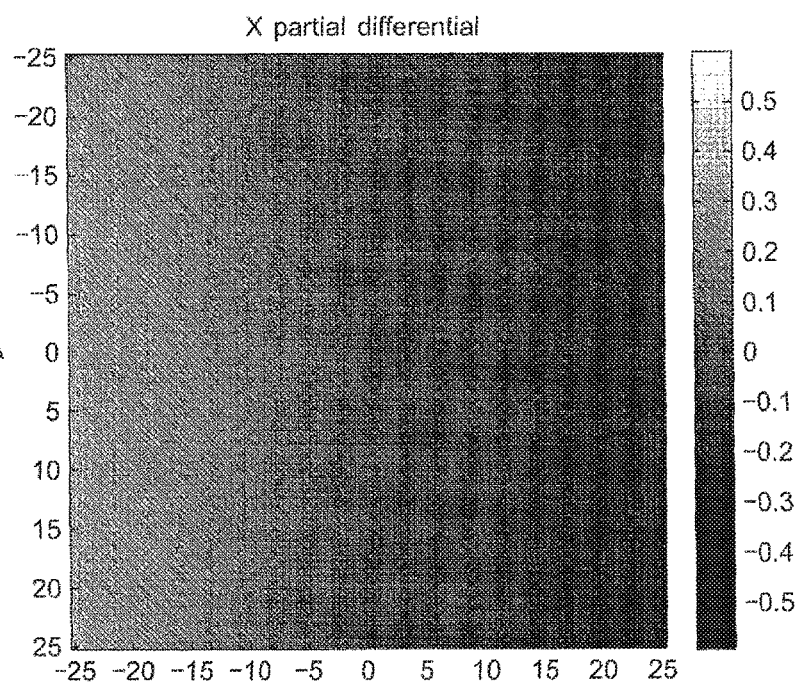
FIG. 23A is a diagram showing the distribution of inclination angle in the first position.
Figure 23B:
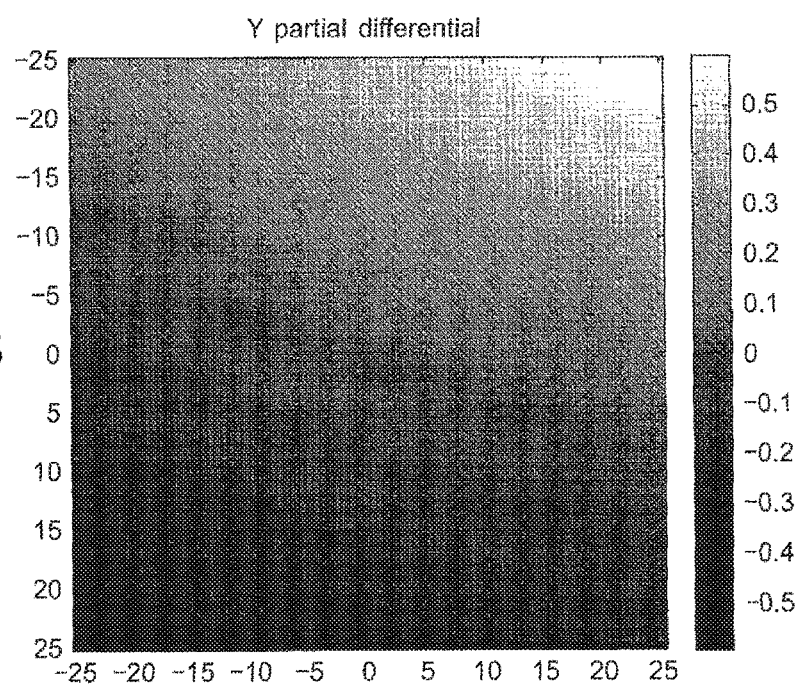
FIG. 23B is a diagram showing the distribution of inclination angle in the second position.

FIG. 23A is a diagram showing the distribution of inclination angle in the first position. FIG. 23B is a diagram showing the distribution of inclination angle in the second position. The distribution of inclination angle shown in FIG. 23A and FIG. 23B is the distribution of inclination angle in a virtual sample.

The distribution of inclination angle shown in FIG. 23A is the distribution of inclination angle when the predetermined illumination region is moved to the first position. The first position is positioned on the X axis. Therefore, the distribution of inclination angle shown in FIG. 23A represents the distribution of inclination angle in the X direction.

The distribution of inclination angle shown in FIG. 23B is the distribution of inclination angle when the predetermined illumination region is moved to the second position. The second position is positioned on the Y axis. Therefore, the distribution of inclination angle shown in FIG. 23B represents the distribution of inclination angle in the Y direction.

In simulation, when the distribution of height or the distribution of inclination angle is to be calculated, the quantity of light in a case where the amount of tilt in a virtual sample is zero is calculated in advance. The distribution of height shown in FIG. 22 and the distribution of inclination angle shown in FIG. 23A and FIG. 23B show the difference from the quantity of light in a case where the amount of tilt is zero.

Figure 24:
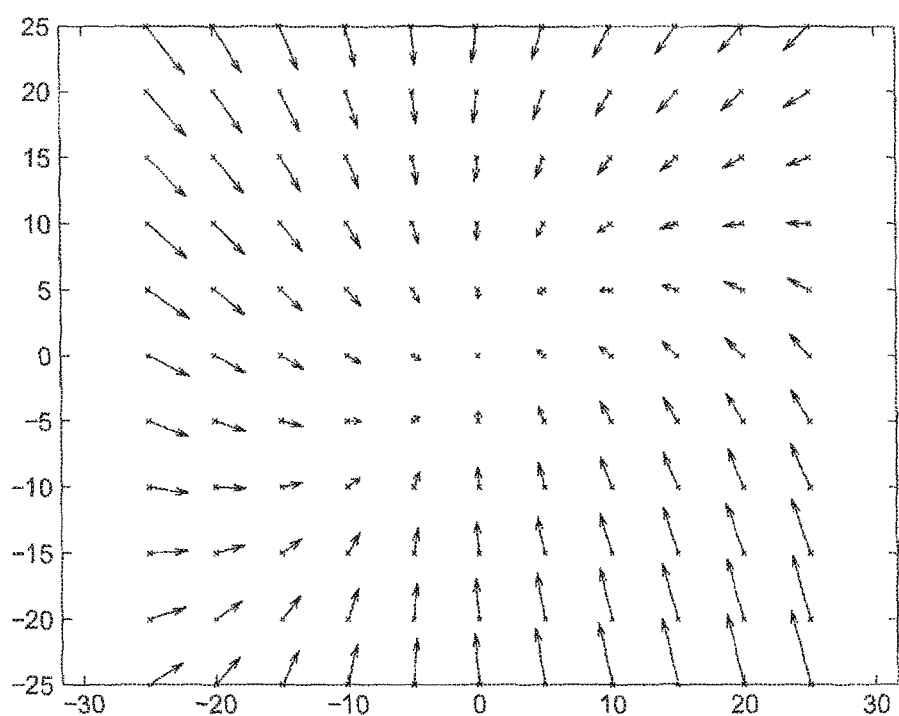
FIG. 24 is a diagram showing the tilt direction and the amount of tilt in a predetermined pixel.

FIG. 24 is a diagram showing the tilt direction and the amount of tilt in a predetermined pixel. The tilt direction and the amount of tilt in a predetermined pixel is calculated from the distribution of inclination angle shown in FIG. 23A and FIG. 23B, that is, the amount of tilt in the Y direction and in the X direction of each pixel. In FIG. 24, "x" indicates an analysis point and the direction of an arrow shows the direction of tilt at the analysis point, and the length of an arrow indicates the amount of tilt (absolute value). The analysis point indicates the position of a predetermined pixel. Predetermined pixels are discretely extracted from all pixels. Therefore, the analysis points are also discretely distributed.

Figure 25:
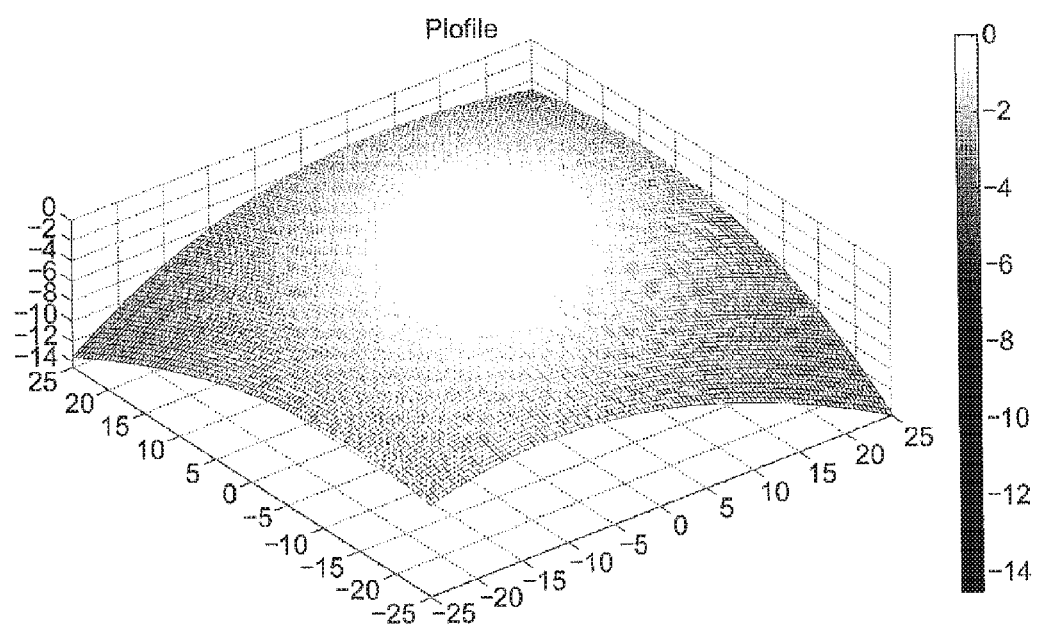
FIG. 25 is a diagram showing the height distribution of a virtual sample.

FIG. 25 is a diagram showing the height distribution of a virtual sample. This height distribution is derived using the result in FIG. 24. The height distribution may be analyzed using the above-noted result such that the directions of tilt and the amounts of tilt of adjacent pixels are smoothly connected. By doing this, it becomes possible to derive the height distribution of a sample surface smoothly. Examples of the analysis method include fitting and spline processing.

Furthermore, in the sample shape measuring method of the present embodiment, it is preferable that the predetermined illumination region be set such that an image of the predetermined illumination region includes the entire edge of the pupil.

Figure 26A:
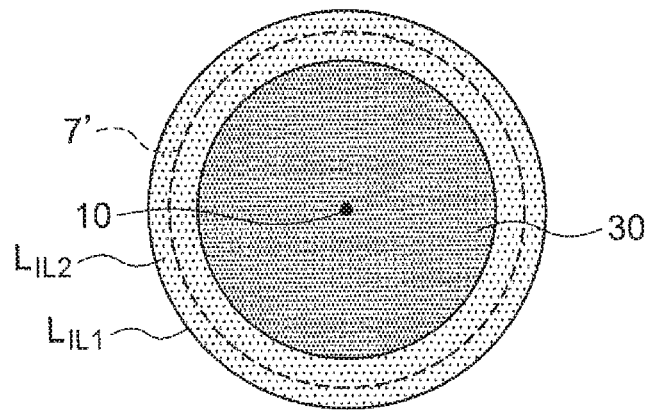
FIG. 26A is a diagram showing a state of illumination light.

The state of illumination light is shown in FIG. 26A. The light-shielding member 30 is disposed so as to include the optical axis 10. In addition, the light-shielding member 30 is disposed so as to shield part of illumination light $L_{IL1}$. The light-shielding member 30 is a circular flat plate and is provided so as to shield illumination light $L_{IL1}$ inside the image 7' of the stop. Therefore, the region of illumination light $L_{IL2}$ is annular.

Figure 26B:
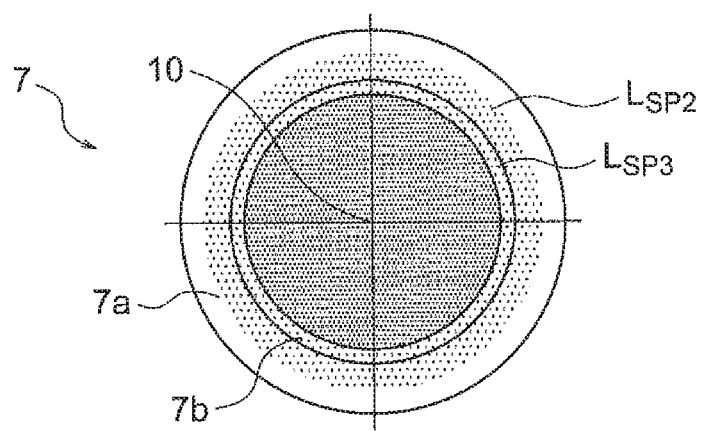
FIG. 26B is a diagram showing a state of imaging light.

The state of the imaging light is shown in FIG. 26B. Since the region of illumination light $L_{IL2}$ is annular, the shape of the region indicating imaging light $L_{SP2}$ is also annular. Of imaging light $L_{SP2}$, partial imaging light is positioned on the outside of the transmission part 7b. Therefore, this imaging light is shielded by the light-shielding part 7a. The remaining imaging light of imaging light $L_{SP2}$ passes through the transmission part 7b.

The transmission part 7b is divided into a region where the imaging light passes through and a region where the imaging light does not pass through. The shape of the region where the imaging light passes through is annular. Imaging light $L_{SP3}$ passes through this annular region.

In the sample shape measuring method of the present embodiment, the predetermined illumination region is set so as not include the optical axis at the pupil position of the illumination optical system and is set such that illumination light is applied to part of the inside of the pupil and the outside of the pupil at the pupil position of the observation optical system. Therefore, it is possible to obtain the amount of tilt in the surface of the sample also with the sample shape measuring method of the present embodiment.

It is noted, however, that in the sample shape measuring method of the present embodiment, the predetermined illumination region is set such that the image of the predetermined illumination region includes the entire edge of the pupil. Thus, it is impossible to detect the direction of tilt. Since the direction of tilt may be known in some samples, it is possible to obtain the amount of tilt in the surface of the sample by using the sample shape measuring method of the present embodiment.

Furthermore, it is preferable that the sample shape measuring method of the present embodiment include a step of relatively moving the observation optical system and the sample along the optical axis.

Figure 27:
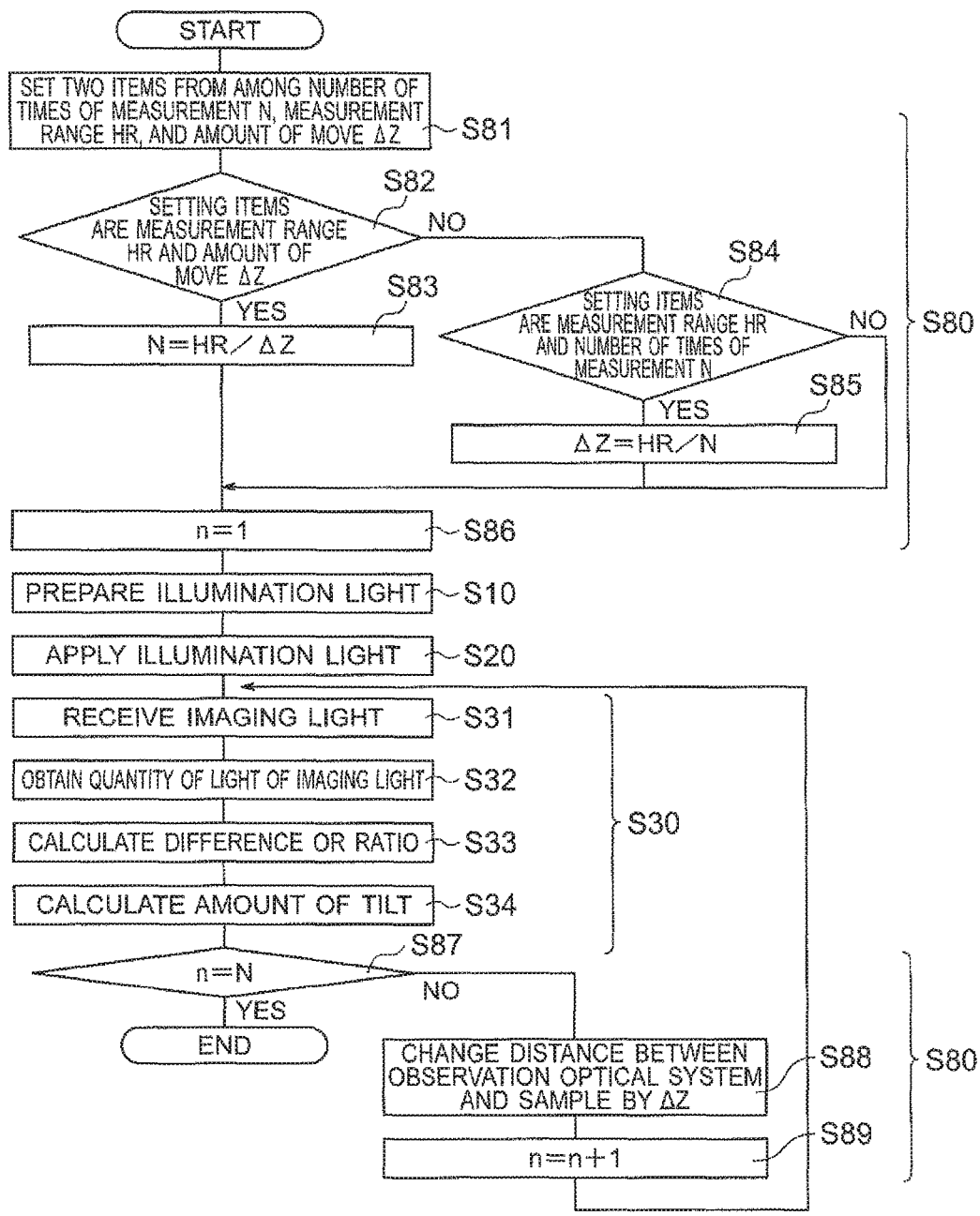
FIG. 27 is a flowchart of the sample shape measuring method of the present embodiment.

The sample shape measuring method of the present embodiment will be described. FIG. 27 is a flowchart of the sample shape measuring method of the present embodiment. The same step as in the flowchart in FIG. 8 is denoted by the same numeral and will not be further elaborated. The sample shape measuring method of the present embodiment includes step S80 of relatively moving the observation optical system and the sample.

In the basic measurement method, the amount of tilt in the surface of the sample is calculated based on the quantity of light of the imaging light. The quantity of light of the imaging light changes with the amount of tilt in the surface of the sample and also changes when the sample is displaced from the focal point of the observation optical system. In a state in which the sample is significantly displaced from the focus position of the observation optical system, it is impossible to precisely obtain the amount of tilt in the surface of the sample. In addition, in this state, the spatial resolution in a plane orthogonal to the optical axis is reduced.

In this way, in the sample shape measuring method of the present embodiment, the range in which the amount of tilt in the surface of the sample can be obtained precisely is limited as for the direction along the optical axis. This range is represented, for example, by $1.2 \times \lambda / NA_{ob}^2$. Thus, when the height of the sample exceeds this range, it is impossible to measure the shape of the sample in measurement one-time. Based on this, the sample shape measuring method of the present embodiment includes step S80 of relatively moving the observation optical system and the sample.

Step S80 includes step S81 of setting measurement items, step S82 of confirming the measurement items, step S83 of setting the number of times of measurement, step S84 of confirming the measurement items, step S85 of setting the amount of movement, step S86 of initializing the number of times of repetition, step S87 of confirming the number of times of repetition, step S88 of changing the distance between the observation optical system and the sample, and step S89 of increasing the value of the number of times of repetition.

In step S80, step S81 is executed. Step S81 is a step of setting measurement items. In step S81, two items are set from among the number of times of measurement N, the measurement range HR, and the amount of movement ΔZ.

When step S81 is finished, step S82 is executed. Step S82 is a step of confirming the measurement items. If the measurement range HR and the amount of movement ΔZ are set, step S83 is executed. Step S83 is a step of setting the number of times of measurement. In step S83, the number of times of measurement N is set from the measurement range HR and the amount of movement ΔZ. When step S83 is finished, step S86 is executed.

If the measurement range HR and the amount of movement ΔZ are not set, step S84 is executed. Step S84 is a step of confirming the measurement items. If the measurement range HR and the number of times of measurement N are set, step S85 is executed. Step S85 is a step of setting the amount of movement ΔZ. In step S85, the amount of movement ΔZ is set from the measurement range HR and the number of times of measurement N. When step S85 is finished, step S86 is executed.

If the number of times of measurement N and the measurement range HR are not set, it means that the amount of movement ΔZ and the number of times of measurement N are set. Therefore, step S86 is executed.

Step S86 is a step of initializing the number of times of repetition. In step S86, the number of times of repetition is initialized. Specifically, the value of a variable n representing the number of times of repetition is set to 1.

When step S86 is finished, step S10 to step S30 are executed whereby the measurement for the first time is performed.

When step S30 is finished, step S87 is executed. In step S87, the number of times of repetition n is confirmed. If the value of the number of times of repetition n does not agree with the number of times of measurement N, step S88 is executed. Step S88 is a step of changing the distance between the observation optical system and the sample. In step S88, the sample is moved without changing the position of the observation optical system, or the observation optical system is moved without changing the position of the sample.

When step S88 is finished, step S89 is executed. In step S89, the value of the number of times of repetition is changed. Specifically, 1 is added to the value of the variable n representing the number of times of repetition. When step S88 is finished, processing returns to step S30. Then, step S30 is executed again.

By execution of step S30, measurement for the second time is performed. Here, the measurement position has been moved to a position different from the measurement position for the first time. Therefore, measurement for the second time is performed at a different height of the sample.

The process described above is performed until the value of the variable n representing the number of times of repetition agrees with the number of times of measurement N. Thus, it is possible to measure a range wider than the measurement range.

Figure 28:
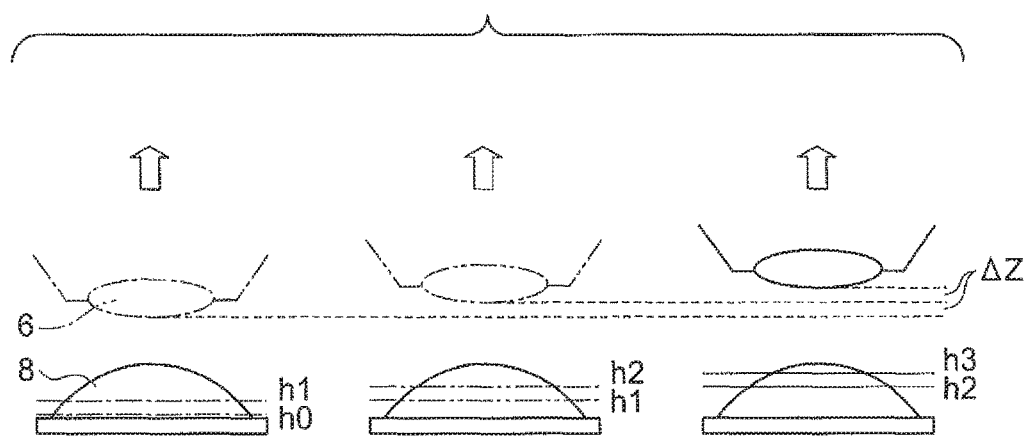
FIG. 28 is a diagram showing a state of measurement by the sample shape measuring method of the present embodiment.

The state of measurement by the sample shape measuring method of the present embodiment is shown in FIG. 28. The diagram on the left side shows the state of measurement for the first time, the diagram at the center shows the state of measurement for the second time, and the diagram on the right side shows the state of measurement for the third time.

As the number of times of measurement increases, the objective lens 6 moves by ΔZ in a direction away from the sample 8. Then, the measurement position in the sample 8 moves from positions h0, h1 to position h2 with the movement of the objective lens.

Furthermore, the range in which the amount of tilt can be obtained precisely moves from below to above, such as a range from position h0 to position h1, a range from position h1 to position h2, and a range from position h2 to position h3. By obtaining the sum of the three measurements, it is possible to obtain the amount of tilt in the surface of the sample precisely over a wide range from position h0 to position h3.

Furthermore, in the sample shape measuring method of the present embodiment, it is preferable that the pupil magnification be a ratio between the diameter of the pupil in the illumination optical system and the diameter of the pupil in the observation optical system, change in pupil magnification be caused by a sample, and the sample shape measuring method include a step of correcting an error that occurs with the change in pupil magnification.

Figure 29:
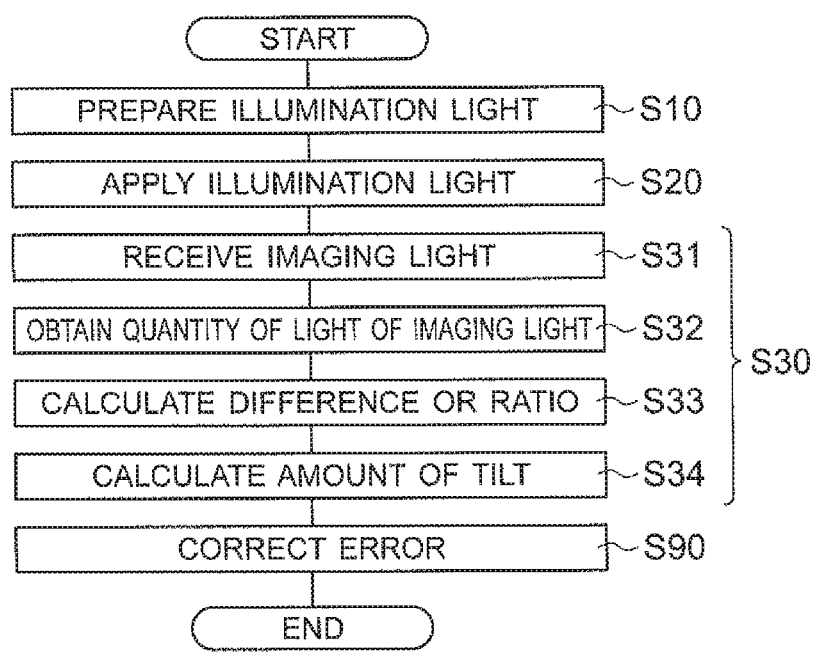
FIG. 29 is a flowchart of the sample shape measuring method of the present embodiment.

The sample shape measuring method of the present embodiment will be described. FIG. 29 is a flowchart of the sample shape measuring method of the present embodiment. The same step as in the flowchart in FIG. 8 is denoted by the same numeral and will not be further elaborated. The sample shape measuring method of the present embodiment includes step S90 of correcting an error.

In the sample shape measuring method of the present embodiment, when step S34 is finished, step S90 is executed. Step S90 is a step of correcting an error that occurs with change in pupil magnification. The pupil magnification is the ratio between the diameter of the pupil in the illumination optical system and the diameter of the pupil in the observation optical system. This change in pupil magnification is caused by the sample.

Figure 30A:
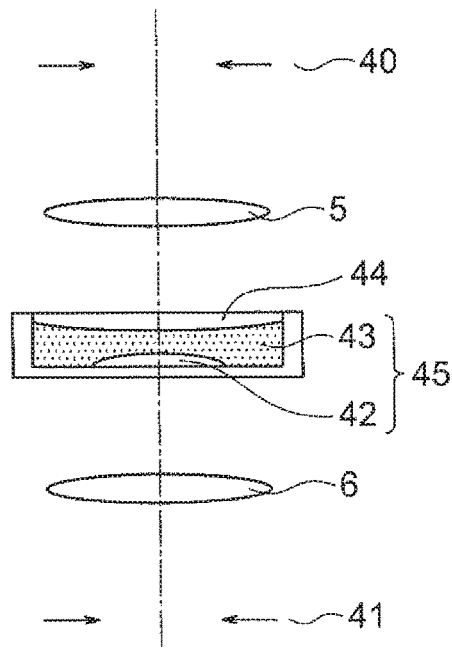
FIG. 30A is a diagram showing an optical system when the area of the holding part is small.

A description will be given below using the optical system of an inverted microscope. FIG. 30A is a diagram showing an optical system in a case where the area of the holding part is small. In the description here, the illumination optical system is replaced by the condenser lens 5, and the observation optical system is replaced by the objective lens 6. The pupil 40 of the condenser lens is conjugate to the pupil 41 of the objective lens. The pupil magnification is obtained from the ratio between the diameter of the pupil 40 and the diameter of the pupil 41.

As described above, in the observation of a cell 42, observation is performed in a state in which the cell 42 is held by a holding part 44 in liquid 43 such as culture liquid and preservative solution. When the area of the holding part 44 is large, the liquid surface of the liquid 43 is flat. In this case, a sample portion 45 can be considered as a parallel flat plate. Therefore, when the area of the holding part 44 is large, it becomes a state such that a parallel flat plate is disposed between the condenser lens 5 and the objective lens 6.

Here, assume that the condenser lens 5 and the objective lens 6 as thin lenses. If so, the magnification of the optical system composed of the condenser lens 5 and the objective lens 6 represents the ratio between the diameter of the pupil 40 and the diameter of the pupil 41. Therefore, the pupil magnification $\beta_p$ is represented by Equation (A) below:

$$\beta_p = f_{ob}/f_c \quad (A)$$

where
$f_{ob}$ is the focal length of the objective lens, and
$f_c$ is the focal length of the condenser lens.

Figure 30B:
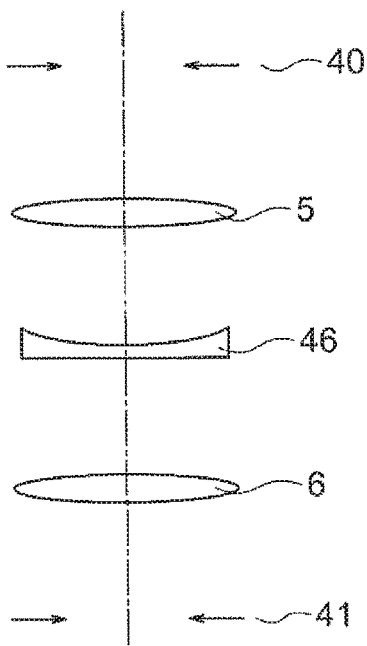
FIG. 30B is a diagram showing an optical system when a sample portion is replaced by a planoconcave lens.

On the other hand, when the area of the holding part 44 is small, the liquid surface of the liquid 43 on the condenser lens 5 side is a concave surface. In this case, the sample portion 45 can be considered as a planoconcave lens. FIG. 30B is a diagram showing an optical system when the sample portion is replaced by a planoconcave lens. As shown in FIG. 30B, when the area of the holding part 44 is small, it becomes a state such that a planoconcave lens 46 is disposed between the condenser lens 5 and the objective lens 6.

The focal length of the planoconcave lens 46 is determined by the radius of curvature of the concave surface of the liquid 43 and the refractive index of the liquid 43. Furthermore, since the liquid 43 has hydrophilic similar to water, the smaller the area of the holding part 44 is, the smaller the radius of curvature of the concave surface is. Thus, in a microwell plate having a plurality of holding parts 44, the radius of curvature of the concave surface is very small.

The combined focal length $f_{len-ob}$ of the objective lens 6 and the planoconcave lens 46 is represented by Equation (B) below:

$$f_{len-ob} = (f_{len} \times f_{ob})/(f_{len} + f_{ob} - d) \quad (B)$$

where
$f_{len}$ is the focal length of the planoconcave lens,
$f_{ob}$ is the focal length of the objective lens, and
d is the distance between the objective lens and the planoconcave lens.

In the optical system shown in FIG. 30B, the magnification of the optical system composed of the condenser lens 5, the planoconcave lens 46, and the objective lens 6 represents the ratio between the diameter of the pupil 40 and the diameter of the pupil 41. Therefore, the pupil magnification $\beta_p'$ is represented by Equation (C) below:

$$\beta_p' = f_{len-ob}/f_c \quad (C)$$

$$= \{(f_{len} \times f_{ob})/(f_{len} + f_{ob} - d)\}/f_c$$

$$= (f_{len} \times f_{ob})/\{f_c \times (f_{len} + f_{ob} - d)\}$$

$$= (\beta_p \times f_{len})/(f_{len} + f_{ob} - d)$$

$$= \beta_p/(1 + (f_{ob} - d)/f_{len}).$$

As described above, since the objective lens 6 and the planoconcave lens 46 are considered as thin lenses, the thickness of the lens is considered to be zero. If so, the distance d is the distance between the principal point of the objective lens 6 and the principal point of the planoconcave lens 46. In normal observation, the side closer to the objective lens 6 than the concave surface of the liquid 43 is observed, and then $f_{ob} < d$ holds. Furthermore, the concave surface of the liquid 43 has negative refractive power and then $f_{len} < 0$ holds. That is, $((f_{ob} - d)/f_{len}) > 0$ holds.

When this is substituted into Equation (C), the pupil magnification $\beta_p'$ is smaller than the pupil magnification $\beta_p$ as shown in the equation below:

$$\beta_p' = \beta_p/(1 + (f_{ob} - d)/f_{len}) < \beta_p.$$

For example, in the optical system of an inverted microscope, given $f_{ob} = 20$ mm, $f_{len} = -4$ mm, and $d = 21$ mm, the pupil magnification $\beta_p'$ is smaller than the pupil magnification $\beta_p$ as shown below:

$$\beta_p' = \beta_p/(1 + (f_{ob} - d)/f_{len}) = 0.80\beta_p.$$

When the sample portion 45 can be considered as a planoconcave lens, the pupil magnification changes also in an upright microscope. In the optical system of an upright microscope, however, the pupil magnification $\beta_p'$ is larger than the pupil magnification $\beta_p$.

In this way, change in pupil magnification is caused by the action of negative refractive power of the planoconcave lens 46, that is, the sample. If the pupil magnification changes, the quantity of light of the imaging light passing through the pupil 41 of the objective lens changes. This change in quantity of light is not caused by the tilt in the surface of the sample and thus is a measurement error.

To obtain the pupil magnification $\beta_p'$, as shown by Equation (C), the focal length of the planoconcave lens 46 is necessary. As described above, the focal length of the planoconcave lens 46 is determined by the radius of curvature of the concave surface of the liquid 43 and the refractive index of the liquid 43. Among these, it is difficult to obtain the radius of curvature of the concave surface of the liquid 43. Thus, it is not easy to obtain the focal length of the planoconcave lens 46. Therefore, it is difficult to obtain the pupil magnification $\beta_p'$ using Equation (C).

However, the pupil magnification $\beta_p'$ can be obtained by another method. For example, information of the pupil of the objective lens can be obtained from a state in which no sample is present and a state in which culture liquid alone is present. Information of the pupil of the objective lens can be obtained, for example, using a Bertrand lens. The state in which no sample is present is a state in which the sample portion 45 itself is not present. The state in which culture liquid alone is present is a state in which liquid 43 alone is present in the sample portion 45.

Parallel light flux exists between the objective lens and the imaging lens. A Bertrand lens is disposed in this parallel light path. Thus, it is possible to form an image of the pupil of the objective lens at the image position formed by the objective lens and the imaging lens.

Figure 31A:
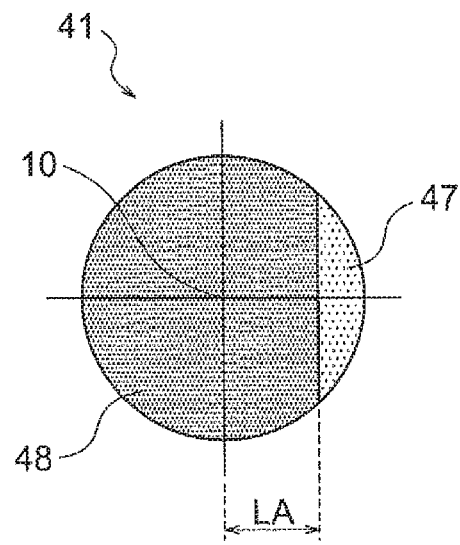
FIG. 31A is a diagram showing a state of the pupil of the objective lens and imaging light in a state in which no sample is present.
Figure 31B:
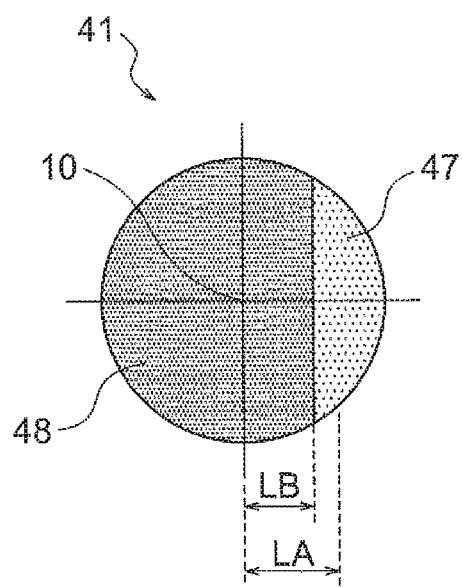
FIG. 31B is a diagram showing a state of the pupil of the objective lens and imaging light in a state in which culture liquid alone is present.

FIG. 31A is a diagram showing a state of the pupil of the objective lens and the imaging light in a state in which no sample is present. FIG. 31B is a diagram showing a state of the pupil of the objective lens and the imaging light in a state in which culture liquid alone is present. The state of the image of the pupil of the objective lens and the imaging light is also the same as in FIG. 31A and FIG. 31B.

As can be understood from the comparison between FIG. 31A and FIG. 31B, the position of the boundary between the imaging light 47 and the light-shielding part 48 differs between a state in which no sample is present and a state in which culture liquid alone is present. Then, by using the difference in position of the boundary, it is possible to obtain the pupil magnification $\beta_p'$.

In a state in which no sample is present, the pupil magnification $\beta_p$ can be obtained by Equation (A) above. It is possible to easily obtain the focal length of the condenser lens and the focal length of the objective lens. Therefore, it is possible to easily obtain the pupil magnification $\beta_p$.

On the other hand, in a state in which culture liquid alone is present, the pupil magnification $\beta_p'$ can be obtained by Equation (D) below:

$$\beta_p' = LB/LA \times \beta_p \quad (D)$$

where

LA is the distance from the optical axis to a predetermined boundary in a state in which no sample is present, LB is the distance from the optical axis to a predetermined boundary in a state in which culture liquid alone is present, and the predetermined boundary is the boundary between the imaging light and the light-shielding part.

The pupil magnification $\beta_p$, the distance LA, and the distance LB can be easily obtained. In this way, by using a Bertrand lens, it is also possible to obtain the pupil magnification $\beta_p'$.

In the sample shape measuring method of the present embodiment, when step S30 is finished, step S90 is executed. Step S90 is a step of correcting an error that occurs with change in pupil magnification. The change in pupil magnification is obtained from the pupil magnification $\beta_p$ and the pupil magnification $\beta_p'$. The error is corrected using the obtained result.

Figure 32:
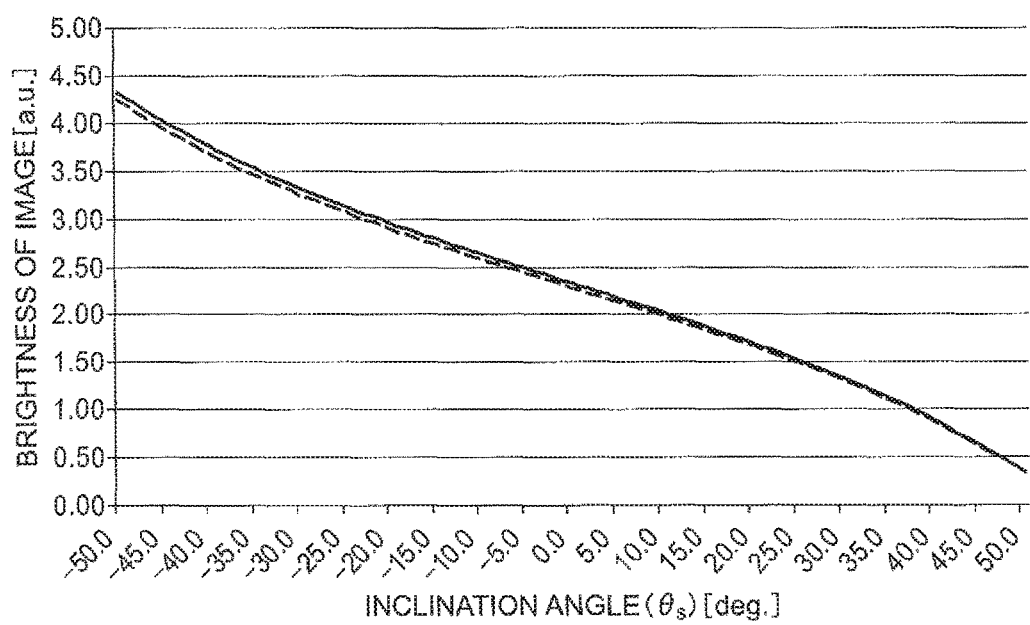
FIG. 32 is a graph showing the relation between inclination angle $\theta_s$ and area S.

FIG. 32 is a graph representing the relation between the inclination angle $\theta_s$ and the area S. In FIG. 32, the state before correction of the error is shown by a dashed line, and the state after correction of the error is shown by a solid line. By correcting the error, it is possible to precisely obtain the amount of tilt in the surface of the sample.

Next, an embodiment of a sample shape measuring apparatus which may be used for implementing the sample shape measuring method of the present embodiment (hereinafter referred as "the sample shape measuring apparatus of the present embodiment) will be described.

The sample shape measuring apparatus of the present embodiment includes an illumination optical system, an observation optical system, a holding member, a detecting element, and a processing apparatus. The illumination optical system includes a light source, a condenser lens, and an aperture member. The observation optical system includes an objective lens and an imaging lens. The holding member holds a sample and is disposed between the illumination optical system and the observation optical system. Illumination light applied to the sample by the illumination optical system is transmitted through the sample. Light emitted from the sample is incident on the observation optical system. The detecting element receives light emitted from the observation optical system. The processing apparatus obtains the quantity of light based on the received light, calculates the difference or the ratio between the quantity of light and the reference quantity of light, and calculates the amount of tilt in the surface of the sample from the difference or the ratio.

Figure 33:
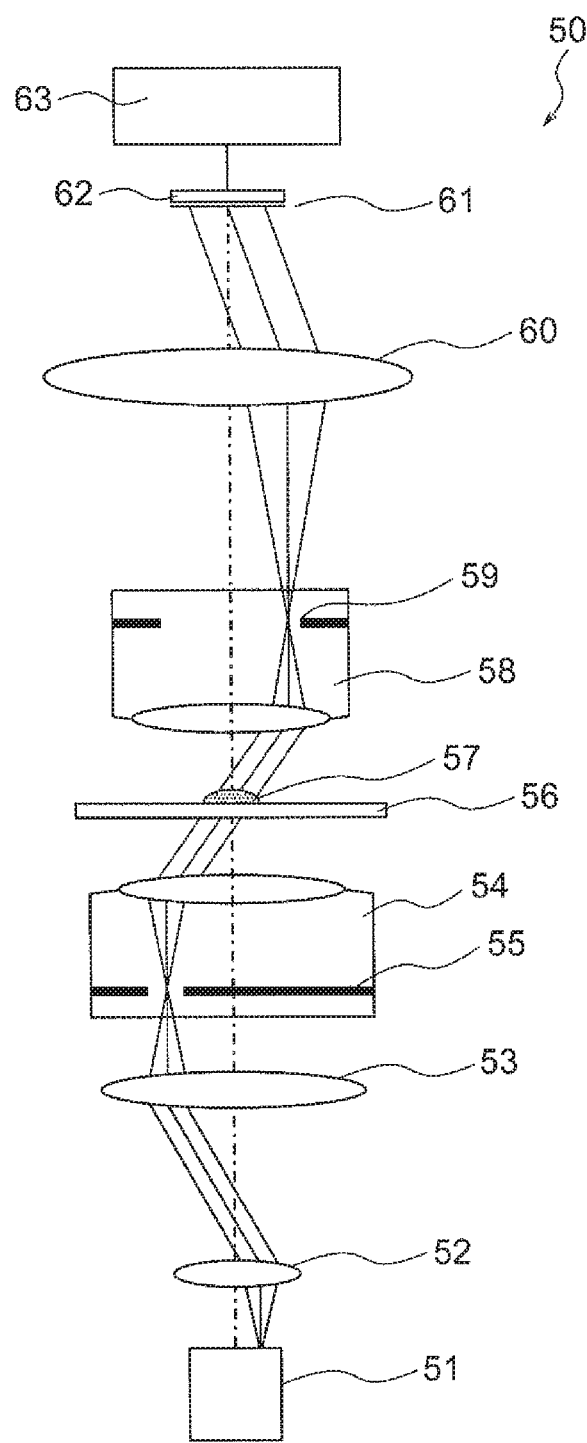
FIG. 33 is a diagram showing the configuration of a sample shape measuring apparatus of the present embodiment.

Referring to FIG. 33 the sample shape measuring apparatus of the present embodiment is described below. FIG. 33 is a diagram showing the configuration of the sample shape measuring apparatus of the present embodiment.

A sample shape measuring apparatus 50 is an upright microscope, for example, which includes an illumination optical system and an observation optical system. The illumination optical system includes a light source 51, a condenser lens 54 and an aperture member 55 The illumination optical system includes a lens 52 and a lens 53 as needed. Meanwhile, the observation optical system includes an objective lens 58 and an imaging lens 60.

Light emitted from the light source 51 passes through the lens 52 and the lens 53, and reaches the condenser lens 54. At the condenser lens 54, the aperture member 55 is provided. Herein, the condenser lens 54 and the aperture member 55 are integrally configured. However, the aperture member 55 and the condenser lens 54 may be configured as separate bodies. The aperture member 55 corresponds to the light-shielding member 4 in FIG. 1. A metal plate is used in the aperture member 55.

Moreover, in place of the condenser lens 54, a condenser unit having a reflecting surface may be used. The condenser unit may include, for example, a conical mirror and a concave mirror. The conical mirror is disposed on the optical axis. The concave mirror has an annular reflecting surface and is disposed to surround the conical mirror.

The aperture member 55 is conjugate to the light source 51. Therefore, the illumination light emitted from the light source 51 is collected at the position of the aperture member 55. That is, an image of the light source 51 is formed at the position of the aperture member 55.

Illumination light emitted from the aperture member 55 enters the condenser lens 54. Here, the position of the aperture member 55 coincides with the focal position of the condenser lens 54 (or the pupil position of the condenser lens 54). Therefore, the illumination light emitted from the condenser lens 54 becomes parallel light. The illumination light emitted from the condenser lens 54 is emitted so as to intersect with the optical axis of the observation optical system (the optical axis of the illumination optical system).

The illumination light emitted from the condenser lens 54 reaches a sample 57. The sample 57 is placed on a holding member 56. The sample 57 is a cell, for example, which is colorless and transparent. The holding member 56 includes a holding portion. In a slide glass, a surface of the slide glass corresponds to the holding portion. In a petri dish, a recessed portion of the petri dish corresponds to the holding portion. In a microwell plate, a recessed portion of each well corresponds to the holding portion.

The light passing through the sample 57, i.e., imaging light enters a microscope objective lens 58 (hereinafter, referred to as an "objective lens"). This objective lens 58 is a microscope objective lens for bright-field observation, for example. Therefore, only a lens is present in the optical path of the objective lens 58, and no optical member to change the intensity or the phase of light, such as a phase plate or a modulation plate, is not present in the optical path.

As shown in FIG. 33, parallel light passing through the sample 57 is collected at a pupil 59 of the objective lens. As just described, the pupil 59 of the objective lens is conjugate to the aperture member 55. Therefore, an image of the aperture member 55 is formed at the position of the pupil 59 of the objective lens.

The imaging light emitted from the objective lens 58 enters the imaging lens 60 Then, an optical image of the sample 57 is formed at an image position 61 by the imaging light emitted from the imaging lens 60.

A detecting element 62 is disposed at the image position 61. The detecting element 62 is a photoelectric conversion element. Examples of the detecting element 62 include photodiode, CCD, and COMS.

The light intensity of an optical image is converted by the detecting element 62 into an electrical signal. The converted electrical signal is transmitted as image data of the sample 57 to the processing apparatus 63. The image data represents the quantity of light of the optical image.

In the processing apparatus 63, the processing is executed in accordance with the flowchart shown in FIG. 8. That is, in the processing apparatus 63, the quantity of light of the imaging light is obtained (step S32), the difference or the ratio between the quantity of light and the reference quantity of light is calculated (step S33), and the amount of tilt in the surface of the sample is calculated from the calculation result (step S34). Here, since a predetermined region is set, in step S32, the processing of obtaining the quantity of light is performed for the predetermined region in the image data.

In this way, in the sample measuring apparatus of the present embodiment, illumination light deflected in a certain direction is merely applied to the sample. Thus, in derivation of the distribution of the amount of tilt in the surface of the sample, light emitted from the sample, that is, light transmitted through the sample is merely utilized, and the contrast of an image or the interference between non-diffracted light and diffracted light is not utilized. Therefore, according to the sample measuring apparatus of the present embodiment, even for a sample in which the reflectance of the surface is low and the surface shape is smooth, it is possible to measure the amount of tilt in the surface of the sample with high accuracy. Furthermore, as will be described later, by using the measured amount of tilt, it is possible to measure the surface shape of the sample with high accuracy.

Furthermore, in the sample shape measuring apparatus of the present embodiment, it is preferable that the detecting element include light-detecting pixels arranged in two dimensions, a range wider than the light-detecting pixel be set as a predetermined region, the quantity of light obtained based on the light-detecting pixels included in the predetermined region be obtained as the quantity of light in the predetermined region, the difference or the ratio between the quantity of light in the predetermined region and the reference quantity of light be calculated, the sample shape measuring apparatus include a tilt amount calculation circuit that calculates the amount of tilt in the surface of the sample corresponding to the predetermined region, from the calculation result, the predetermined region corresponds to one region when the surface of the sample be divided into a grid pattern, and in the tilt amount calculation circuit1, the amount of tilt in the surface of the sample position be calculated using the predetermined region as a unit.

According to the sample shape measuring apparatus of the present embodiment, it is possible to measure the surface shape of the sample with high accuracy even when the surface shape of the sample is smooth. Furthermore, since a predetermined region is set, the SN ratio is improved compared with when a predetermined region is not set. Therefore, it is possible to calculate the amount of tilt in the surface of the sample with high accuracy.

Furthermore, in the sample shape measuring apparatus of the present embodiment, it is preferable that the processing apparatus include a visualizing circuit that calculates the shape of a sample from a plurality of amounts of tilt and visualizes the shape of the sample from the calculated shape.

By doing this, it is possible to visually grasp the shape of the sample.

Furthermore, in the processing apparatus 63, the processing such as contrast enhancement, noise removal, and color conversion can be performed.

Furthermore, in the sample shape measuring apparatus of the present embodiment, it is preferable that the processing apparatus include a lookup table including the quantity of light and the amount of tilt, and the amount of tilt be calculated using the lookup table.

By doing this, it is possible to quickly obtain the amount of tilt in the surface of the sample.

Furthermore, it is preferable that the sample shape measuring apparatus of the present embodiment include a first aperture member and a second aperture member to be inserted to and removed from an optical path, and in the first aperture member, a portion including the optical axis of the condenser lens be a light-shielding part, the first aperture member have a first opening at a position eccentric with respect to the optical axis, in the second aperture member, a portion including the optical axis of the condenser lens be a light-shielding part, the second aperture member have a second opening at a position eccentric with respect to the optical axis, and the direction connecting the optical axis with the centroid of the first opening when the first aperture member is inserted to the optical path intersect the direction connecting the optical axis with the centroid of the second opening when the second aperture member is inserted to the optical path.

Figure 34:
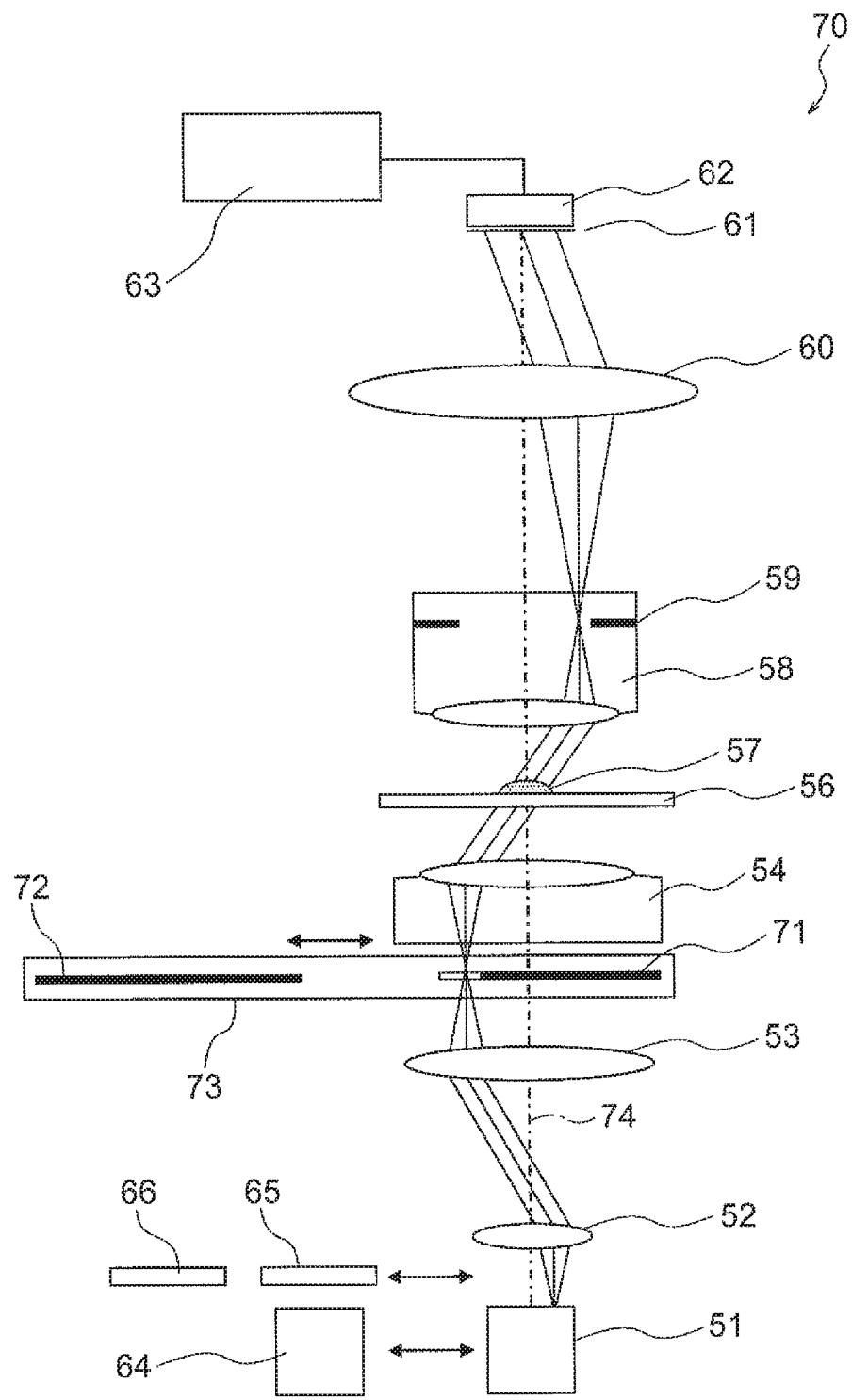
FIG. 34 is a diagram showing the configuration of another sample shape measuring apparatus of the present embodiment.

FIG. 34 is a diagram showing the configuration of another sample shape measuring apparatus of the present embodiment. The same reference numerals are assigned to the same configurations as those in FIG. 33, and their detailed descriptions are omitted.

A sample shape measuring apparatus 70 includes a first aperture member 71 and a second aperture member 72. A metal plate is used in the first aperture member 71 and the second aperture member 72.

The first aperture member 71 and the second aperture member 72 are both held at a moving mechanism 73. A slider or a turret is available as the moving mechanism 73, for example. When the moving mechanism 73 is a slider, the first aperture member 71 and the second aperture member 72 move in the direction orthogonal to the optical axis 74 of the illumination optical system (hereinafter, referred to as an "optical axis 74"). When the moving mechanism 73 is a turret, the first aperture member 71 and the second aperture member 72 rotate around an axis parallel to the optical axis 74.

Figure 35A:
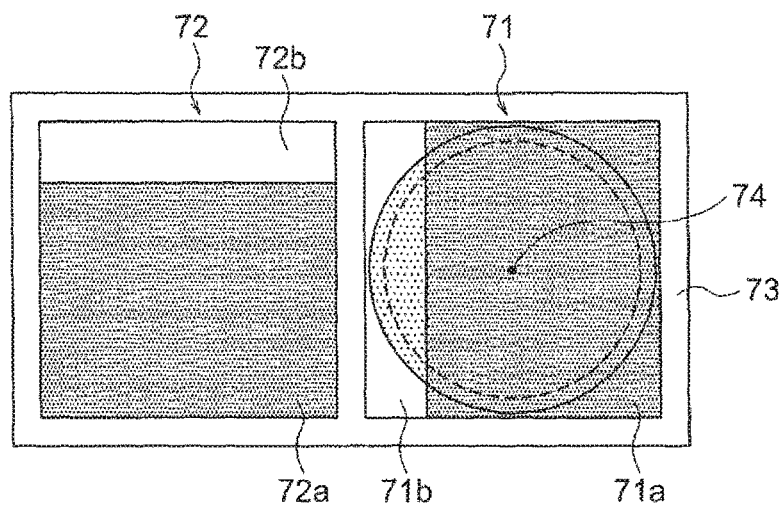
FIG. 35A is a diagram showing a state in which a first aperture member is inserted to the optical path.
Figure 35B:
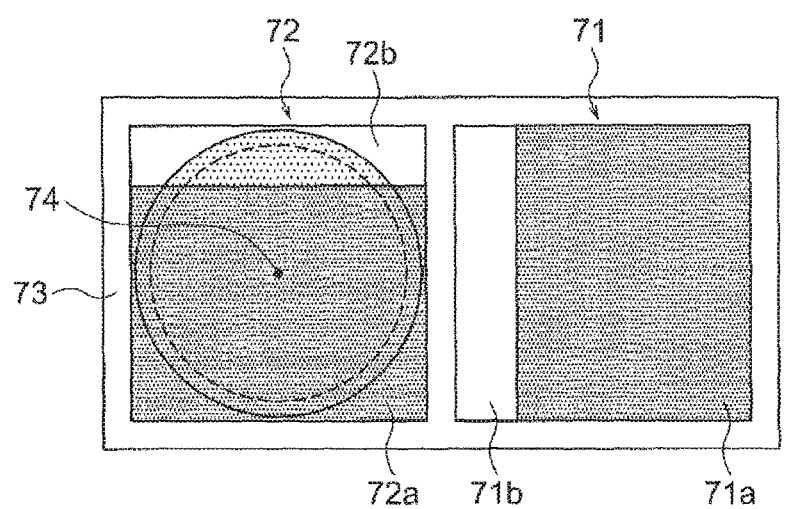
FIG. 35B is a diagram showing a state in which a second aperture member is inserted to the optical path.

FIG. 35A is a diagram showing a state in which the first aperture member is inserted to the optical path. FIG. 35B is a diagram showing a state in which the second aperture member is inserted to the optical path.

The first aperture member 71 includes a light-shielding part 71*a* and a first opening 71*b*. In the first aperture member 71, a portion including the optical axis 74 is the light-shielding part 71*a*. The first aperture member 71 has the first opening 71*b* at a position eccentric with respect to the optical axis 74.

The second aperture member 72 includes a light-shielding part 72*a* and a second opening 72*b*. In the second aperture member 72, a portion including the optical axis 74 is the light-shielding part 72*a*. The second aperture member 72 has the second opening 72*b* at a position eccentric with respect to the optical axis 74.

Then, the direction connecting the optical axis 74 with the centroid of the first opening 71*b* and the direction connecting the optical axis 74 with the centroid of the second opening 72*b* intersect when the first aperture member 71 is inserted to the optical path and when the second aperture member 72 is inserted to the optical path. In FIG. 35A and FIG. 35B, the first opening 71*b* is positioned on one of two straight lines orthogonal to each other, and the second opening 72*b* is positioned on the other straight line.

The area of the illumination light passing through the first opening 71*b* is equal to the area of the illumination light passing through the second opening 72*b*. Therefore, the characteristic curve is the same when the first aperture member 71 is inserted to the optical path and when the second aperture member 72 is inserted to the optical path. The characteristic curve is a curve downward to the right as shown in FIG. 7 both when the first aperture member 71 is inserted to the optical path and when the second aperture member 72 is inserted to the optical path.

The spectral transmittance characteristic in the first opening 71*b* is equal to the spectral transmittance characteristic in the second opening 72*b*. In this case, measurement can be performed using one light source. The wavelength band of light emitted from the light source 51 may be either wide or narrow.

The spectral transmittance characteristic in the first opening 71*b* may be differentiated from the spectral transmittance characteristic in the second opening 72*b*. In this case, the measurement method includes a method in which measurement is performed without changing the wavelength of illumination light and a method in which measurement is performed by changing the wavelength of illumination light.

In the method in which measurement is performed without changing the wavelength of illumination light, a light source emitting light in a wide wavelength band is used as the light source 51. An example of the light source emitting light in a wide wavelength band is a white light source. Furthermore, a plurality of photoelectric conversion elements are used as the detecting element 62. An example of the detecting element including a plurality of photoelectric conversion elements is a three-CCD camera.

The three-CCD camera includes three CCDs. A red filter is disposed for the first CCD, a green filter is disposed for the second CCD, and a blue filter is disposed for the third CCD.

Then, for example, the spectral transmittance characteristic in the first opening 71*b* is matched with the spectral transmittance characteristic of the red filter, and the spectral transmittance characteristic in the second opening 72*b* is matched with the spectral transmittance characteristic of the green filter.

Then, in measurement, a white light source is disposed in the optical path, and measurement is performed with the first CCD when the first aperture member 71 is inserted to the optical path, whereas measurement is performed with the second CCD when the second aperture member 72 is inserted to the optical path.

In the method in which measurement is performed by changing the wavelength of illumination light, a plurality of light sources may be used or one light source may be used.

When a plurality of light sources are used, for example, a light source 64 is prepared in addition to the light source 51. Then, the wavelength band of light emitted from the light source 51 is differentiated from the wavelength band of light emitted from the light source 64. In addition, the spectral transmittance characteristic in the first opening 71*b* is matched with the wavelength band of light emitted from the light source 51, and the spectral transmittance characteristic in the second opening 72*b* is matched with the wavelength band of light emitted from the light source 64.

Then, in measurement, when the first aperture member 71 is inserted to the optical path, measurement is performed using the light source 51, and when the second aperture member 72 is inserted to the optical path, measurement is performed using the light source 64.

When one light source is used, a plurality of optical filters are prepared. For example, an optical filter 65 and an optical filter 66 are prepared. Furthermore, the spectral transmittance characteristic in the first opening 71*b* is matched with the spectral transmittance characteristic of the optical filter 65, and the spectral transmittance characteristic in the second opening 72*b* is matched with the spectral transmittance characteristic of the optical filter 66.

Then, in measurement, when the first aperture member 71 is inserted to the optical path, measurement is performed using the optical filter 65, and when the second aperture member 72 is inserted to the optical path, measurement is performed using the optical filter 66.

In the sample shape measuring apparatus 70, it is possible to detect change in quantity of light of the imaging light in any direction. Therefore, according to the sample shape measuring apparatus of the present embodiment, it is possible to obtain the direction of tilt and the amount of tilt in the surface of a sample.

Figure 36A:
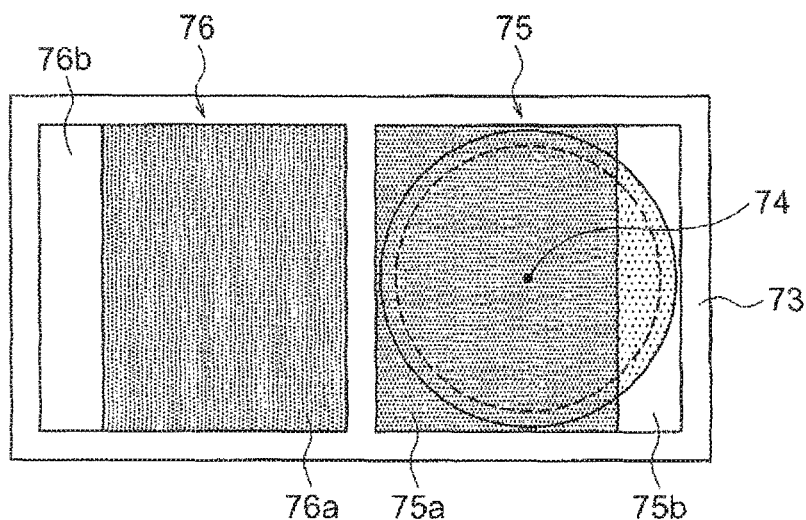
FIG. 36A is a diagram showing a state in which a first aperture member of a first modification is inserted to the optical path.
Figure 36B:
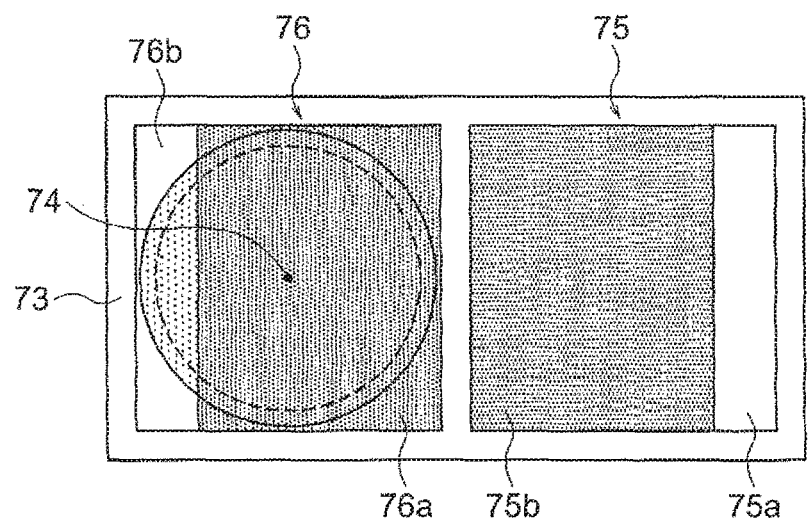
FIG. 36B is a diagram showing a state in which a second aperture member of the first modification is inserted to the optical path.

Modifications of the first aperture member and the second aperture member will be described. FIG. 36A is diagram showing a state in which a first aperture member of a first modification is inserted to the optical path. FIG. 36B is a diagram showing a state in which a second aperture member of the first modification is inserted to the optical path.

The first aperture member 75 includes a light-shielding part 75*a* and a first opening 75*b*. In the first aperture member 75, a portion including the optical axis 74 of the condenser lens is the light-shielding part 75*a*. The first aperture member 75 has the first opening 75*b* at a position eccentric with respect to the optical axis 74.

The second aperture member 76 includes a light-shielding part 76*a* and a second opening 76*b*. In the second aperture member 76, a portion including the optical axis 74 of the condenser lens is the light-shielding part 76*a*. The second aperture member 76 has the second opening 76*b* at a position eccentric with respect to the optical axis 74.

Then, the direction connecting the optical axis 74 with the centroid of the first opening 75*b* and the direction connecting the optical axis 74 with the centroid of the second opening 76*b* are directly opposite when the first aperture member 75 is inserted to the optical path and when the second aperture member 76 is inserted to the optical path. In FIG. 36A and FIG. 36B, the first opening 75*b* is positioned on one side on the same straight line and the second opening 76*b* is positioned on the other side.

The area of the illumination light passing through the first opening 75*b* is equal to the area of the illumination light passing through the second opening 76*b*. Therefore, the characteristic curve differs between when the first aperture member 75 is inserted to the optical path and when the second aperture member 76 is inserted to the optical path. When the first aperture member 75 is inserted to the optical path, the characteristic curve is a curve downward to the right as shown in FIG. 7. When the second aperture member 76 is inserted to the optical path, the characteristic curve is a curve upward to the right.

The point where two lines intersect is the point where the inclination angle $\theta_s=0$. Therefore, according to the sample shape measuring apparatus of the present embodiment, it is possible to detect a portion where the amount of tilt is zero, irrespective of the transmittance of the sample.

The spectral transmittance characteristic in the first opening 75*b* is equal to the spectral transmittance characteristic in the second opening 76b. However, as described above, the spectral transmittance characteristic in the first opening 75b may be differentiated from the spectral transmittance characteristic in the second opening 76b.

Figure 37A:
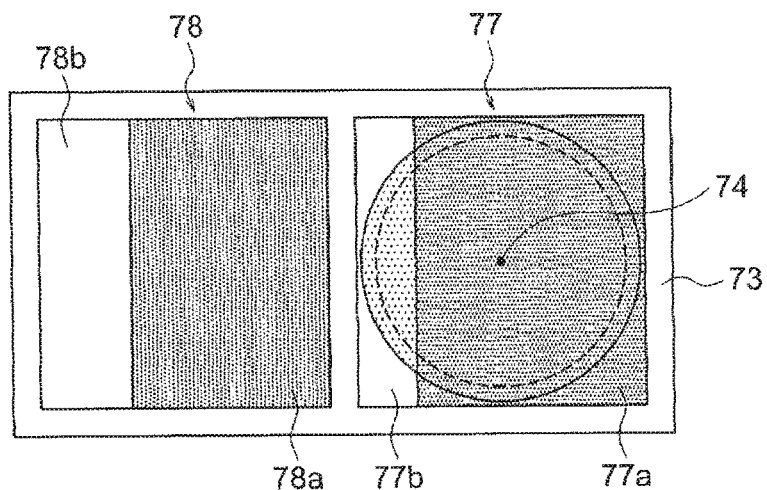
FIG. 37A is a diagram showing a state in which a first aperture member of a second modification is inserted to the optical path.
Figure 37B:
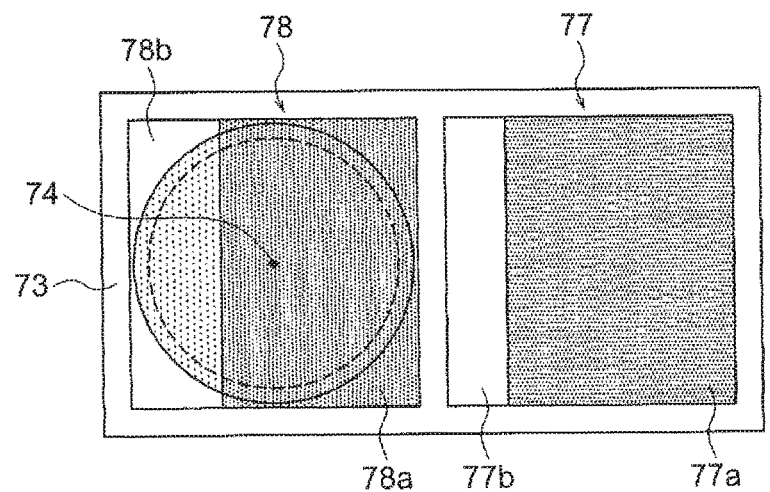
FIG. 37B is a diagram showing a state in which a second aperture member of the second modification is inserted to the optical path.

FIG. 37A is diagram showing a state in which a first aperture member of a second modification is inserted to the optical path. FIG. 37B is a diagram showing a state in which a second aperture member of the second modification is inserted to the optical path.

The first aperture member 77 includes a light-shielding part 77a and a first opening 77b. In the first aperture member 77, a portion including the optical axis 74 of the condenser lens is the light-shielding part 77a. The first aperture member 77 has the first opening 77b at a position eccentric with respect to the optical axis 74.

The second aperture member 78 includes a light-shielding part 78a and a second opening 78b. In the second aperture member 78, a portion including the optical axis 74 of the condenser lens is the light-shielding part 78a. The second aperture member 78 has the second opening 78b at a position eccentric with respect to the optical axis 74.

Then, the direction connecting the optical axis 74 with the centroid of the first opening 77b and the direction connecting the optical axis 74 with the centroid of the second opening 78b are the same when the first aperture member 77 is inserted to the optical path and when the second aperture member 78 is inserted to the optical path. In FIG. 37A and FIG. 37B, the first opening 77b and the second opening 78b are positioned on one side on the same straight line.

The area of the illumination light passing through the first opening 77b is smaller than the area of the illumination light passing through the second opening 78b. Therefore, the characteristic curve differs between when the first aperture member 77 is inserted to the optical path and when the second aperture member 78 is inserted to the optical path. When the first aperture member 77 is inserted to the optical path, the characteristic curve is a curve downward to the right as shown in FIG. 7. When the second aperture member 78 is inserted to the optical path, the characteristic curve is a curve downward to the right.

It is noted, however, that the slope of the characteristic curve is gentler when second aperture member 78 is inserted to the optical path, compared with when the first aperture member 77 is inserted to the optical path. Supposing that the degree of the slope of the characteristic curve is the detection sensitivity for the inclination angle, the detection sensitivity when the second aperture member 78 is inserted to the optical path is lower than the detection sensitivity when the first aperture member 77 is inserted to the optical path.

Thus, according to the sample shape measuring apparatus of the present embodiment, it is possible to obtain the direction of tilt and the amount of tilt in the surface of the sample by switching the detection sensitivity.

The spectral transmittance characteristic in the first opening 77b is equal to the spectral transmittance characteristic in the second opening 78b. It is noted, however, the spectral transmittance characteristic in the first opening 77b may be differentiated from the spectral transmittance characteristic in the second opening 78b, as described above.

Furthermore, the first aperture member and the second aperture member may include a transmission region variable unit that makes the transmission region of the opening variable. The transmission region variable unit may be configured with, for example, a liquid crystal shutter. In this manner, the first aperture member and the second aperture member can be implemented with one aperture member. Furthermore, in this case, a moving mechanism becomes unnecessary.

Furthermore, in the sample shape measuring apparatus of the present embodiment, it is preferable that in the aperture member, a portion including the optical axis of the condenser lens be a light-shielding part, the aperture member have a first opening and a second opening at a position eccentric with respect to the optical axis, and the direction connecting the optical axis with the centroid of the first opening when the aperture member is inserted to the optical path intersect the direction connecting the optical axis with the centroid of the second opening.

Figure 38:
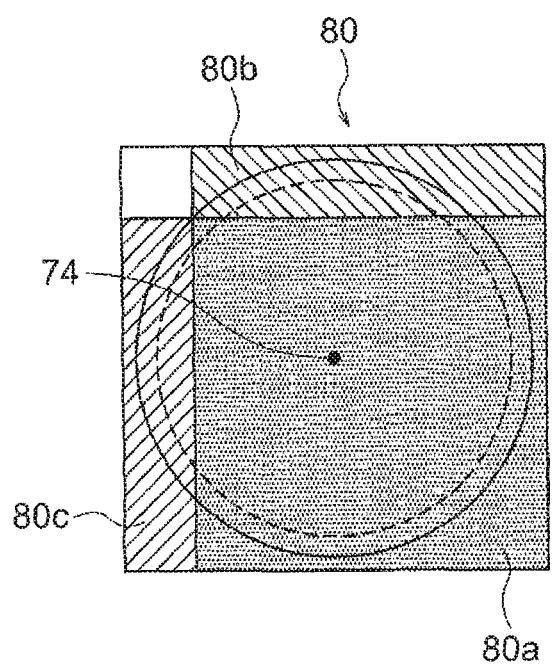
FIG. 38 is a diagram showing a state in which an aperture member is inserted to the optical path.

FIG. 38 is a diagram showing a state in which the aperture member is inserted to the optical path. An aperture member 80 has a light-shielding part 80a, a first opening 80b, and a second opening 80c. In the aperture member 80, a portion including the optical axis 74 of the condenser lens is the light-shielding part 80a. The aperture member 80 has the first opening 80b and the second opening 80c at a position eccentric with respect to the optical axis 74.

Then, the direction connecting the optical axis 74 with the centroid of the first opening 80b intersects the direction connecting the optical axis 74 with the centroid of the second opening 80c. In FIG. 38, the first opening 80b is positioned on one of two straight lines orthogonal to each other and the second opening 80c is positioned on the other straight line.

The area of illumination light passing through the first opening 80b is equal to the area of the illumination light passing through the second opening 80c. Therefore, the state of change in area S when the inclination angle $\theta_s$ is changed is the same when illumination light passes through the first opening 80b and when illumination light passes through the second opening 80c. The line showing the change is downward to the right as shown in FIG. 7 both when illumination light passes through the first opening 80b and when illumination light passes through the second opening 80c.

The spectral transmittance characteristic in the first opening 80b need to be differentiated from the spectral transmittance characteristic in the second opening 80c. By using a plurality of photoelectric conversion elements for the detecting element 62 or by changing the wavelength of the illumination light, it is possible to perform measurement with the aperture member 80 kept always disposed in the optical path.

In the sample shape measuring apparatus of the present embodiment, it is possible to detect change in quantity of light of the imaging light in any direction, without moving the aperture member. Therefore, according to the sample shape measuring apparatus of the present embodiment, it is possible to obtain the direction of tilt and the amount of tilt in the surface of the sample.

Furthermore, in the sample shape measuring apparatus of the present embodiment, it is preferable that in the aperture member, a portion including the optical axis of the condenser lens be a light-shielding part, the aperture member have an opening at a position eccentric with respect to the optical axis, and the direction connecting the optical axis with a centroid of the opening be changeable.

Figure 39:
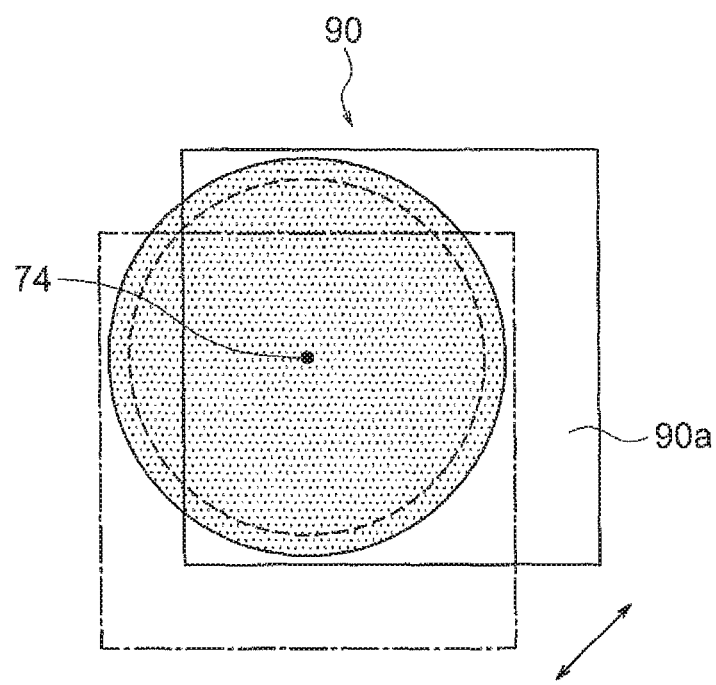
FIG. 39 is a diagram showing a state in which an aperture member is inserted to the optical path.

FIG. 39 is a diagram showing a state in which an aperture member is inserted to the optical path. An aperture member 90 has a light-shielding part 90a. In the aperture member 90, a portion including the optical axis 74 of the condenser lens is the light-shielding part 90a. The aperture member 90 has an opening at a position eccentric with respect to the optical axis 74.

In the sample shape measuring apparatus of the present embodiment, the aperture member 90 is movable from the position shown by the solid line to the position shown by the dashed and single-dotted line. That is, the direction connecting the optical axis with the opening centroid is changeable.

By moving the aperture member 90 to the position shown by the solid line, it is possible to achieve the same state as in FIG. 35A. Furthermore, by moving the aperture member 90 to the position shown by the dashed and single-dotted line, it is possible to achieve the same state as in FIG. 35B.

In the sample shape measuring apparatus of the present embodiment, it is possible to detect change in quantity of light of the imaging light in any direction. Therefore, according to the sample shape measuring apparatus of the present embodiment, it is possible to obtain the direction of tilt and the amount of tilt in the surface of the sample.

Furthermore, in the sample shape measuring apparatus of the present embodiment, it is preferable that the processing apparatus have a lookup table, as data, representing the relation between the quantity of light and the amount of tilt in a plurality of directions connecting the optical axis with the centroid of the opening, and calculate the amount of tilt and the tilt direction using the lookup table.

By doing this, it is possible to quickly obtain the amount of tilt in the surface of the sample.

Furthermore, in the sample shape measuring apparatus of the present embodiment, it is preferable that the opening be provided such that illumination light of the illumination optical system is applied to part of the pupil and the outside of the pupil at the pupil position of the observation optical system.

By doing this, in the sample shape measuring apparatus of the present embodiment, it is possible to detect change in quantity of light of the imaging light in any direction. Therefore, according to the sample shape measuring apparatus of the present embodiment, it is possible to obtain the direction of tilt and the amount of tilt in the surface of the sample.

In the sample shape measuring apparatus of the present embodiment, although a range wider than the light-detecting pixel is set as a predetermined region, the same range as one light-detecting pixel may be set as a predetermined region. By doing this, it is possible to improve the spatial resolution in a plane orthogonal to the optical axis. Therefore, it is possible to measure the surface shape of the sample with high spatial resolution.

Furthermore, in the sample shape measuring apparatus of the present embodiment, although a surface light source is used as a light source, a point light source may be used as a light source. When a point light source is used, it is preferable that the illumination light and the sample be relatively moved in a plane orthogonal to the optical axis. Thus, it is possible to calculate the amount of tilt at a plurality of positions in the sample.

A sample shape measuring apparatus of the present embodiment includes an illumination optical system, an observation optical system, a holding member, a detecting element, and a processing apparatus. The illumination optical system includes a light source, a condenser lens, and an aperture member. The observation optical system includes an objective lens and an imaging lens. The holding member holds a sample and is disposed between the illumination optical system and the observation optical system. The aperture member has a light-shielding part and an opening. The light-shielding part is provided so as to include the optical axis of the condenser lens. The opening is provided at a position eccentric with respect to the optical axis. An image of the opening is formed in the vicinity of the pupil position of the observation optical system and is formed so as to overlap part of the outer edge of the pupil of the observation optical system. Illumination light applied to the sample by the illumination optical system is transmitted through the sample. Light emitted from the sample is incident on the observation optical system. The detecting element receives light emitted from the observation optical system. The processing apparatus obtains the quantity of light based on the received light, calculates the difference or the ratio between the quantity of light and the reference quantity of light, and calculates the amount of tilt in the surface of the sample from the difference or the ratio.

Figure 40A:
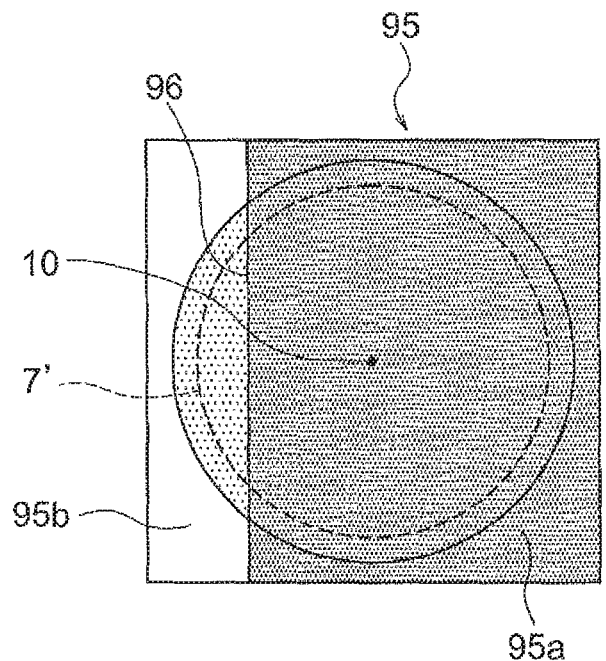
FIG. 40A is a diagram showing a state of illumination light.

In a sample shape measuring apparatus 50 shown in FIG. 33, an aperture member 55 is used. An example of the aperture member 55 is shown in FIG. 40A. FIG. 40A is a diagram showing a state of illumination light. An aperture member 95 has a light-shielding part 95*a* and an opening 95*b*. The light-shielding part 95*a* is provided so as to include the optical axis 10. The opening 95*b* is provided at a position away from the optical axis 10. The optical axis 10 is the optical axis of the entire optical system in the sample shape measuring apparatus 50. Therefore, the optical axis 10 can read as "the optical axis of the condenser lens" as necessary.

The position of the light-shielding part 95*a* and the position of the opening 95*b* relative to the optical axis 10 are determined by disposing the aperture member 95 in the optical path of the illumination optical system. Therefore, the aperture member 95 is disposed such that the light-shielding part 95*a* includes the optical axis 10 whereby the opening 95*b* is positioned at a place eccentric with respect to the optical axis 10.

Figure 40B:
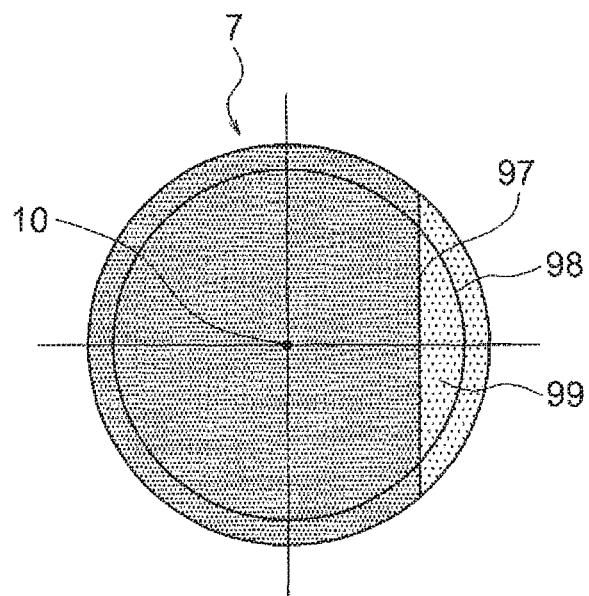
FIG. 40B is a diagram showing a state of imaging light.

As shown in FIG. 40B, the image of the opening is formed in the vicinity of the pupil position of the observation optical system. FIG. 40B is a diagram showing a state of the imaging light. In FIG. 40B, light flux passing through the opening 95*b* is shown but the outline of the opening 95*b* is not shown. Although the outline of the opening 95*b* is not shown, the image of the opening 95*b* is formed so as to overlap part of the outer edge of the pupil 7 of the objective lens.

In this way, in the sample shape measuring apparatus 50, the opening 95*b* of the aperture member 95 is provided at a position eccentric with respect to the optical axis 10. Thus, a specific correlation occurs between the amount of tilt in the surface of the sample and the quantity of light of the imaging light. Thus, it is possible to measure the amount of tilt in the surface of the sample from change in quantity of light of the imaging light. Furthermore, by using the measured amount of tilt, it is possible to measure the surface shape of the sample with high accuracy.

In the sample shape measuring apparatus of the present embodiment, it is preferable that the aperture member include a boundary line that separates the light-shielding part from the opening, and the boundary line be formed of a line parallel to one straight line orthogonal to the optical axis.

When measurement is performed with the sample shape measuring apparatus of the present embodiment, in the sample shape measuring method of the present embodiment, it is preferable that light emitted from the observation optical system be light passing through a light flux transmission region, the light flux transmission region be a region surrounded by an outside boundary line and a first boundary line, the outside boundary line be formed of part of the outer edge of the pupil of the observation optical system, and the first boundary line be formed of a line parallel to one straight line orthogonal to the optical axis. The first boundary line is an image of the boundary line that separates a light-shielding part from an opening.

By doing this, it is possible to readily fabricate the aperture member.

FIG. 40A shows a state of illumination light applied to the aperture member 95. The radiation range of illumination light can be considered as the pupil of the illumination optical system. Therefore, it follows that FIG. 40A shows a state in which the pupil of the illumination optical system is superimposed on the aperture member 95.

The aperture member 95 has a light-shielding part 95*a* and an opening 95*b*. When the aperture member 95 is inserted to the optical path of the illumination optical system, the aperture member 95 is disposed such that the light-shielding part 95*a* includes the optical axis 10. The opening 95*b* is positioned at a place eccentric with respect to the optical axis 10.

A boundary line 96 is formed between the light-shielding part 95*a* and the opening 95*b*. The light-shielding part 95*a* and the opening 95*b* are separated from each other by the boundary line 96. The boundary line 96 is a line parallel to one straight line orthogonal to the optical axis 10.

FIG. 40B shows a state of the imaging light at the position of the pupil 7 of the objective lens. A boundary line 97 is the first boundary line. The boundary line 97 is an image of the boundary line 96. A boundary line 98 is the outside boundary line. The boundary line 98 is formed of part of the outer edge of the pupil 7 of the objective lens. A light flux transmission region 99 is surrounded by the boundary line 97 and the boundary line 98. The light flux transmission region refers to a region of light passing through the pupil 7 of the objective lens.

When the boundary line positioned on the optical axis side is formed of a line parallel to one straight line orthogonal to the optical axis, the boundary line is assumed to be "boundary line of type 1". The boundary line 96 and the boundary line 97 are boundary lines of type 1.

It is preferable that the sample shape measuring apparatus of the present embodiment include a first aperture member as the aperture member, the first aperture member have a boundary line that separates a light-shielding part from an opening, and a straight line connecting predetermined two points be positioned between the boundary line and the optical axis. Here, the predetermined two points are two points where the boundary line intersects the outer edge of the pupil of the illumination optical system when the pupil of the illumination optical system is superimposed on the first aperture member.

When measurement is performed with the sample shape measuring apparatus of the present embodiment, in the sample shape measuring method of the present embodiment, it is preferable that light emitted from the observation optical system be light passing through the light flux transmission region, the light flux transmission region be a region surrounded by the outside boundary line and a second boundary line, the outside boundary line be formed of part of the outer edge of the pupil of the observation optical system, the outside boundary line and the second boundary line be both convex, and the direction of the convex shape be the same in the outside boundary line and the second boundary line. The second boundary line is an image of the boundary line that separates a light-shielding part from an opening.

Figure 41A:
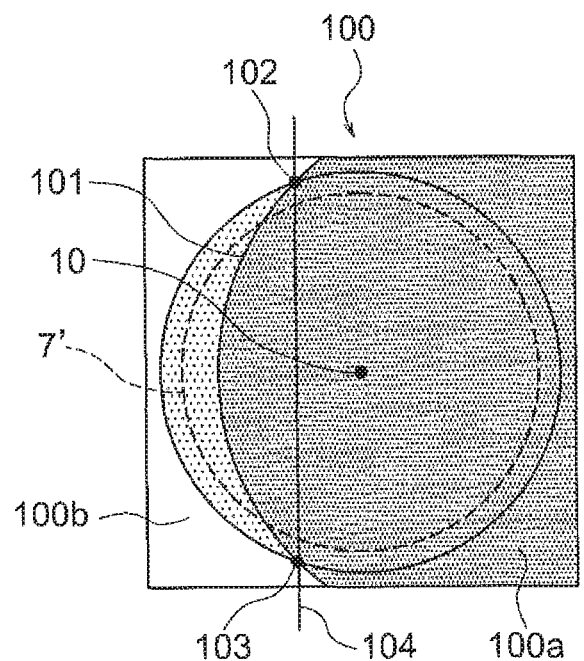
FIG. 41A is a diagram showing a state of illumination light when an aperture member of a third modification is used.
Figure 41B:
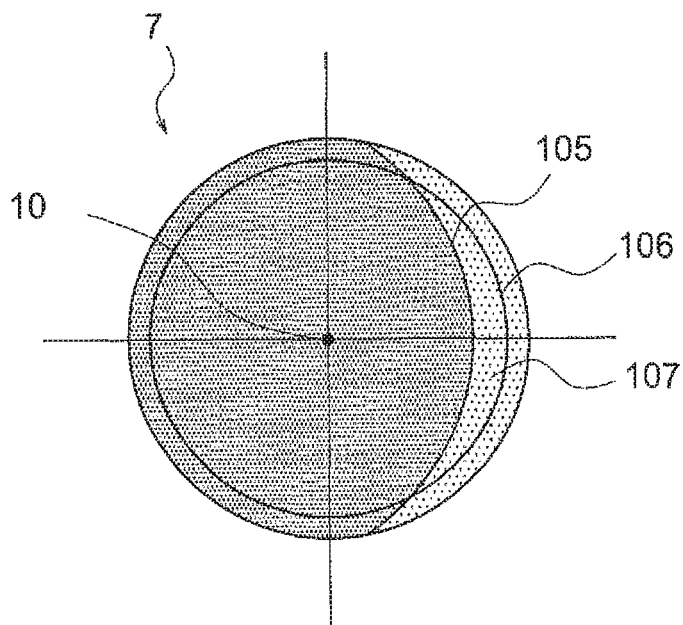
FIG. 41B is a diagram showing a state of imaging light when the aperture member of the third modification is used.

FIG. 41A is a diagram showing a state of illumination light when an aperture member of a third modification is used. FIG. 41B is a diagram showing a state of imaging light when the aperture member of the third modification is used.

FIG. 41A shows a state of illumination light applied to an aperture member 100. The radiation range of illumination light can be considered as the pupil of the illumination optical system. Therefore, FIG. 41A shows a state in which the pupil of the illumination optical system is superimposed on the aperture member 100.

The aperture member 100 of the third modification has a light-shielding part 100*a* and an opening 100*b*. When the aperture member 100 is inserted to the optical path of the illumination optical system, the aperture member 100 is disposed such that the light-shielding part 100*a* includes the optical axis 10. The opening 100*b* is positioned at a place eccentric with respect to the optical axis 10.

A boundary line 101 is formed between the light-shielding part 100*a* and the opening 100*b*. The light-shielding part 100*a* and the opening 100*b* are separated from each other by the boundary line 101.

When the pupil of the illumination optical system is superimposed on the aperture member 100, the boundary line 101 intersects the outer edge of the pupil of the illumination optical system at a point 102 and a point 103. The point 102 and the point 103 are the predetermined two points. A straight line 104 is a straight line passing through the point 102 and the point 103.

The boundary line 101 is formed of an arc. The arc is formed so as to be convex from the light-shielding part 100*a* toward the opening 100*b*. Therefore, in the aperture member 100, the straight line 104 is positioned between the boundary line 101 and the optical axis 10.

In the aperture member 100, the boundary line 101 is a line formed of one curved line. However, the boundary line 101 may be any one of a line formed with a plurality of straight lines, a line formed with a plurality of curved line, or a line formed with a curved line and a straight line.

In FIG. 41B, a state of imaging light at the position of the pupil 7 of the objective lens is shown. A boundary line 105 is the second boundary line. The boundary line 105 is an image of the boundary line 101. A boundary line 106 is the outside boundary line. The boundary line 106 is formed of part of the outer edge of the pupil 7 of the objective lens. The light flux transmission region 107 is surrounded by the boundary line 105 and the boundary line 106.

The boundary line 105 and the boundary line 106 are both convex. Then, the direction of the convex shape is the same in the boundary line 105 and the boundary line 106. In this case, the light flux transmission region 107 is shaped like a meniscus having a concave portion facing toward the optical axis 10 side. Therefore, it can be said that the boundary line 105 is formed of a concave line toward the optical axis 10 side.

When a boundary line positioned on the optical axis side is formed of a line concave toward the optical axis side, the boundary line is referred to as "boundary line of type 2". The boundary line 101 and the boundary line 105 are boundary lines of type 2.

Figure 42A:
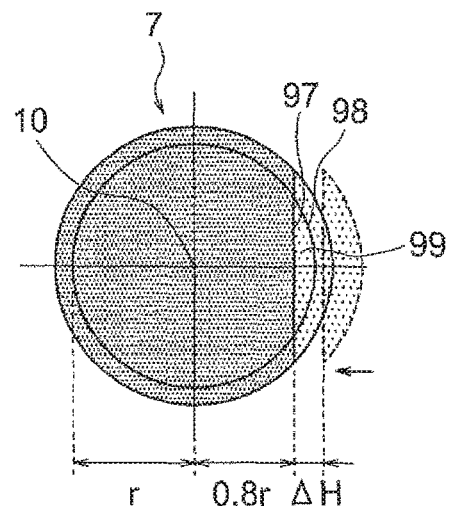
FIG. 42A is a diagram showing a state of imaging light in a boundary line of type 1.
Figure 42B:
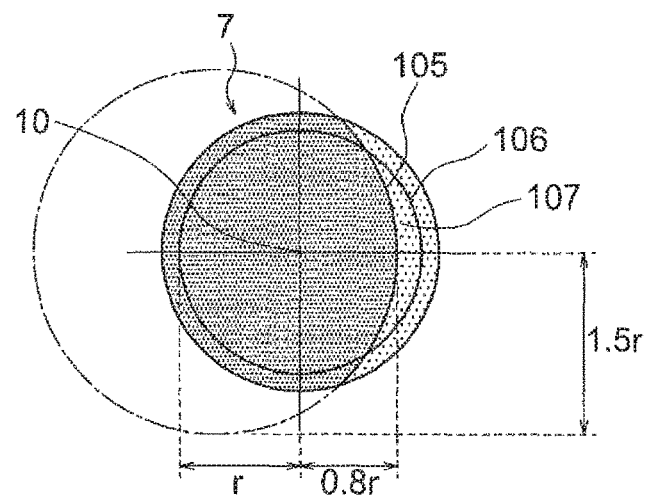
FIG. 42B is a diagram showing a state of imaging light in a boundary line of type 2.

The characteristic showing the correlation between the amount of tilt in the surface of the sample and the quantity of light of the imaging light (hereinafter referred to as "correlation characteristic") varies depending on the shape of the boundary line. FIG. 42A is a diagram showing a state of imaging light in a boundary line of type 1. FIG. 42B is a diagram showing a state of imaging light in a boundary line of type 2.

The light flux transmission region is shifted in accordance with the amount of tilt in the surface of the sample. Then, the area of the light flux transmission region changes in accordance with a shift of the light flux transmission region. The quantity of light of the imaging light is the sum of light intensity in the light flux transmission region (hereinafter referred to as "the sum of light intensity"). Therefore, the above-noted correlation characteristic can be indicated by change in the sum of light intensity when the amount of shift of the light flux transmission region is changed. The sum of light intensity can be obtained by integrating the light intensity at points in the light flux transmission region.

Figure 42C:
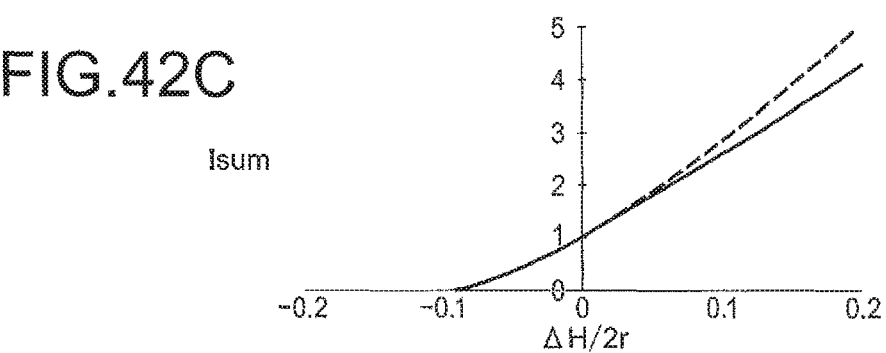
FIG. 42C is a diagram showing the correlation characteristic in a case where a distribution of the quantity of illumination light is uniform.

FIG. 42C is a diagram showing the correlation characteristic in a case where the distribution of the quantity of illumination light is uniform. $I_{sum}$ represents the sum of light intensity. In FIG. 42C, the correlation characteristic in the boundary line of type 1 and the correlation characteristic in the boundary line of type 2 are shown. The graph in FIG. 42C is a graph showing the result of a simulation.

In a simulation in the boundary line of type 1, as shown in FIG. 42A, the radius of the pupil 7 of the objective lens is r, and the distance from the optical axis 10 to the boundary line 97 is 0.8×r.

In a simulation in the boundary line of type 2, as shown in FIG. 42B, the radius of the pupil 7 of the objective lens is r, and the distance from the optical axis 10 to the boundary line 105 is 0.8×r. The boundary line 105 is formed of an arc of a circle having a radius of 1.5×r.

Here, it is assumed that the light flux transmission region moves in the X direction. The distance from the optical axis 10 to the boundary line 97 or the distance from the optical axis 10 to the boundary line 105 is a distance in the direction in which the light flux transmission region is shifted.

The area of the light flux transmission region is the area of the light flux transmission region 99 or the light flux transmission region 107. The shift amount is the amount of movement of the light flux transmission region. In FIG. 42A, the amount of movement of the light flux transmission region 99 is denoted by ΔH. In FIG. 42B, the state of movement of light flux or the shift amount ΔH is not shown.

In the graph in FIG. 42C, the simulation result in the boundary line of type 2 is shown by a solid line, and the simulation result in the boundary line of type 1 is shown by a dashed line. In both simulations, the values on the vertical axis are standardized by a value when ΔH/2r=0.

As shown in FIG. 42C, the slope in a solid line is smaller than the slope in a dashed line. This means that the detection sensitivity in the boundary line of type 2 is lower than the detection sensitivity in the boundary line of type 1. This point will be described.

In FIG. 1, for example, when imaging light $L_{SP1}$ shifts in the left direction in the drawing sheet, a partial region in imaging light $L_{SP2}$ (hereinafter referred to as "moving region MA") enters the inside of the pupil 7 of the objective lens.

The area of the moving region MA in the boundary line of type 2 is slightly larger than the moving region MA in the boundary line of type 1. However, the difference is very small. Thus, here, a description will be given supposing that both moving regions MA have the same area.

When the shift amount ΔH in the boundary line of type 1 and the shift amount ΔH in the boundary line of type 2 are the same, the areas of both moving regions MA are the same. When the light intensity distribution of illumination light is uniform, the quantities of light $I_{MA}$ in the moving regions MA are the same as long as both moving regions MA have the same area.

When the boundary line of type 1 (FIG. 42A) is compared with the boundary line of type 2 (FIG. 42B), the area of the light flux transmission region 107 is larger than the area of the light flux transmission region 99. In this case, the quantity of light $I_{type2}$ in the light flux transmission region 107 is greater than the quantity of light $I_{type1}$ in the light flux transmission region 99.

When a shift of the light flux transmission region occurs, $I_{MA}$ is added to both $I_{type1}$ and $I_{type2}$. In this case, the proportion of $I_{MA}$ to $I_{type2}$ is smaller than the proportion of $I_{MA}$ to $I_{type1}$. Thus, the detection sensitivity in the boundary line of type 2 is lower than the detection sensitivity in the boundary line of type 1.

However, if the detection sensitivity is low, the detection range is wider. Therefore, the detection range in the boundary line of type 2 is wider than the detection range in the boundary line of type 1. As a result, it is possible to detect a larger amount of tilt in the boundary line of type 2, compared with the boundary line of type 1.

In this way, when the aperture member 100 of the third modification is used, change in quantity of light of the imaging light is smaller, compared with when the aperture member 95 is used, and, therefore, the range in which the amount of tilt can be measured becomes wider. Therefore, by using the aperture member 100 of the third modification, it is possible to measure the surface of a sample having a larger amount of tilt.

In the foregoing description, it is premised that the area of the moving region MA is the same for the boundary line of type 1 and for the boundary line of type 2. However, as described above, the area of the moving region MA is different between the boundary line of type 1 and the boundary line of type 2. Even in this case, since the difference in the area of the light flux transmission region is significantly larger than the difference in the area of the moving region MA, the difference in the area of the moving region MA can be considered to be zero. Therefore, even when there is a difference in the area of the moving region MA, the detection sensitivity in the boundary line of type 2 is lower than the detection sensitivity in the boundary line of type 1.

Figure 43A:
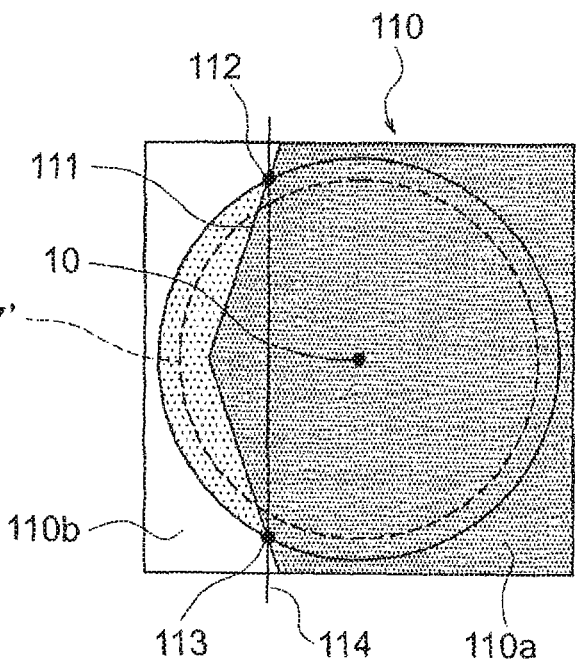
FIG. 43A is a diagram showing another example of the aperture member of the third modification.
Figure 43B:
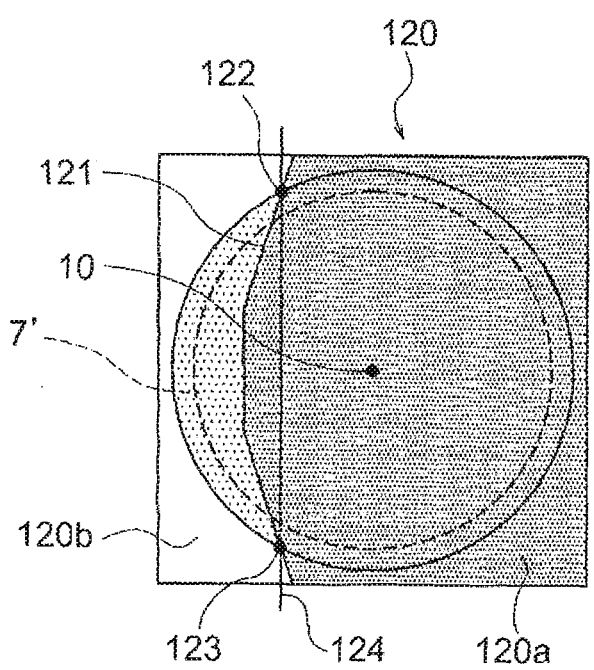
FIG. 43B is a diagram showing another example of the aperture member of the third modification.

Another example of the aperture member 100 of the third modification is shown in FIG. 43A and FIG. 43B. FIG. 43A is a diagram showing an aperture member formed with two straight lines. FIG. 43B is a diagram showing an aperture member formed with three straight lines.

As shown in FIG. 43A, an aperture member 110 has a light-shielding part 110a and an opening 110b. When the aperture member 110 is inserted to the optical path of the illumination optical system, the aperture member 110 is disposed such that the light-shielding part 110a includes the optical axis 10. The opening 110b is positioned at a place eccentric with respect to the optical axis 10.

A boundary line 111 is formed between the light-shielding part 110a and the opening 110b. The light-shielding part 110a is separated from the opening 110b by the boundary line 111.

When the pupil of the illumination optical system is superimposed on the aperture member 110, the boundary line 111 intersects the outer edge of the pupil of the illumination optical system at a point 112 and a point 113. The point 112 and the point 113 are predetermined two points. A straight line 114 is a straight line passing through the point 112 and the point 113.

The boundary line 111 is formed with two straight lines. The two straight lines are formed to be convex from the light-shielding part 110a toward the opening 110b. Therefore, in the aperture member 110, the straight line 114 is positioned between the boundary line 111 and the optical axis 10.

The boundary line 111 is a boundary line of type 2. Therefore, by using the aperture member 110, it is possible to measure a sample having a larger amount of tilt in the surface.

As shown in FIG. 43B, an aperture member 120 has a light-shielding part 120a and an opening 120b. When the aperture member 120 is inserted to the optical path of the illumination optical system, the aperture member 120 is disposed such that the light-shielding part 120a includes the optical axis 10. The opening 120b is positioned at a place eccentric with respect to the optical axis 10.

A boundary line 121 is formed between the light-shielding part 120a and the opening 120b. The light-shielding part 120a is separated from the opening 120b by the boundary line 121.

When the pupil of the illumination optical system is superimposed on the aperture member 120, the boundary line 121 intersects the outer edge of the pupil of the illumination optical system at a point 122 and a point 123. The point 122 and the point 123 are the predetermined two points. A straight line 124 is a straight line passing through the point 122 and the point 123.

The boundary line 121 is formed with three straight lines. The three straight lines are formed so as to be convex from the light-shielding part 120a toward the opening 120b. Therefore, in the aperture member 120, the straight line 124 is positioned between the boundary line 121 and the optical axis 10.

The boundary line 121 is a boundary line of type 2. Therefore, by using the aperture member 120, it is possible to measure a sample having a larger amount of tilt in the surface.

It is preferable that the sample shape measuring apparatus of the present embodiment include a second aperture member as the aperture member, the second aperture member have a boundary line that separates a light-shielding part from an opening, and the boundary line be positioned between a straight line connecting predetermined two points and the optical axis. Here, the predetermined two points are two points where the boundary line intersects the outer edge of the pupil of the illumination optical system when the pupil of the illumination optical system is superimposed on the aperture member.

When measurement is performed with the sample shape measuring apparatus of the present embodiment, in the sample shape measuring method of the present embodiment, it is preferable that light emitted from the observation optical system be light passing through the light flux transmission region, the light flux transmission region be a region surrounded by an outside boundary line and a third boundary line, the outside boundary line be formed of part of the outer edge of the pupil of the observation optical system, the outside boundary line and the third boundary line are both convex, and the direction of the convex shape be directly opposite between the outside boundary line and the third boundary line. The third boundary line is an image of the boundary line that separates a light-shielding part from an opening.

Figure 44A:
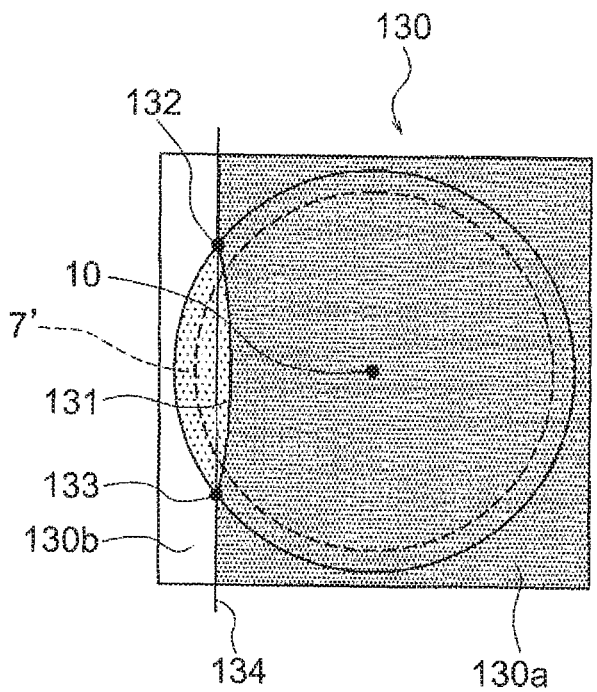
FIG. 44A is a diagram showing a state of illumination light when an aperture member of a fourth modification is used.
Figure 44B:
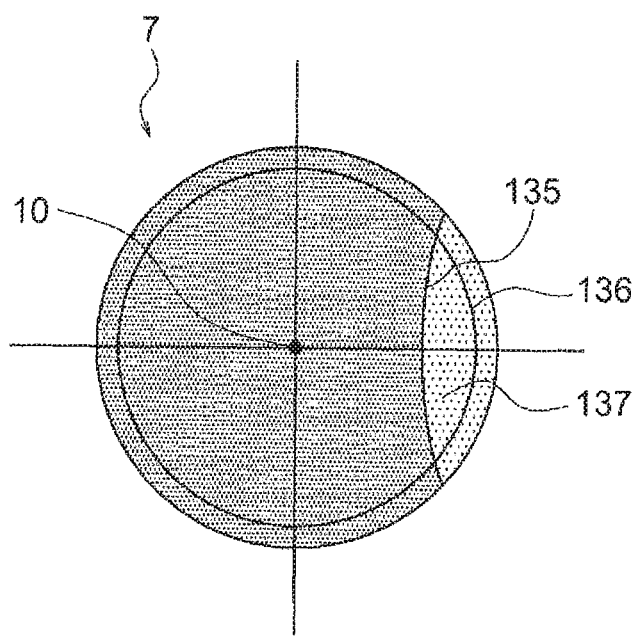
FIG. 44B is a diagram showing a state of imaging light when the aperture member of the fourth modification is used.

FIG. 44A is a diagram showing a state of illumination light when an aperture member of a fourth modification is used. FIG. 44B is a diagram showing a state of imaging light when the aperture member of the fourth modification is used. FIG. 44A shows a state of illumination light applied to an aperture member 130. The radiation range of illumination light can be considered as the pupil of the illumination optical system. Therefore, FIG. 44A shows a state in which the pupil of the illumination optical system is superimposed on the aperture member 130.

The aperture member 130 of the fourth modification has a light-shielding part 130a and an opening 130b. When the aperture member 130 is inserted to the optical path of the illumination optical system, the aperture member 130 is disposed such that the light-shielding part 130a includes the optical axis 10. The opening 130b is positioned at a place eccentric with respect to the optical axis 10.

A boundary line 131 is formed between the light-shielding part 130a and the opening 130b. The light-shielding part 130a and the opening 130b are separated from each other by the boundary line 131.

When the pupil of the illumination optical system is superimposed on the aperture member 130, the boundary line 131 intersects the outer edge of the pupil of the illumination optical system at a point 132 and a point 133. The point 132 and the point 133 are the predetermined two points. A straight line 134 is a straight line passing through the point 132 and the point 133.

The boundary line 131 is formed of an arc. The arc is formed so as to be convex from the opening 130b toward the light-shielding part 130a. Therefore, in the aperture member 130, the boundary line 131 is positioned between the straight line 134 and the optical axis 10.

In the aperture member 130, the boundary line 131 is a line formed of one curved line. However, the boundary line 131 may be any one of a line formed with a plurality of straight lines, a line formed with a plurality of curved line, or a line formed with a curved line and a straight line.

In FIG. 44B, a state of imaging light at the position of the pupil 7 of the objective lens is shown. A boundary line 135 is the third boundary line. The boundary line 135 is an image of the boundary line 131. A boundary line 136 is the outside boundary line. The boundary line 136 is formed of part of the outer edge of the pupil 7 of the objective lens. The light flux transmission region 137 is surrounded by the boundary line 135 and the boundary line 136.

The boundary line 135 and the boundary line 136 are both convex. Then, the direction of the convex shape is directly opposite between the boundary line 135 and the boundary line 136. In this case, the shape of the light flux transmission region 137 is biconvex. Therefore, it can be said that the boundary line 135 is formed of a line convex toward the optical axis 10 side.

When a boundary line positioned on the optical axis side is formed of a line convex toward the optical axis side, the boundary line is referred to as "boundary line of type 3". The boundary line 131 and the boundary line 135 are boundary lines of type 3.

Figure 45A:
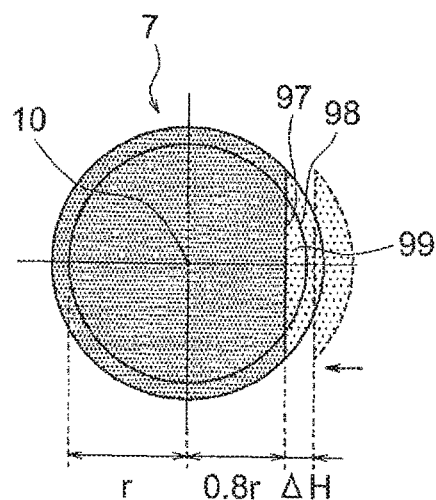
FIG. 45A is a diagram showing a state of imaging light in a boundary line of type 1.
Figure 45B:
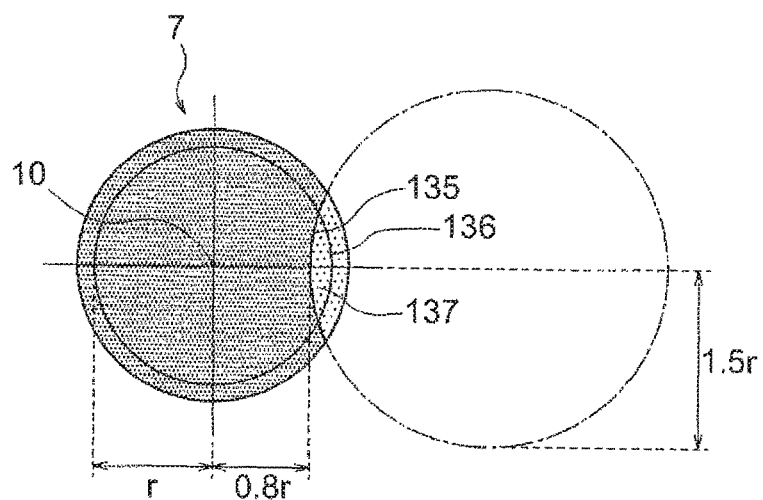
FIG. 45B is a diagram showing a state of imaging light in a boundary line of type 3.

As described above, the correlation characteristic varies depending on the shape of the boundary line. FIG. 45A is a diagram showing a state of imaging light in a boundary line of type 1. FIG. 45B is a diagram showing a state of imaging light in a boundary line of type 3.

As described above, the light flux transmission region is shifted in accordance with the amount of tilt in the surface of the sample. Then, the area of the light flux transmission region changes in accordance with a shift of the light flux transmission region. The quantity of light of the imaging light is the sum of light intensity in the light flux transmission region. Therefore, the above-noted correlation characteristic can be indicated by change in the quantity of light of the imaging light when the amount of shift of the light flux transmission region is changed.

Figure 45C:
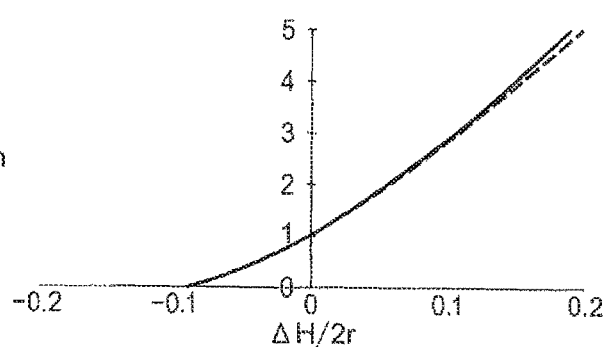
FIG. 45C is a diagram showing the correlation characteristic in a case where a distribution of the quantity of illumination light is uniform.

FIG. 45C is a diagram showing the correlation characteristic in a case where the distribution of the quantity of illumination light is uniform. In FIG. 45C, the correlation characteristic in the boundary line of type 1 and the correlation characteristic in the boundary line of type 3 are shown. The graph in FIG. 45C is a graph showing the result of a simulation.

In a simulation in the boundary line of type 1, as shown in FIG. 45A, the radius of the pupil 7 of the objective lens is r, and the distance from the optical axis 10 to the boundary line 97 is 0.8×r.

In a simulation in the boundary line of type 3, as shown in FIG. 45B, the radius of the pupil 7 of the objective lens is r, and the distance from the optical axis 10 to the boundary line 135 is 0.8×r. The boundary line 135 is formed of an arc of a circle having a radius of 1.5×r.

Here, it is assumed that the light flux transmission region moves in the X direction. The distance from the optical axis 10 to the boundary line 97 or the distance from the optical axis 10 to the boundary line 135 is a distance in the direction in which the light flux transmission region is shifted.

The area of the light flux transmission region is the area of the light flux transmission region 99 or the light flux transmission region 137. The shift amount is the amount of movement of the light flux transmission region. In FIG. 45A, the amount of movement of the light flux transmission region 99 is denoted by ΔH. In FIG. 45B, the state of movement of light flux or the shift amount ΔH is not shown.

In the graph in FIG. 45C, the simulation result in the boundary line of type 3 is shown by a solid line, and the simulation result in the boundary line of type 1 is shown by a dashed line. In both simulations, the values on the vertical axis are standardized by a value when ΔH/2r=0.

As shown in 45C, the slope in a solid line is larger than the slope in a dashed line. This means that the detection sensitivity in the boundary line of type 3 is higher than the detection sensitivity in the boundary line of type 1. This point will be described.

The area of the moving region MA in the boundary line of type 3 is slightly smaller than the moving region MA in the boundary line of type 1. However, the difference is very small. Thus, here, a description will be given supposing that both moving regions MA have the same area.

When the shift amount ΔH in the boundary line of type 1 and the shift amount ΔH in the boundary line of type 3 are the same, the areas of both moving regions MA are the same. When the light intensity distribution of illumination light is uniform, the quantities of light $I_{MA}$ in the moving regions MA are the same as long as both moving regions MA have the same area.

When the boundary line of type 1 (FIG. 45A) is compared with the boundary line of type 3 (FIG. 45B), the area of the light flux transmission region 137 is smaller than the area of the light flux transmission region 99. In this case, the quantity of light $I_{type3}$ in the light flux transmission region 137 is smaller than the quantity of light $I_{type1}$ in the light flux transmission region 99.

When a shift of the light flux transmission region occurs, $I_{MA}$ is added to both $I_{type1}$ and $I_{type3}$. In this case, the proportion of $I_{MA}$ to $I_{type3}$ is greater than the proportion of $I_{MA}$ to $I_{type1}$. Thus, the detection sensitivity in the boundary line of type 3 is higher than the detection sensitivity in the boundary line of type 1.

In this way, when the aperture member 130 of the fourth modification is used, change in quantity of light of the imaging light is larger compared to when the aperture member 95 is used, and, therefore, the minimum value of the amount of tilt that can be measured becomes smaller. Therefore, by using the aperture member 130 of the fourth modification, it is possible to measure the surface of a sample having a smaller amount of tilt.

It is noted, however, that when the detection sensitivity is high, the detection range is narrower. Therefore, the detection range in the boundary line of type 3 is narrower than the detection range in the boundary line of type 1.

In the foregoing description, it is premised that the area of the moving region MA is the same for the boundary line of type 1 and for the boundary line of type 3. However, as described above, the area of the moving region MA is different between the boundary line of type 1 and the boundary line of type 3. Even in this case, since the difference in the area of the light flux transmission region is significantly larger than the difference in the area of the moving region MA, the difference in the area of the moving region MA can be considered to be zero. Therefore, even when there is a difference in the area of the moving region MA, the detection sensitivity in the boundary line of type 3 is higher than the detection sensitivity in the boundary line of type 1.

Figure 46A:
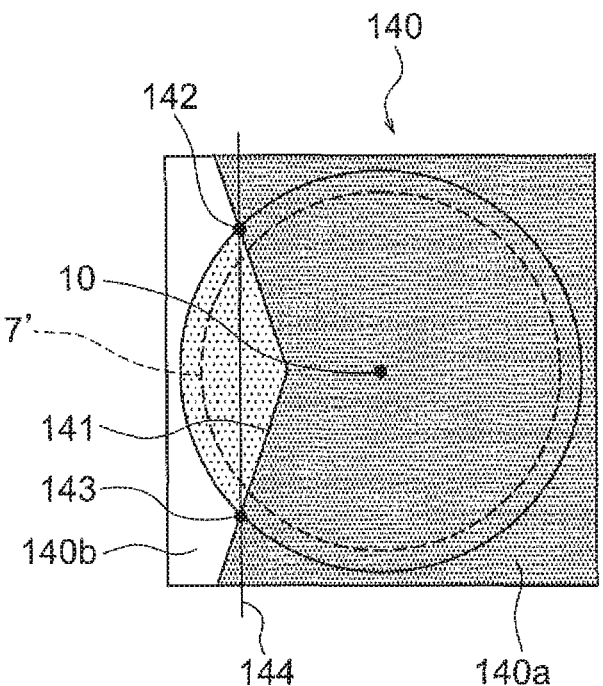
FIG. 46A is a diagram showing another example of the aperture member of the fourth modification.
Figure 46B:
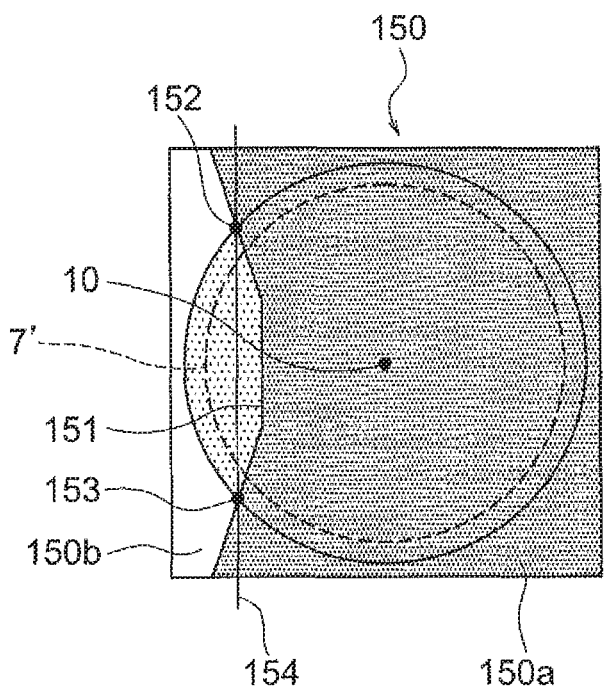
FIG. 46B is a diagram showing another example of the aperture member of the fourth modification.

Another example of the aperture member 100 of the fourth modification is shown in FIG. 46A and FIG. 46B. FIG. 46A is a diagram showing an aperture member formed with two straight lines. FIG. 46B is a diagram showing an aperture member formed with three straight lines.

As shown in FIG. 46A, an aperture member 140 has a light-shielding part 140a and an opening 140b. When the aperture member 140 is inserted to the optical path of the illumination optical system, the aperture member 140 is disposed such that the light-shielding part 140a includes the optical axis 10. The opening 140b is positioned at a place eccentric with respect to the optical axis 10.

A boundary line 141 is formed between the light-shielding part 140a and the opening 140b. The light-shielding part 141a is separated from the opening 140b by the boundary line 141.

When the pupil of the illumination optical system is superimposed on the aperture member 140, the boundary line 141 intersects the outer edge of the pupil of the illumination optical system at a point 142 and a point 143. The point 142 and the point 143 are the predetermined two points. A straight line 144 is a straight line passing through the point 142 and the point 143.

The boundary line 141 is formed with two straight lines. The two straight lines are formed to be concave from the light-shielding part 140a toward the opening 140b. Therefore, in the aperture member 140, the boundary line 141 is positioned between the straight line 144 and the optical axis 10.

The boundary line 141 is a boundary line of type 3. Therefore, by using the aperture member 140, it is possible to measure a surface of a sample having a smaller amount of tilt.

As shown in FIG. 46B, an aperture member 150 has a light-shielding part 150a and an opening 150b. When the aperture member 150 is inserted to the optical path of the illumination optical system, the aperture member 150 is disposed such that the light-shielding part 150a includes the optical axis 10. The opening 150b is positioned at a place eccentric with respect to the optical axis 10.

A boundary line 151 is formed between the light-shielding part 150a and the opening 150b. The light-shielding part 150a is separated from the opening 150b by the boundary line 151.

When the pupil of the illumination optical system is superimposed on the aperture member 150, the boundary line 151 intersects the outer edge of the pupil of the illumination optical system at a point 152 and a point 153. The point 152 and the point 153 are the predetermined two points. A straight line 154 is a straight line passing through the point 152 and the point 153.

The boundary line 151 is formed with three straight lines. The three straight lines are formed so as to be concave from the light-shielding part 150a toward the opening 150b. Therefore, in the aperture member 150, the boundary line 151 is positioned between the straight line 154 and the optical axis 10.

The boundary line 151 is a boundary line of type 3. Therefore, by using the aperture member 150, it is possible to measure a surface of a sample having a smaller amount of tilt.

It is preferable that the sample shape measuring apparatus of the present embodiment include the holding member and a transparent parallel flat plate, the holding member have a holding part to hold liquid, and the transparent parallel flat plate be disposed in contact with the liquid surface of liquid.

The sample is held by the holding member. When the sample is a living cell, the sample is held together with liquid by the holding member. In this case, in order to hold the liquid, the holding member has a holding part.

Figure 47A:
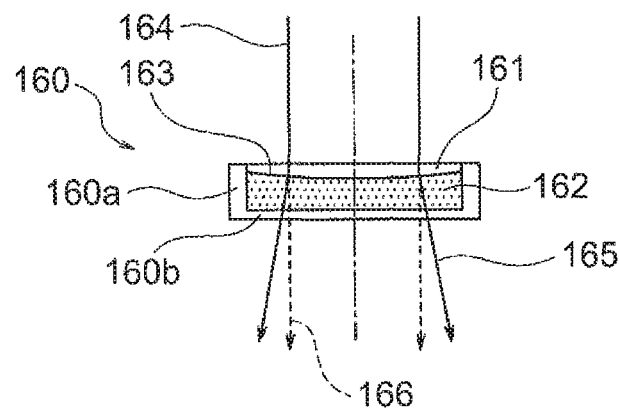
FIG. 47A is a diagram showing a state of liquid in a case where a parallel flat plate is not disposed.
Figure 47B:
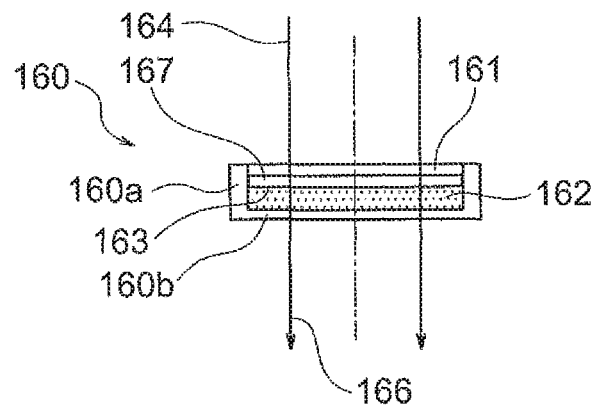
FIG. 47B is a diagram showing a state of liquid in a case where a parallel flat plate is disposed.

FIG. 47A is a diagram showing a state of liquid in a case where a parallel flat plate is not disposed. FIG. 47B is a diagram showing a state of liquid in a case where a parallel flat plate is disposed.

As shown in FIG. 47A, a holding member 160 has a holding part 161. The holding part 161 is a space surrounded by a transparent side surface 160a and a transparent bottom surface 160b. Liquid 162 is held in the holding part 161.

As the area of the holding part 161 decreases, as shown in FIG. 47A, a liquid surface 163 becomes a concave surface. In this case, the liquid 162 acts as a negative lens. Thus, parallel light flux 164 incident on the liquid 162 becomes diverging light flux 165 and is emitted from the bottom surface 160b, as shown by solid lines.

By contrast, when the area of the holding part 161 increases, the liquid surface 163 becomes a flat surface (not shown). In this case, since the liquid 162 can be considered as a parallel flat plate, an action as a lens does not occur in the liquid 162. Thus, parallel light flux 164 incident on the liquid 162 becomes parallel light flux 166 and is emitted from the bottom surface 160b, as shown by dashed lines.

Part of light flux emitted from the bottom surface 160b corresponds to the area of the light flux transmission region. When light flux emitted from the bottom surface 160b is parallel light flux 166, the area of the light flux transmission region is the region of imaging light 47 shown in FIG. 31A. When light flux emitted from the bottom surface 160b is the diverging light flux 165, the area of the light flux transmission region is the region of imaging light 47 shown in FIG. 31B.

The shape of light flux emitted from the bottom surface 160b changes in accordance with the amount of tilt in the surface of the sample. However, as described above, even when a sample is absent, the shape of light flux emitted from the bottom surface 160b is not always the same and may change depending on the shape of the liquid surface 163. Furthermore, as described above, part of light flux emitted from the bottom surface 160b corresponds to the area of the light flux transmission region. Thus, the area of the light flux transmission region may also change depending on the shape of the liquid surface 163.

As described above, the area of the light flux transmission region represents the amount of tilt in the surface of the sample. Therefore, even when the amount of tilt in the surface of the sample is the same, the measurement result differs, for example, between when the shape of the liquid surface 163 is a flat surface and when it is a concave surface. That is, an error may occur in the measurement result depending on the shape of the liquid surface 163.

Then, as shown in FIG. 47B, the transparent parallel flat plate 167 is disposed in contact with the liquid surface 163 of the liquid 162. In this manner, the shape of the liquid surface 163 that has been a concave surface becomes a flat surface. As a result, as shown by solid lines, when a sample is absent, parallel light flux 164 incident on the liquid 162 always becomes parallel light flux 166 and is emitted from the bottom surface 160b. That is, an error is not caused by the shape of the liquid surface 163.

In calculation of the amount of tilt, as described above, a lookup table including the quantity of light and the amount of tilt as parameters or an expression including the quantity of light and the amount of tilt as parameters is used. In the sample shape measuring apparatus of the present embodiment, since an error is not caused by the shape of the liquid surface 163, it is unnecessary to consider the effect of the shape of the liquid surface 163 even when a lookup table is used or when an expression is used.

In the sample shape measuring apparatus of the present embodiment, it is preferable that at least one of a size of the light-shielding part and a sample-side numerical aperture of the objective lens be changeable.

Figure 48A:
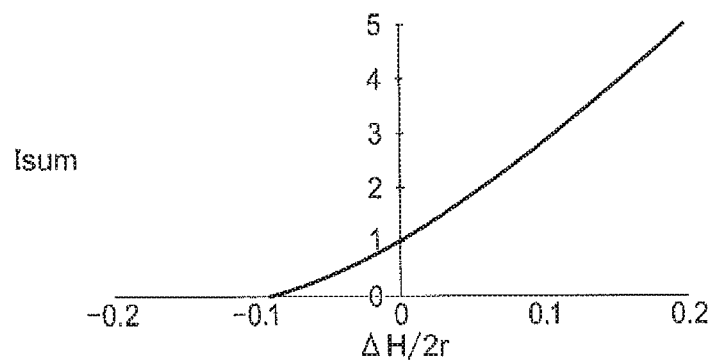
FIG. 48A is a graph showing the correlation characteristic in a boundary line of type 1.
Figure 48B:
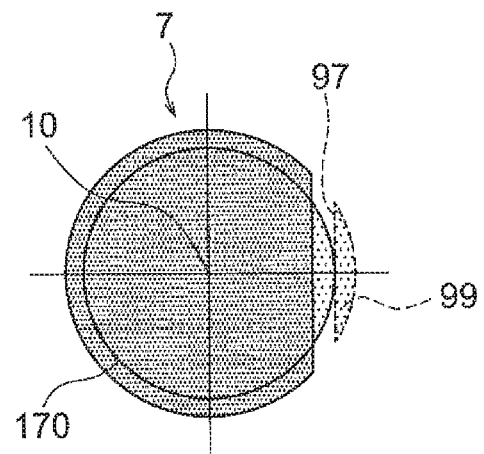
FIG. 48B is a diagram showing a state of imaging light in a boundary line of type 1.

FIG. 48A is a graph showing the correlation characteristic in the boundary line of type 1. FIG. 48B is a diagram showing a state of imaging light in the boundary line of type 1. In FIG. 48B, light flux outside the pupil of the objective lens is not shown for the sake of simplicity.

As shown in FIG. 48A, the sum of light intensity is zero when ΔH/2r=−0.1. At this time, in the light flux transmission region, a boundary line 97 matches an outer edge 170 of the pupil 7 of the objective lens as shown in FIG. 48B. That is, a light flux transmission region 99 is positioned outside the pupil 7 of the objective lens. Thus, in this case, since light flux passing through the pupil 7 of the objective lens does not exist, it is impossible to measure the amount of tilt.

In order to enable measurement of the amount of tilt on the negative side with respect to ΔH/2r=−0.1, it is necessary that the light flux transmission region 99 should be located inside the pupil 7 of the objective lens even on the negative side with respect to ΔH/2r=−0.1.

$\theta_{smax}$ is set as a detectable maximum angle. $\theta_{smax}$ is the angle formed between the normal to the surface of the sample and the optical axis in a state in which the boundary line 97 matches the outer edge 170 of the pupil 7 of the objective lens. $\theta_{smax}$ is represented by Equation (8) below.

$$\tan\theta smax = \frac{n'\sin\theta_{NA} - n\sin\theta_{min}}{n\cos\theta_{min} - n'\cos\theta_{NA}} \qquad (8)$$

where $\theta_{min}$ is the angle formed between predetermined light rays and the optical axis, $\sin\theta_{NA}$ is the sample-side numerical aperture of the objective lens, n is the refractive index of the sample, and n' is the refractive index of the immersion liquid.

Figure 49:
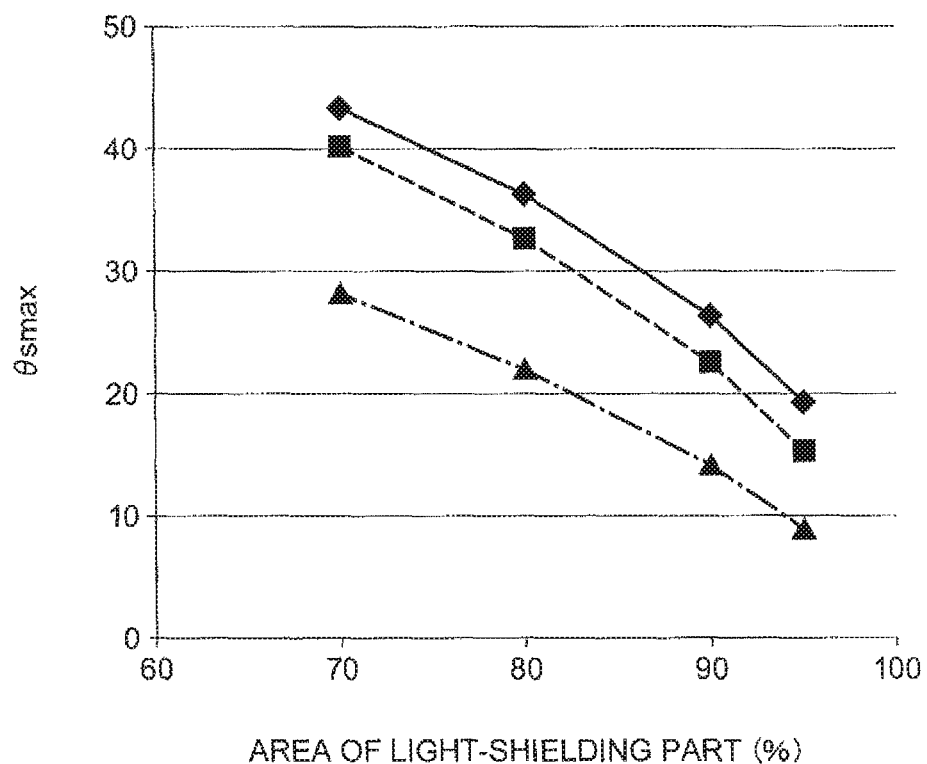
FIG. 49 is a graph showing the relation between the area of the light-shielding part and $\theta_s$.

The result of calculation of $\theta_{smax}$ based on Equation (8) is shown in FIG. 49. FIG. 49 is a graph showing the relation between the area of the light-shielding part and $\theta_{smax}$. In FIG. 49, the solid line shows the result when $\sin \theta_{NA}=0.4$, the dashed line shows the result when $\sin \theta_{NA}=0.25$, and the dashed and single-dotted line shows the result when $\sin \theta_{NA}=0.13$. The area of the light-shielding part is represented by the proportion to the total area. The total area is the sum of the area of the light-shielding part and the area of the transmission part.

$\sin \theta_{NA}$ is the sample-side numerical aperture of the objective lens and is one of parameters that determine the diameter of the pupil of the objective lens. As the value of $\theta_{NA}$ increases, the diameter of the pupil of the objective lens increases. When the diameter of the pupil of the objective lens increases, the light flux transmission region comes to be positioned inside the pupil of the objective lens. Therefore, by increasing the value of $\theta_{NA}$, it is possible to increase the upper limit value of the amount of tilt that can be measured.

This is also shown in FIG. 49. FIG. 49 also indicates that as the value of $\theta_{NA}$ increases, the value of $\theta_{smax}$ increases.

Furthermore, $\theta_{min}$ is the angle formed between predetermined light rays and the optical axis and is a parameter that determines the boundary between the light-shielding part and the transmission part. As the value of $\theta_{min}$ decreases, the area of the transmission part increases, and therefore the area of the light flux transmission region is increased. When the area of the light flux transmission region is increased, the light flux transmission region comes to be positioned inside the pupil of the objective lens. Therefore, by reducing the value of $\theta_{min}$ it is possible to increase the upper limit value of the amount of tilt that can be measured.

Furthermore, as the value of $\theta_{min}$ decreases, the area of the light-shielding part decreases. Therefore, by reducing the area of the light-shielding part, it is possible to increase the upper limit value of the amount of tilt that can be measured.

This is also shown in FIG. 49. FIG. 49 indicates that as the area of the light-shielding part decreases, the value of $\theta_{smax}$ increases.

As shown in FIG. 49, as the value of $\theta_{NA}$ increases, the value of $\theta_{smax}$ increases. This means that as the value of $\theta_{NA}$ increases, the measurement range increases. Therefore, for example, the measurement range when $\theta_{NA}=0.4$ is wider than the measurement range when $\theta_{NA}=0.13$. It is noted, however, that as the value of $\theta_{NA}$ increases, the variation ratio of the quantity of light decreases. Therefore, for example, the detection sensitivity when $\theta_{NA}=0.4$ is lower than the detection sensitivity when $\theta_{NA}=0.13$.

Furthermore, as shown in FIG. 49, as the area of the light-shielding part decreases, the value of $\theta_{smax}$ increases. This means that as the area of the light-shielding part decreases, the measurement range increases. Therefore, for example, the measurement range when the area of the light-shielding part is 70% is wider than the measurement range when the area of the light-shielding part is 95%. It is noted, however, that as the area of the light-shielding part decreases, the variation ratio of the quantity of light decreases. Therefore, for example, the detection sensitivity when the area of the light-shielding part is 70% is lower than the detection sensitivity when the area of the light-shielding part is 95%.

Figure 50:
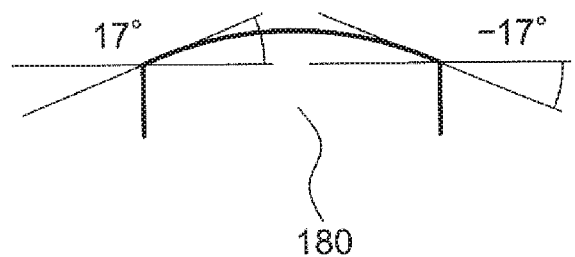
FIG. 50 is a diagram showing a sample.

Measurement examples will be illustrated. FIG. 50 is a diagram showing a sample. The sample is a planoconvex lens 180. The tilt of the planoconvex lens 180 at a point on the outermost side is ±17°. The refractive index of the planoconvex lens 180 is 1.85. The amount of tilt is measured through a liquid with a refractive index of 1.7.

Figure 51A:
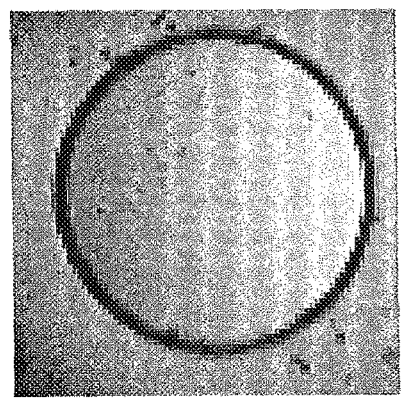
FIG. 51A is an electronic image obtained by a measurement method 1.
Figure 51B:
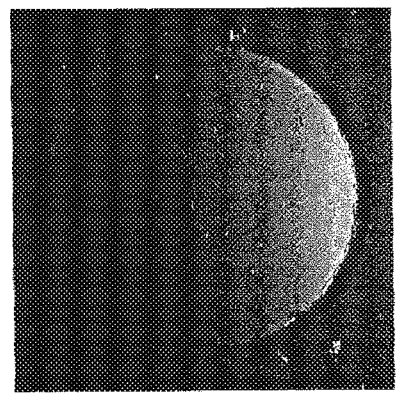
FIG. 51B is an electronic image obtained by a measurement method 2.
Figure 51C:
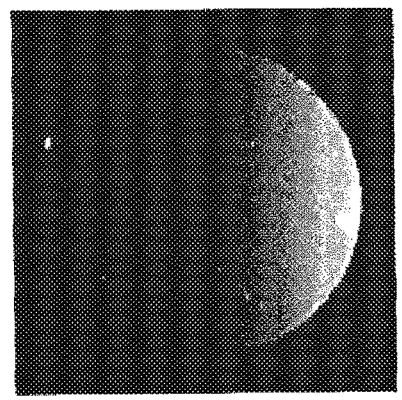
FIG. 51C is an electronic image obtained by a measurement method 3.

An image of the planoconvex lens 180 measured is shown. FIG. 51A is an electronic image (hereinafter referred to as "electronic image 1") obtained by a measurement method 1. FIG. 51B is an electronic image (hereinafter referred to as "electronic image 2") obtained by a measurement method 2. FIG. 51C is an electronic image (hereinafter referred to as "electronic image 3") obtained by a measurement method 3.

The electronic image 1, the electronic image 2, and the electronic image 3 are obtained by executing step S32 in FIG. 8. In each electronic image, the degree of quantity of light of imaging light is represented by light and dark contrast. As described above, the quantity of light of the imaging light represents the amount of tilt in the surface of the sample. Therefore, the light and dark contrast in each electronic image represents the degree of the amount of tilt in the surface of the sample.

Figure 52A:
FIG. 52A is a diagram showing the distribution of brightness in an electronic image 1.
Figure 52B:
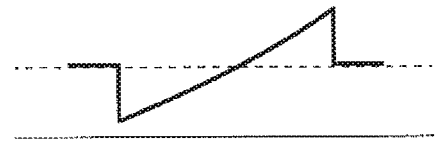
FIG. 52B is a diagram showing the distribution of brightness in an electronic image 2.
Figure 52C:
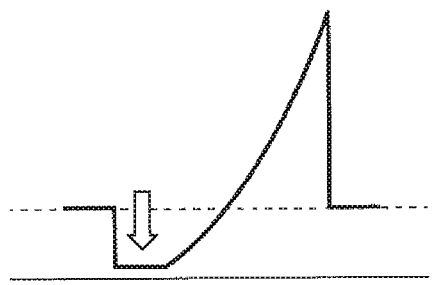
FIG. 52C is a diagram showing the distribution of brightness in an electronic image 3.

Furthermore, a cross section at the central portion in each electronic image is shown. FIG. 52A is a diagram showing the distribution of brightness in the electronic image 1. FIG. 52B is a diagram showing the distribution of brightness in the electronic image 2. FIG. 52C is a diagram showing the distribution of brightness in the electronic image 3.

The cross sections shown in FIGS. 52A, 52B, and 52C are the cross sections of the electronic images as a result of executing step S33. In step S33, the difference or the ratio between the quantity of light of the imaging light and the reference quantity of light is calculated. Therefore, the cross sections shown in FIGS. 52A, 52B, and 52C do not illustrate the distribution of brightness in the electronic images shown in FIGS. 51A, 51B, and 51C.

The value of the numerical aperture of the objective lens and the value of the area of the light-shielding part are as follows.

|  | $\sin\theta_{NA}$ | Area of light-shielding part |
|---|---|---|
| Measurement method 1 | 0.4 | 70% |
| Measurement method 2 | 0.4 | 95% |
| Measurement method 3 | 0.13 | 95% |

In the measurement method 1, it is possible to measure the range from 0° to about 43.5° (see FIG. 49). It is noted, however, that the measurement sensitivity is low in the measurement method 1, compared with the measurement method 2 and the measurement method 3. Thus, the difference in contrast between the left side and the right side in the drawing sheet is small in the electronic image 1, compared with the electronic image 2 and the electronic image 3. This is also clear from the comparison between FIG. 52A, FIG. 52B, and FIG. 52C.

In the measurement method 2, it is possible to measure the range from 0° to about 19.2° (see FIG. 49). In the measurement method 2, the measurement sensitivity is high compared with the measurement method 1. Thus, in the electronic image 2, the difference in contrast is large compared with the electronic image 1. This is also clear from the comparison between FIG. 52A and FIG. 52B.

In the measurement method 3, it is possible to measure the range from 0° to about 8.6° (see FIG. 49). In the measurement method 3, the measurement sensitivity is high compared with the measurement method 1 and the measurement method 2. Thus, in the electronic image 3, the difference in contrast is large compared with the electronic image 1 and the electronic image 2. This is also clear from the comparison between FIG. 52A, FIG. 52B, and FIG. 52C.

It is noted, however, that in the measurement method 3, the tilt that can be measured is about 8.6° at maximum. Thus, in the left half of the electronic image 3, the range having a tilt greater than 8.6° fails to be measured. In an electronic image, the range that fails to be measured is ideally represented by black but actually not always black due to the effect of noise or the like.

In the electronic image 3, the range that fails to be measured is almost black. It is noted, however, that in the range that fails to be measured (the solid line represents zero), the calculated value is not zero but a value close to zero, as shown in FIG. 52C. Furthermore, as shown by the arrow, the range that fails to be measured is almost flat.

In the right half of the image, there exists a range in which the tilt in absolute value is greater than 8.6°. However, in the right half of the image, measurement is successful in this range. In the right half of the image, as the tilt increases, the light flux transmission region approaches the optical axis. Thus, the width of light flux positioned outside the pupil of the objective lens is set to be sufficiently wide, so that the quantity of light of the imaging light increases in accordance with the tilt. In the measurement method 3, measurement is successful since the width of light flux positioned outside the pupil of the objective lens is set to be sufficiently wide.

As described above, by changing at least one of the area of the light-shielding part (the area of the transmission part) and the sample-side numerical aperture of the objective lens, it is possible to change the measurement range and the measurement sensitivity. Therefore, by changing the area of the light-shielding part or the sample-side numerical aperture of the objective lens during the course of measurement, it is possible to measure a sample having various amounts of tilt.

Furthermore, the light flux transmission region is an image of illumination light passing through the transmission part. Projection of the transmission part to the pupil position of the objective lens is performed by the condenser lens and the objective lens. The projection magnification at this time is determined by the magnification of the condenser lens and the magnification of the objective lens. Therefore, by changing the magnification of the objective lens, it is possible to change the size of the light flux transmission region. That is, by increasing the magnification of the objective lens, it is possible to achieve a state in which the light flux transmission region is positioned inside the pupil of the objective lens. In this way, by increasing the magnification of the objective lens, it is also possible to increase the upper limit value of the amount of tilt that can be measured.

In measurement of a sample, the magnification of the objective lens, the sample-side numerical aperture of the objective lens, and the area of the light-shielding part may be determined, for example, in the following order. In measurement, it is preferable that measurement be performed with the optimum field of view. Therefore, it is desirable that the magnification of the objective lens be determined first. Furthermore, it is preferable that the surface of the sample be finely measured. Thus, next, it is desirable that the numerical aperture of the objective lens be determined. Finally, it is desirable that the area of the light-shielding part be determined considering the maximum value of the tilt angle of the surface of the sample.

In a sample in which absorption of light occurs, it is necessary to minimize loss of the quantity of light of the imaging light. The quantity of light of the imaging light depends on the sample-side numerical aperture of the objective lens and the area of the light-shielding part. Thus, in measurement of such a sample, the sample-side numerical aperture of the objective lens or the area of the light-shielding part may be determined first.

If the maximum value of the tilt angle in the surface of the sample is unknown, the magnification of the objective lens, the sample-side numerical aperture of the objective lens, and the area of the light-shielding part may be determined such that the measurement range is largest. Furthermore, when the tilt angle in the surface of the sample is very small, the magnification of the objective lens, the sample-side numerical aperture of the objective lens, and the area of the light-shielding part may be determined such that the measurement sensitivity is largest.

In the sample shape measuring apparatus of the present embodiment, it is preferable that the sample-side numerical aperture of the objective lens be changed with one objective lens.

By doing this, it is possible to smoothly measure a sample having various amounts of tilt. In the change of the sample-side numerical aperture of the objective lens, for example, a zoom objective lens may be used. In the zoom objective lens, the sample-side numerical aperture may be changed in accordance with change in magnification. Alternatively, a liquid crystal device may be disposed at the pupil position of the objective lens, and the sample-side numerical aperture of the objective lens may be changed by changing the transmission region of the device.

In the sample shape measuring apparatus of the present embodiment, it is preferable that the sample-side numerical aperture of the objective lens be changed by switching a plurality of objective lenses.

By doing this, it is possible to measure a sample having various amounts of tilt. Examples of a plurality of objective lenses include objective lenses having the same magnification and having different sample-side numerical apertures. When such a plurality of objective lenses are used, it is possible to change the measurement range and the measurement sensitivity by switching the objective lenses, without changing the magnification.

In the sample shape measuring apparatus of the present embodiment, it is preferable that the light intensity of illumination light passing through the opening be approximately equal at all the positions in the opening.

In this way, by changing the shape of the opening, it is possible to change the measurement range and the measurement sensitivity. As a result, it is possible to readily measure a sample having various amounts of tilt.

As described above, in the sample shape measuring method of the present embodiment, the inclination angle can be measured using a lookup table including the quantity of light and the amount of tilt as parameters. This lookup table may be created as follows.

The sample shape measuring method of the present embodiment may include a step of measuring a reference sample, and the lookup table including the quantity of light and the amount of tilt as parameters may be created using the measurement result.

Figure 53A:
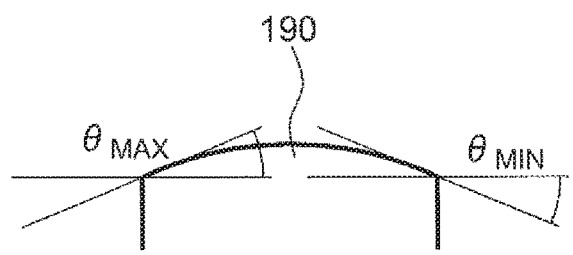
FIG. 53A is a diagram showing a first example of reference sample.

FIG. 53A is a diagram showing a first example of the reference sample. The reference sample of the first example is a planoconvex lens 190. In the planoconvex lens 190, the amount of tilt on each point of the surface is known. $\theta_{MAX}$ is the angle when the absolute value is largest in positive angles, and $\theta_{MIN}$ is the angle when the absolute value is largest in negative angles.

In the planoconvex lens 190, all the angles from $\theta_{MIN}$ to 0° and all the angles from 0° to $\theta_{MAX}$ are included. Therefore, it is possible to obtain data of various angles (the amounts of tilt) only by measuring the planoconvex lens 190 once.

Figure 53B:
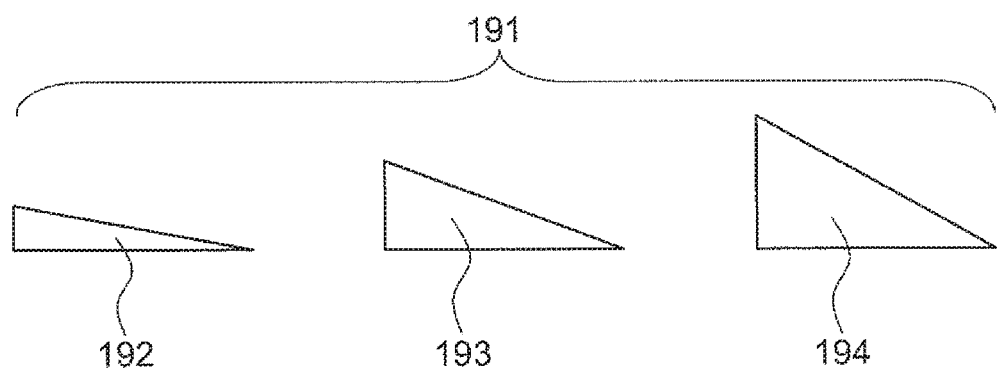
FIG. 53B is a diagram showing a second example of reference sample.

FIG. 53B is a diagram showing a second example of the reference sample. The reference sample of the second example is composed of a plurality of wedges 191. A plurality of wedges 191 include a wedge 192, a wedge 193, and a wedge 194. In each of the wedge 192, the wedge 193, and the wedge 194, the amount of tilt of the surface is known. The number of wedges is not limited to three.

Figure 53C:
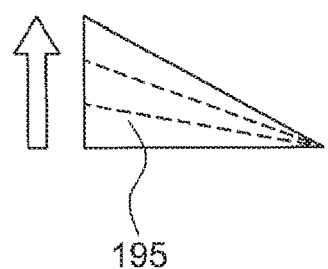
FIG. 53C is a diagram showing a third example of reference sample.

FIG. 53C is a diagram showing a third example of the reference sample. The reference sample of the third example is a wedge 195. In the wedge 195, the height (the length in the direction of the arrow) continuously changes. An example of the wedge 195 is a vari-angle prism. In the wedge 195, the amount of tilt of the surface at each height is known.

Figure 54:
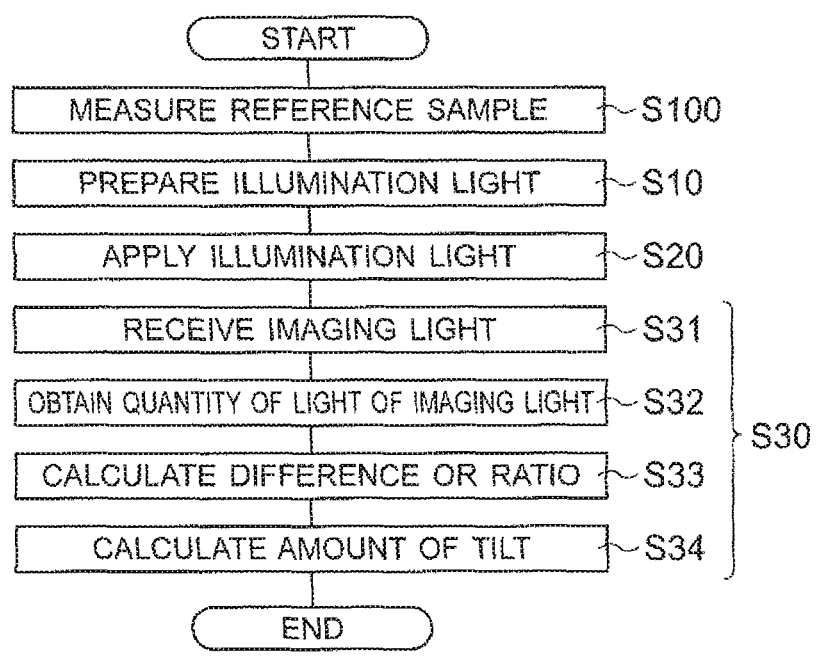
FIG. 54 is a flowchart of the sample shape measuring method of the present embodiment.

The sample shape measuring method of the present embodiment will be described. FIG. 54 is a flowchart of the sample shape measuring method of the present embodiment. The same step as in the flowchart in FIG. 8 is denoted by the same numeral and will not be further elaborated. The sample shape measuring method of the present embodiment includes step S100 of measuring a reference sample.

As shown in FIG. 54, in the sample shape measuring method of the present embodiment, step S100 is executed first. In step S100, a reference sample is measured. Any one of the planoconvex lens 190, a plurality of wedge 191, and the wedge 195 described above may be used as a reference sample.

In the reference sample, the amount of tilt in the surface of the sample is known. Data representing the relation between the quantity of light and the amount of tilt is obtained by executing step S100. A lookup table is created using this data. Furthermore, when a lookup table has already been created, the data in the lookup table is updated as necessary. The method of using a lookup table has already been described and is not further elaborated here.

In an apparatus using the sample shape measuring method of the present embodiment, variations occur within a range of production tolerance in each of the members included in the apparatus. For example, the value of the numerical aperture of the objective lens or the value of magnification varies within a range of production tolerance. Furthermore, the boundary between the opening and the light-shielding part also varies within a range of production tolerance.

In measurement of the shape of a sample, the configuration of the observation optical system and the configuration of the illumination optical system are changed depending on samples. In the observation optical system, for example, in order to obtain the optimum field of view and resolution, an objective lens A is used for measurement of a sample A and an objective lens B is used for measurement of a sample B. Similarly, in the illumination optical system, for example, an aperture member A is used for measurement of a sample A and an aperture member B is used for measurement of a sample B.

Thus, if variation within a range of production tolerance exists in each of the members included in the apparatus, the correspondence relation between the quantity of light of the imaging light and the amount of tilt differs from the correspondence relation in the ideal state. As a result, a measurement error occurs.

Furthermore, even when there is no variation in individual members, for example, the boundary between the opening and the light-shielding part, variation occurs in arrangement position every time the aperture member is disposed in the optical path of the illumination optical system. As a result, variation occurs in the boundary between the opening and the light-shielding part. As a result, a measurement error occurs.

Furthermore, for example, the light source, the optical filter, or the condenser lens may be changed. If such a change in configuration takes place, the correspondence relation between the quantity of light of the imaging light and the amount of tilt varies among the configurations of the observation optical system or the configurations of the illumination optical system.

Then, by executing step S100, it is possible to obtain the correspondence relation suited for the actual measurement. As a result, it is possible to obtain the amount of tilt in the surface of the sample more precisely. Furthermore, since the amount of tilt in the surface of the sample is calculated using a lookup table, it is possible to eliminate the step involving complicated computation.

Step S100 may be executed at a time of the initial measurement. However, step S100 may be executed every time measurement is performed.

When the variation described above is extremely small, step S100 may be executed at a time of production of the apparatus. In this case, step S100 is executed with various combinations of the configuration of the observation optical system and the configuration of the illumination optical system. A lookup table is then created based on the result obtained with each combination.

The result obtained by execution of step S100 may be calibrated with the reference quantity of light. By doing this, it is possible to obtain the amount of tilt in the surface of the sample even more precisely.

In the sample shape measuring method of the present embodiment, measurement may be performed with different positions of the opening in a plane orthogonal to the optical axis.

Figure 55A:
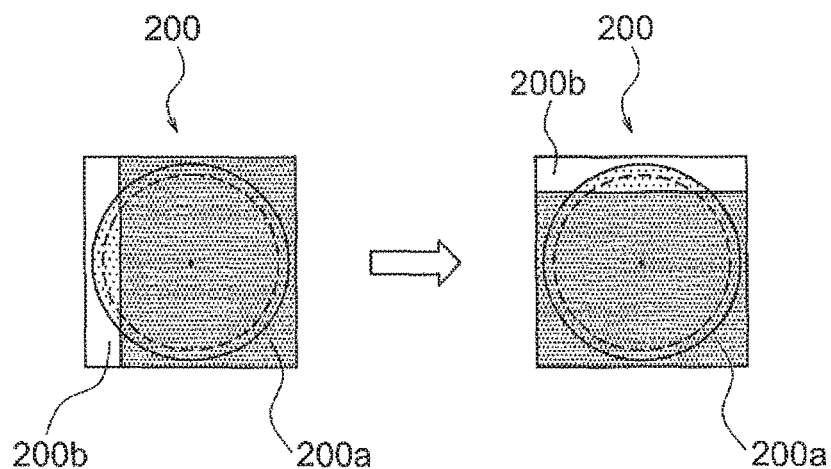
FIG. 55A is a diagram showing a first example in which the aperture member is rotated.

FIG. 55A is a diagram showing a first example in which the aperture member is rotated. An aperture member 200 has a light-shielding part 200*a* and an opening 200*b*. In the rotation in the first example, the aperture member 200 is rotated in a plane orthogonal to the optical axis. Through this rotation, the opening 200*b* after rotation moves to a position rotated clockwise by 90° from the position before rotation.

In the measurement in the first example, step S10, step S20, step S31, and step S32 shown in FIG. 8 are performed at a position before rotation. Next, step S31 and step S32 are performed at a position after rotation. In this manner, the quantity of light of the imaging light is acquired twice. For example, an average may be obtained using the acquired two quantities of light of the imaging light. By doing this, it is possible to suppress a measurement error due to shot noise or the like.

Figure 55B:
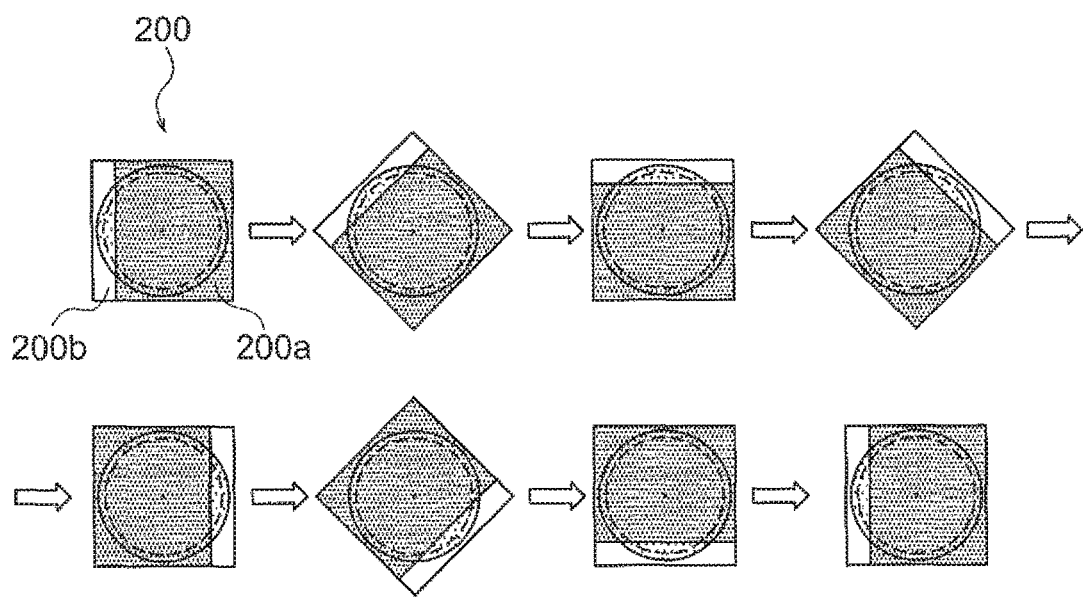
FIG. 55B is a diagram showing a second example in which the aperture member is rotated.

FIG. 55B is a diagram showing a second example in which the aperture member is rotated. In rotation in the second example, the aperture member 200 is rotated in a plane orthogonal to the optical axis. Through this rotation, the opening 200*b* after rotation moves to a position rotated clockwise by 45° from the position before rotation.

The measurement in the second example is similar to the measurement in the first example. It differs from the measurement in the first example in that measurement at the position after rotation is performed seven times. In measurement in the second example, the quantity of light of the imaging light is acquired eight times. For example, an average may be obtained using the acquired eight quantities of light of the imaging light. By doing this, it is possible to suppress a measurement error due to shot noise or the like.

Liquid crystal device may be used as the aperture member. When liquid crystal device is used, it is possible to change the position of the opening in a plane orthogonal to the optical axis, without rotating the aperture member.

When the position of the opening is differentiated, it is preferable that the opening match the ideal position. When the opening does not match the ideal position, the quantity of light of the imaging light is acquired multiple times without changing the position of the opening. Then, for example, an average is obtained using the acquired eight quantities of light of the imaging light.

By doing this, it is possible to suppress a measurement error due to shot noise or the like. Even when the opening matches the ideal position, the quantity of light of the imaging light may be acquired multiple times without changing the position of the opening.

In the sample shape measuring method of the present embodiment, measurement may be performed by positioning the opening at a first position and a second position in a plane orthogonal to the optical axis. Here, the second position is a position where the first position is rotated by 180°.

Measurement is performed by moving the opening to the first position (hereinafter referred to as "measurement 1"). Here, it is assumed that the maximum value of the amount of tilt in the surface of the sample slightly exceeds the measurement range. This is the case with, for example, the above-noted measurement example shown in FIG. 51C and FIG. 52C. In this case, in the measurement 1, as illustrated in FIG. 51C and FIG. 52C, a range having a tilt greater than 8.6° (absolute value) fails to be measured in the left half of the image. On the other hand, in the right half of the image, a range having a tilt greater than 8.6° (absolute value) is successfully measured.

Then, measurement is performed by moving the opening to the second position (hereinafter referred to as "measurement 2"). The second position is a position where the first position is rotated by 180°. Thus, in the measurement 2, a phenomenon opposite to the phenomenon in the measurement 1 occurs. That is, in the measurement 2, a range having a tilt greater than 8.6° (absolute value) is successfully measured in the left half of the image. On the other hand, in the right half of the image, a range having a tilt greater than 8.6° (absolute value) fails to be measured.

In this way, in the sample shape measuring method of the present embodiment, part of the left half of the image that fails to be measured in the measurement 1 can be measured in the measurement 2. Therefore, it is possible to obtain all the tilts in the surface of the sample using the result of the measurement 1 and the result of the measurement 2. Furthermore, it is possible to suppress a measurement error due to shot noise or the like.

The sample shape measuring method of the present embodiment may include a step of setting the transmittance distribution of the sample and a step of calibrating the quantity of light of the imaging light.

Figure 56:
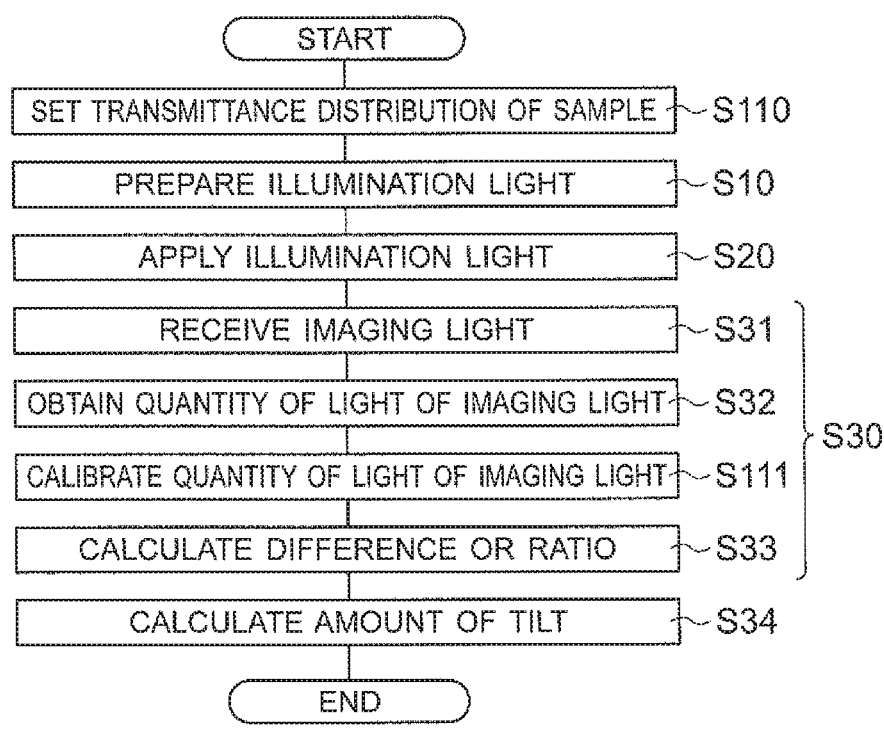
FIG. 56 is a flowchart of the sample shape measuring method of the present embodiment.

FIG. 56 is a flowchart of the sample shape measuring method of the present embodiment. The same step as in the flowchart in FIG. 8 is denoted by the same numeral and will not be further elaborated. The sample shape measuring method of the present embodiment includes step S110 of setting the transmittance distribution of the sample and step S111 of calibrating the quantity of light of the imaging light.

As shown in FIG. 56, in the sample shape measuring method of the present embodiment, step S110 is executed first. In step S110, the transmittance distribution of the sample is set. To do so, in step S110, first, light emitted from the sample is received in a state of bright-field observation. Next, the quantity of light of the received light is obtained. Finally, the transmittance distribution of the sample is calculated from the obtained quantity of light and the reference quantity of light.

The reference quantity of light is the quantity of light in a state in which no sample is present. The reference quantity of light is also obtained in a state of bright-field observation. If absorption occurs in the sample, a difference in the quantity of light of the received light arises between when the sample is present and when the sample is not present. The transmittance distribution of the sample can be obtained from this difference. The transmittance distribution of the sample can be obtained, for example, from the ratio between the obtained quantity of light and the reference quantity of light.

When step S110 is finished, step S10 to step S32 are executed. By execution of step S32, the quantity of light of the imaging light is determined. It is noted, however, that when absorption occurs in the sample, the quantity of light of the imaging light here is the quantity of light after loss of the quantity of light occurs due to absorption.

As described above, change in quantity of light of the imaging light changes in accordance with the amount of tilt in the surface of the sample. Therefore, in this state, the variation of quantity of light due to absorption is considered to be caused by change in the amount of tilt. As a result, a measurement error occurs.

Then, the quantity of light of the imaging light is calibrated using the transmittance distribution of the sample obtained in step S110. The quantity of light of the imaging light can be calibrated by determining the ratio between the quantity of light of the imaging light and the transmittance distribution of the sample. By doing this, it is possible to prevent occurrence of a measurement error.

When the sample is a living cell, measurement of the amount of tilt in the surface of the sample is performed through liquid such as culture liquid. In this case, since the sample includes the living cell and the liquid, the transmittance of the liquid is reflected in the transmittance distribution of the sample.

Step S110 may be executed at a time of production of the apparatus. In this case, light reception in the bright-field observation, calculation of the quantity of light, and calculation of the transmittance are performed for various measurement targets (samples and liquids). Then, the calculated transmittance is stored in a storage unit.

By doing so, it is possible to execute step S110 by reading the transmittance corresponding to the measurement target from the storage unit. Thus, it is possible to reduce the preparation time taken to start measurement.

If the transmittance corresponding to the measurement target does not exist in the storage unit, light emitted from the sample is received in a state of bright-field observation and whereby the transmittance may be obtained, as described above.

The sample shape measuring method of the present embodiment may include a step of relatively moving the observation optical system and the sample and a step of correcting displacement in the X and Y directions.

As described above, by executing the step of relatively moving the observation optical system and the sample, it is possible to precisely obtain the amount of tilt in the surface of the sample in a range wider than focal depth.

When the height of the sample is higher than the focal depth, the sample surface that does not fall in the focal depth is not in focus. Thus, the image of such a sample surface is a defocused image. In the defocused image, displacement of an image in a plane orthogonal to the optical axis (hereinafter referred to as "lateral displacement") occurs. If a defocused image is picked up, lateral displacement also occurs in the resultant electronic image. In order to precisely obtain the amount of tilt in the surface of the sample, it is necessary to correct the lateral displacement. However, it is very difficult to correct the lateral displacement.

In the sample shape measuring method of the present embodiment, it is possible to finally obtain an electronic image focused in all sample surfaces, even for a sample having a height higher than the focal depth. That is, even when there is a sample surface that does not fall in the focal depth at a time of measurement for the first time, it is possible to finally acquire an electronic image free from lateral displacement, even for such a sample surface. In this way, all of a plurality of electronic images acquired are electronic images in focus. Therefore, it is possible to obtain the amount of tilt or shape (height) at the correct XY positions, from a plurality of electronic images acquired.

The sample shape measuring method of the present embodiment may include a step of removing high frequency components.

In measurement of the reference quantity of light, no sample is present. However, the reference quantity of light is affected by dust adhering to the optical system and dust in the air. In the electronic image acquired based on the reference quantity of light, the effect of such dust appears in the form of high frequency components. Then, by executing the step of removing high frequency components, it is possible to eliminate the effect by dust and the like from the electronic image of the reference quantity of light, that is, data of the reference quantity of light. As a result, it is possible to precisely obtain the amount of tilt in the surface of the sample.

To remove high frequency components, for example, an operation by a low-pass filter can be executed.

According to the present invention, it is possible to provide a sample shape measuring method and a sample shape measuring apparatus that can measure the tilt and shape of a sample surface with high accuracy, even for a sample in which the reflectance of the surface is low and the surface shape is smooth.

As described above, the present invention is suitable for a sample shape measuring method and a sample shape measuring apparatus that can measure the tilt and shape in the surface of a sample with high accuracy, even for a sample in which the reflectance of the surface is low and the surface shape is smooth.

What is claimed is:

1. A sample shape measuring method comprising:
   a step of preparing illumination light passing through a predetermined illumination region;
   a step of applying the illumination light to a sample; and
   a predetermined processing step, wherein
   the predetermined illumination region is set so as not to include an optical axis at a pupil position of an illumination optical system and is set such that the illumination light is applied to part of inside of a pupil and outside of the pupil at a pupil position of an observation optical system,
   the illumination light is transmitted through the sample, light emitted from the sample is incident on the observation optical system, and
   the predetermined processing step includes:
   a step of receiving light emitted from the observation optical system;
   a step of obtaining a quantity of light of the received light;
   a step of calculating a difference or a ratio between the quantity of light and a reference quantity of light; and
   a step of calculating an amount of tilt in a surface of the sample from the difference or the ratio.

2. The sample shape measuring method according to claim 1, further comprising a step of calculating a shape of a sample based on the amount of tilt.

3. The sample shape measuring method according to claim 2, wherein
   in the predetermined illumination region, a surface light source is disposed or an image of the surface light source is formed, and
   in the step of receiving light, light emitted from the observation optical system is received by a plurality of minute regions.

4. The sample shape measuring method according to claim 3, wherein, for each of the minute regions, the step of obtaining a quantity of light, the step of calculating a difference or a ratio, and a step of calculating an amount of tilt are executed.

5. The sample shape measuring method according to claim 3, further comprising a step of setting a range wider than one of the minute regions as a predetermined region, wherein
   in the step of obtaining a quantity of light, the quantity of light obtained based on the minute regions included in the predetermined region is obtained as the quantity of light in the predetermined region,
   in the step of calculating a difference or a ratio, the difference or the ratio between the quantity of light in the predetermined region and the reference quantity of light is calculated,
   in the step of calculating a tilt, the amount of tilt in the surface of the sample corresponding to the predetermined region is calculated,
   the predetermined region corresponds to one region when the surface of the sample is divided into a grid pattern, and
   the amount of tilt in the surface of the sample is calculated using the predetermined region as a unit.

6. The sample shape measuring method according to claim 2, wherein the illumination light passing through the predetermined illumination region is parallel light flux.

7. The sample shape measuring method according to claim 6, wherein the illumination light and the sample are relatively moved in a plane orthogonal to the optical axis.

8. The sample shape measuring method according to claim 2, further comprising a step of calculating a shape of a sample from the amount of tilt and visualizing a shape of the sample from the calculated shape.

9. The sample shape measuring method according to claim 2, wherein the reference quantity of light is a quantity of light in a state in which no sample is present.

10. The sample shape measuring method according to claim 9, further comprising a step of setting the reference quantity of light between the step of preparing illumination light and the step of applying the illumination light to a sample.

11. The sample shape measuring method according to claim 10, wherein
   in the step of setting the reference quantity of light, the quantity of light is measured by applying the illumination light emitted from the illumination optical system to the observation optical system, and
   the reference quantity of light is set based on the measured quantity of light.

12. The sample shape measuring method according to claim 11, wherein measurement of the quantity of light is performed before initial measurement of a sample.

13. The sample shape measuring method according to claim 11, wherein
the measured quantity of light is stored, and
the reference quantity of light is set by reading the quantity of light stored before the initial measurement of a sample.

14. The sample shape measuring method according to claim 2, wherein in the step of calculating an amount of tilt, the amount of tilt is calculated based on a correspondence relation obtained in advance.

15. The sample shape measuring method according to claim 14, wherein the correspondence relation is represented by a lookup table including the quantity of light and the amount of tilt as parameters.

16. The sample shape measuring method according to claim 14, wherein the correspondence relation is represented by an expression including the quantity of light and the amount of tilt as parameters.

17. The sample shape measuring method according to claim 2, wherein the predetermined illumination region is set such that an image of the predetermined illumination region includes part of an edge of the pupil.

18. The sample shape measuring method according to claim 17, further comprising a step of changing a position of the predetermined illumination region, wherein
the step of changing a position is executed after the predetermined processing step for the first time is finished,
by execution of the step of changing a position, the position of the predetermined illumination region moves to a position different from a position when the processing step for the first time is executed, and
the predetermined processing step for the second time is executed after the step of changing a position is finished.

19. The sample shape measuring method according to claim 2, wherein the predetermined illumination region is set such that an image of the predetermined illumination region includes the entire edge of the pupil.

20. The sample shape measuring method according to claim 2, further comprising a step of relatively moving the observation optical system and the sample along the optical axis.

21. The sample shape measuring method according to claim 2, wherein
a pupil magnification is a ratio between a diameter of the pupil in the illumination optical system and a diameter of the pupil in the observation optical system,
a change in the pupil magnification is caused by a sample, and
the sample measuring method further comprises a step of correcting an error that occurs with the change in pupil magnification.

22. A sample shape measuring apparatus comprising:
an illumination optical system;
an observation optical system;
a stage;
a sensor; and
a processor comprising hardware, wherein
the illumination optical system includes a light source, a condenser lens, and an aperture,
the observation optical system includes an objective lens and an imaging lens,
the stage holds a sample and is disposed between the illumination optical system and the observation optical system,
illumination light applied to the sample by the illumination optical system is transmitted through the sample,
light emitted from the sample is incident on the observation optical system,
the sensor receives light emitted from the observation optical system, and
the processor is configured to:
obtain a quantity of light based on the received light,
calculate a difference or a ratio between the quantity of light and a reference quantity of light, and
calculate an amount of tilt in a surface of the sample based on the difference or the ratio.

23. The sample shape measuring apparatus according to claim 22, wherein the processor is further configured to calculate a shape of a sample based on the amount of tilt.

24. The sample shape measuring apparatus according to claim 23, wherein
the sensor has light-detecting pixels arranged in two dimensions,
a range wider than the light-detecting pixel is set as a predetermined region,
the quantity of light obtained based on the light-detecting pixels included in the predetermined region is obtained as the quantity of light in the predetermined region,
a difference or a ratio between the quantity of light in the predetermined region and a reference quantity of light is calculated,
the processor is further configured to calculate an amount of tilt in a surface of the sample corresponding to the predetermined region, from a result of the calculation of the difference or the ratio,
the predetermined region corresponds to one region when the surface of the sample is divided into a grid pattern, and
the amount of tilt in a surface position of the sample is calculated using the predetermined region as a unit.

25. The sample shape measuring apparatus according to claim 23, wherein the processor is further configured to calculate a shape of a sample from a plurality of the amounts of tilt and visualize a shape of the sample from the calculated shape.

26. The sample shape measuring apparatus according to claim 23, wherein the processor is further configured to access a lookup table, wherein the lookup table comprises the quantity of light and the amount of tilt and calculate the amount of tilt using the lookup table.

27. The sample shape measuring apparatus according to claim 23, further comprising a first aperture and a second aperture member to be inserted to and removed from an optical path, wherein the first aperture, a portion including an optical axis of the condenser lens is a light-shielding part, the first aperture having a first opening at a position eccentric with respect to the optical axis,
in the second aperture, a portion including the optical axis of the condenser lens is a light-shielding part, the second aperture having a second opening at a position eccentric with respect to the optical axis,
a direction connecting the optical axis with a centroid of the first opening when the first aperture is inserted to the optical path intersects a direction connecting the optical axis with a centroid of the second opening when the second aperture is inserted to the optical path.

28. The sample shape measuring apparatus according to claim 23, wherein in the aperture, a portion including an optical axis of the condenser lens is a light-shielding part, the aperture having a first opening and a second opening at a position eccentric with respect to the optical axis, and a direction connecting the optical axis with a centroid of the first opening when the aperture is inserted to the optical path intersects a direction connecting the optical axis with a centroid of the second opening.

29. The sample shape measuring apparatus according to claim 23, wherein in the aperture, a portion including an optical axis of the condenser lens is a light-shielding part, the aperture has an opening at a position eccentric with respect to the optical axis, and a direction connecting the optical axis with a centroid of the opening is changeable.

30. The sample shape measuring apparatus according to claim 27, wherein the processor is further configured to access a lookup table, wherein the lookup table represents a relation between the quantity of light and the amount of tilt in a plurality of directions connecting the optical axis with the centroid of the opening, and calculate the amount of tilt and a tilt direction using the lookup table.

31. The sample shape measuring apparatus according to claim 27, wherein the opening is provided such that illumination light of the illumination optical system is applied to part of a pupil and outside of the pupil at a pupil position of the observation optical system.

32. A sample shape measuring apparatus comprising:
an illumination optical system;
an observation optical system;
a stage;
a sensor; and
a processor comprising hardware, wherein the illumination optical system includes a light source, a condenser lens, and an aperture,
the observation optical system includes an objective lens and an imaging lens,
the stage holds a sample and is disposed between the illumination optical system and the observation optical system,
the aperture has a light-shielding part and an opening,
the light-shielding part is provided so as to include an optical axis of the condenser lens,
the opening is provided at a position eccentric with respect to the optical axis,
an image of the opening is formed in vicinity of a pupil position of the observation optical system and is formed so as to overlap part of an outer edge of a pupil of the observation optical system,
illumination light applied to the sample by the illumination optical system is transmitted through the sample,
light emitted from the sample is incident on the observation optical system,
the sensor receives light emitted from the observation optical system, and
the processor is configured to:
obtain a quantity of light based on the received light,
calculate a difference or a ratio between the quantity of light and a reference quantity of light, and
calculate an amount of tilt in a surface of the sample from the difference or the ratio.

33. The sample shape measuring apparatus according to claim 32, wherein the processor is further configured to calculate a shape of a sample based on the amount of tilt.

34. The sample shape measuring apparatus according to claim 33, wherein
the aperture has a boundary line that separates the light-shielding part from the opening, and
the boundary line is formed of a line parallel to one straight line orthogonal to the optical axis.

35. The sample shape measuring apparatus according to claim 33, wherein
the aperture is a first aperture,
the first aperture has a boundary line that separates a light-shielding part from an opening, and
a straight line connecting predetermined two points is positioned between the boundary line and the optical axis,
where the predetermined two points are two points where the boundary line intersects an outer edge of a pupil of the illumination optical system when the pupil of the illumination optical system is superimposed on the first aperture.

36. The sample shape measuring apparatus according to claim 33, wherein
the aperture is a second aperture,
the second aperture has a boundary line that separates a light-shielding part from an opening, and
the boundary line is positioned between a straight line connecting predetermined two points and the optical axis,
where the predetermined two points are two points where the boundary line intersects an outer edge of a pupil of the illumination optical system when the pupil of the illumination optical system is superimposed on the second aperture.

37. The sample shape measuring apparatus according to claim 33, wherein
the sample shape measuring apparatus comprises the stage and a transparent parallel flat plate,
the stage has a holding part to hold liquid, and
the transparent parallel flat plate is disposed in contact with a liquid surface of the liquid.

38. The sample shape measuring apparatus according to claim 33, wherein at least one of a size of the light-shielding part and a sample-side numerical aperture of the objective lens is changeable.

39. The sample shape measuring apparatus according to claim 38, wherein the sample-side numerical aperture of the objective lens is changed with one objective lens.

40. The sample shape measuring apparatus according to claim 38, wherein the sample-side numerical aperture of the objective lens is changed by switching a plurality of objective lenses.

41. The sample shape measuring apparatus according to claim 33, wherein light intensity of illumination light passing through the opening is approximately equal at all positions in the opening.

* * * * *